(12) United States Patent
Thurman et al.

(10) Patent No.: US 6,873,928 B2
(45) Date of Patent: Mar. 29, 2005

(54) ROUTING WITH SIGNAL MODIFIERS IN A MEASUREMENT SYSTEM

(75) Inventors: Robert W. Thurman, Austin, TX (US); Jeff A. Carbonell, Austin, TX (US)

(73) Assignee: National Instruments Corporation, Austin, TX (US)

(*) Notice: Subject to any disclaimer, the term of this patent is extended or adjusted under 35 U.S.C. 154(b) by 187 days.

(21) Appl. No.: 10/231,543

(22) Filed: Aug. 30, 2002

(65) Prior Publication Data

US 2003/0004675 A1 Jan. 2, 2003

Related U.S. Application Data

(63) Continuation of application No. 10/174,369, filed on Jun. 18, 2002, now abandoned.

(51) Int. Cl.[7] .............................................. G06F 17/00
(52) U.S. Cl. ....................................... 702/127; 702/123
(58) Field of Search .......................... 702/123, 57, 119, 702/124, 127, 186, 188, 189, FOR 103, FOR 104, FOR 134, FOR 141, FOR 155, FOR 170, FOR 171; 370/241, 242, 244, 248, 250; 714/25, 37, 38; 709/238–242

(56) References Cited

U.S. PATENT DOCUMENTS

| | | | |
|---|---|---|---|
| 4,812,996 A | | 3/1989 | Stubbs |
| 4,868,785 A | | 9/1989 | Jordan et al. |
| 4,884,228 A | | 11/1989 | Stanley et al. |
| 5,133,045 A | | 7/1992 | Gaither et al. |
| 5,136,705 A | | 8/1992 | Stubbs et al. |
| 5,155,836 A | | 10/1992 | Jordan et al. |
| 5,481,741 A | | 1/1996 | McKaskle et al. |
| 5,630,164 A | | 5/1997 | Williams et al. |
| 5,812,394 A | | 9/1998 | Lewis et al. |
| 5,912,633 A | * | 6/1999 | Allison et al. ......... 340/870.02 |
| 5,926,775 A | | 7/1999 | Brumley et al. |
| 5,991,537 A | | 11/1999 | McKeon et al. |
| 6,041,041 A | * | 3/2000 | Ramanathan et al. ....... 370/241 |
| 6,067,584 A | | 5/2000 | Hayles et al. |
| 6,096,094 A | | 8/2000 | Kay et al. |
| 6,098,028 A | | 8/2000 | Zwan et al. |
| 6,173,438 B1 | | 1/2001 | Kodosky et al. ............. 717/104 |
| 6,219,628 B1 | | 4/2001 | Kodosky et al. .............. 703/12 |
| 6,570,867 B1 | * | 5/2003 | Robinson et al. ........... 370/351 |
| 2002/0015386 A1 | * | 2/2002 | Kajiwara .................... 370/248 |
| 2003/0004670 A1 | | 1/2003 | Schmit et al. .............. 702/127 |

OTHER PUBLICATIONS

U.S. Provisional Application No. 60/301,785, titled "Measurement System Software Architecture for Easily Creating High–Performance Measurement Applications", Schmit et al., filed Jun. 29, 2001.

\* cited by examiner

*Primary Examiner*—Hal Wachsman
(74) *Attorney, Agent, or Firm*—Meyertons Hood Kivlin Kowert & Goetzel, P.C.; Jeffrey C. Hood; Mark S. Williams

(57) ABSTRACT

System and method for programmatically determining routing with signal modifications in a measurement system to perform a measurement task. Information is received specifying a route from a source terminal to a destination terminal in the measurement system, including signal modification requirements and a graph of possible routes in the measurement system. A current signal modification of the route is determined and used with the signal modification requirements to determine desired changes in the signal modification of the route. The legs of the route are walked in the graph, and one or more legs are replaced with respective alternative legs, each of which includes at least a portion of the desired changes in the signal modification, thereby generating a modified route which satisfies the signal modification requirements for the route, where the modified route is usable to route signals in performing the measurement task. The modified route is then stored.

44 Claims, 35 Drawing Sheets

Digital Topography of the PXI-4070

Example of Multiple Inverters

Multi-Device Routing with Inversion

Example of Inverter Arbitration

Simple Topography

Simple Topography With Pre-Existing Route

Second Route Includes First Route

Two Routes Overlap

ROUTING WITH SIGNAL MODIFIERS IN A MEASUREMENT SYSTEM

CONTINUATION DATA

This application is a Continuation of U.S. application Ser. No. 10/174,369 titled "Routing With Signal Modifiers For A Measurement System" filed Jun. 18, 2002, now abandoned, whose inventor was Robert W. Thurman.

FIELD OF THE INVENTION

The present invention relates to the field of measurement and automation systems, and more particularly to a system and method for route sharing in a measurement system.

DESCRIPTION OF THE RELATED ART

Scientists and engineers often use measurement or automation systems to perform a variety of functions, including measurement of a physical phenomena or unit under test (UUT), test and analysis of physical phenomena, simulation, hardware-in-the-loop testing, process monitoring and control, control of mechanical or electrical machinery, data logging, laboratory research, and analytical chemistry, to name a few examples.

A typical measurement system comprises a computer system with a measurement device or measurement hardware. The measurement device may be or include a computer-based instrument, a data acquisition device or board, a programmable logic device (PLD), a sensor, a smart sensor, an actuator, or other type of device for acquiring or generating data. The measurement device may be a card or board plugged into one of the I/O slots of the computer system, or a card or board plugged into a chassis, or an external device. For example, in a common measurement system configuration, the measurement hardware is coupled to the computer system via other means such as through a VXI (VME eXtensions for Instrumentation) bus, a PXI (PCI eXtensions for Instrumentation) bus, a GPIB (General Purpose Interface Bus), a serial port, or parallel port of the computer system. Optionally, the measurement system includes signal conditioning devices which receive the field signals and condition the signals to be acquired.

A measurement system may also typically include transducers, sensors, actuators or other detecting (or generating) means for providing "field" electrical signals representing a process, physical phenomena, equipment being monitored or measured, etc. The field signals are provided to the measurement hardware.

The measurement hardware is generally configured and controlled by measurement software executing on the computer system. The measurement software for configuring and controlling the measurement system typically comprises two portions: the device interface or driver-level software and the application software, or the application. The driver-level software serves to interface the measurement hardware to the application. The driver-level software may be supplied by the manufacturer of the measurement hardware or by some other third party software vendor. An example of measurement or DAQ driver-level software is NI-DAQ from National Instruments Corporation. The application or client is typically developed by the user of the measurement system and is tailored to the particular function which the user intends the measurement system to perform. The measurement hardware manufacturer or third party software vendor sometimes supplies the application software for certain applications which are common, generic or straightforward.

A measurement task typically involves the transmittal of one or more signals through various components and/or devices in the measurement system. Thus, in all but the simplest measurement systems, one or more signal routes must be determined as part of the configuration of the measurement system to perform a specified measurement task. For example, a user must typically specify input, output, trigger, and/or synchronization signal routes through the components of a measurement devices. Furthermore, when multiple devices are included in the measurement system, additional inter-device routing must be determined and specified, which may complicate the routing determination process substantially.

In prior art systems, it is often necessary to manually configure the various routes in the task. In many measurement systems, there may be multiple routes through the devices or devices which may each provide the necessary routing functionality for the specified task. However, some of the routes may be more efficient than others. Therefore, a user may need to carefully analyze each prospective route to determine which is most suitable for the task, an effort which may be tedious and error prone.

In general, once routes have been determined for a measurement system, they do not change. In other words, routes are generally static. However, in some multi-device measurement systems, such as, for example, automated manufacturing systems, the equipment roster for the system may change dynamically. Thus, the constraints on system routing may change correspondingly, requiring a user to re-analyze the system to manually determine new routes to perform the same (previous) task.

In many measurement tasks, a signal may need to be modified during routing. For example, a digital signal may need to be inverted, pre-scaled, filtered, and/or delayed before reception by a particular component or device. As mentioned above, routing is typically specified as a source-destination pair, where each source-destination pair uses a predetermined path in hardware. In prior art systems, signal modification is generally simple due to the fact that all of the signal modification cases can be predetermined. In other words, signal modification can be predetermined because routes for a source-destination pair can be predetermined.

However, prior art approaches generally do not facilitate the configuration of multiple signal modifiers between the source and destination, which may result in underutilization of hardware resources. For example, as FIG. 13A shows, two signal inverters may be configured between the source and destination of a route. A traditional Application Programming Interface (API) would be limited to configuring only one of the inverters between the source and destination, resulting in underutilization of the hardware. If a traditional API were used to configure both inverters, then multiple API calls or parameters would be needed.

Additionally, traditional APIs do not account for the effect of multiple inverters on a signal. For example, a signal that has been inverted twice is logically equivalent to a signal that has not been inverted. Since traditional API's only evaluate a route's source and destination, they cannot program the components of the route with much flexibility.

Furthermore, routing across devices using a traditional API is generally only achievable by breaking up a multi-device route into two or more component routes. An example of a route spanning multiple devices is illustrated in FIG. 13B, where the route source is located in device A 1308A, and the route destination is located in device B 1308B. The user is then responsible for maintaining the modification of the signal across the devices. For example, if device A has a signal inverter 1306, as shown, and device B does not, then a route spanning both devices will need to be specified so that the sub-route in device A 1308A inverts the signal and the sub-route in device B 1308B does not. Breaking up the route may thus require the user to understand the capabilities of both devices in order to specify the multi-device route.

In traditional routing systems, there are typically a set number of route destinations. Each of these route destinations has a defined set of sources. For the most part, the routes (as defined by their destinations) do not overlap or share routing resources. This allows route tracking for traditional routing systems to be very minimal or non-existent. Even when route tracking is provided, the routes are tracked as source/destination pairs. Traditional routing systems do not typically need more granularity than these simple source/destination pairs.

In some measurement systems, multiple routes may traverse respective components which are similar in function and configuration. In other words, the respective components are substantially interchangeable from a functional perspective. In prior art systems, routes defined or managed at the level of source/destination terminal pairs cannot easily share hardware resources. Therefore, it would be desirable to define and manage routes at a higher granularity so that routes or sub-routes may share resources.

As mentioned above, customers often must create measurement systems in order to perform their desired measurement tasks. These measurement systems are often composed of multiple measurement devices which generally need to communicate with one another for the purposes of timing and synchronization. When a customer receives a new device, they must first learn the connectivity of the device before integrating it into the measuring system. A good way to learn the connectivity of a device is to view all the possible routes the device can make. This allows the customer to weigh the options they have for the integration of the device into the measurement system. The presentation of possible routes in a device or system is referred to as "meta-routing".

Prior art solutions for presenting device routability involve using hand-built static tables. These tables are typically in the form of paper or digital media. There are a number of drawbacks to this method of presentation. First, the routability table must be built and maintained by hand. This requires time and effort at the expense of documentation and software development tasks. Additionally, because the table is built by hand, the table is prone to mistakes. Second, when a device is modified or functionality is added, the routability table may need to be amended, which increases the likelihood for a number of errors. For example, the person responsible for making the routability table may forget to update the table. Additionally, any pre-existing documentation will not be updated because once paper documentation is printed, it is not changeable. Thus, in the event of an amendment, any old copies of the document would need to be found and replaced with the new amended document.

Device families also present a problem for this approach, in that while devices in a family are normally exactly the same in most respects, they often differ slightly in terms of routability. This generally requires routability tables to have a number of annotations or footnotes detailing these differences. Finally, in general, routability tables are available in multiple places, i.e., there is generally no central location for all device routability tables, due to the fact that multiple APIs for routing are often used. Thus, maintaining synchrony and consistency between the various routability tables may be problematic.

Therefore, for at least a portion of the reasons given above, it would be desirable to provide new systems and methods for performing routing in a measurement task.

SUMMARY OF THE INVENTION

Various embodiments of a system and method for dynamically determining routing with signal modifications in a measurement system are provided. The system may include a computer system and one or more measurement devices. The one or more measurement devices may comprise a measurement hardware device, a virtual measurement device and/or other types of devices. The signal modifications may include one or more of signal inversion, synchronization, filtering, pre-scaling, and logical combination with a signal from another terminal, among others.

The routing system, also referred to as the routing manager, may receive information specifying a route from a source terminal to a destination terminal in the measurement system, where the information includes one or more signal modification requirements for the route. The route may be a single device route, where the source terminal and the destination terminal are both included in a single device in the measurement system, or a multi-device route, where the source terminal is include in a first device in the measurement system, and the destination terminal is included in a second device in the measurement system.

A current signal modification of the route may be determined. As used herein, the term "current signal modification", which also may be referred to as the native signal modification of the route, refers to the signal modifications, e.g., inversions, synchronizations, etc., present on the route before the routing manager attempts to satisfy the route's specified or desired signal modifications. For example, if portions of the route, i.e., legs or components of the route, are shared with a pre-existing route, the shared legs or components may include signal modifications set by or for the pre-existing route. These signal modifications are constraints for the current route determination, in that modifying them would interfere with the pre-existing route. Thus, the signal modifications which were set in a prior route determination may not be changed to meet the signal modification requirements for the route.

In one embodiment, the current signal modification of the route also includes information indicating signal modifications for legs or components of the route that are not shared with a pre-existing route. These signal modifications may comprise default signal modifications for the components. In other words, if a component or leg of the route has not been previously reserved or set, then the method may assume a signal modification setting for the component which is "most natural" for the component, e.g., a 'no inversion' setting. One or more desired changes in the signal modification of the route may be determined based on the signal modification requirements and the current signal modification of the route. In other words, the desired changes in the signal modification of the route are the signal modification requirements which are not met by the current signal modification of the route. The route may be modified to include at least a portion of the desired changes in the signal modification of the route, thereby generating a modified route which satisfies at least a portion of the signal modification requirements for the route. A determination may be made as to whether the modified route satisfies the signal modification requirements for the route, and if the modified route does not satisfy the signal modification requirements for the route, an error message may be generated. The modified route may then be stored, where the modified route is usable to route signals in performing the measurement task.

In one embodiment, the received information also includes a graph of possible routes from the source terminal to the destination terminal. Modifying the route to include at least a portion of the desired changes in the signal modification of the route may include walking the legs of the route in the graph, and replacing at least one of the legs with an alternative leg which includes at least one of the desired changes in the signal modification of the route.

For example, a current (e.g., a first) leg of the one or more legs of the route may be selected, and a determination made as to whether alternative legs for the current leg exist, i.e., whether the signal modification for the leg has already been set in a prior route determination. If alternative legs exist, then for at least one of the alternative legs, signal modification of the current leg may be compared with signal modification of the alternative leg. If replacement of the current leg with the alternative leg in the route fulfills at least a portion of the desired changes in signal modification for the route, the current leg may be replaced with the alternative leg. The desired changes in signal modification for the route may then be modified to reflect the replacement. If there are more desired changes in signal modification for the route to be made, and more legs of the route to walk, then a next leg of the route may be selected as the current leg, and the above process repeated until there are no more changes to be made, i.e., all of the signal modification requirements have been met, or there are no more legs in the route. If there are no more legs to process, and the signal modification requirements have not been satisfied, then an error message may be generated, e.g., the route may fail.

In one embodiment, the method may include dynamically determining the route prior to receiving the information specifying the route. The routing manager may receive input specifying the source terminal and destination terminal in the measurement system. A topography description may also be received, where the topography description indicates a plurality of components in a device in the measurement system and connectivity between each of the components. In one embodiment, the topography description for a device may also include configuration information specifying one or more operational parameters for the respective components of the device. In a multi-device route, a topography description may be received for each device. Although the method is described below regarding a single device, the method readily extends to multiple device routes, where each device has an associated graph, current signal modification, etc.

The topography description may be preprocessed to generate a graph, where the graph is a representation of possible routes in the respective device, and is usable to determine routes from the source terminal to the destination terminal. The graph may be a weighted graph, where edges in the graph are weighted in accordance with one or more metrics. Dynamically determining the route may include traversing the graph to determine a plurality of routes from the source terminal to the destination terminal, and selecting the route from the plurality of routes based on the one or more metrics.

In one embodiment, the determined route may be stored in a run-time specification which is usable to configure one or more devices to perform the measurement task, for example, by configuring the route in the device(s). Additionally, storing the route in the run-time specification may include storing the operational parameters for components of the device(s). The run-time specification may then be usable to configure the components of the device(s) using the operational parameters to implement the one or more routes. At runtime, the run-time specification may be analyzed, and the one or more routes configured in the device(s) based on the analysis.

In one embodiment, the run-time specification may include a specification of the one or more operational parameters of one or more measurement routing primitives, where each measurement routing primitive includes a software object and corresponding configuration settings. Each measurement routing primitive may be operable to implement at least a portion of the route. In one embodiment, after analyzing the run-time specification, the method may generate a run-time based on the analysis, where the run-time is executable to perform the measurement task.

Thus, in various embodiments, the present invention provides systems and method whereby routing with specified signal modifications in a measurement system may be dynamically determined for routing signals in a measurement task. The dynamically determined route may then be used to route signals with the specified signal modifications in performing the measurement task.

BRIEF DESCRIPTION OF THE DRAWINGS

A better understanding of the present invention can be obtained when the following detailed description of the preferred embodiment is considered in conjunction with the following drawings, in which.

Figure 1A:
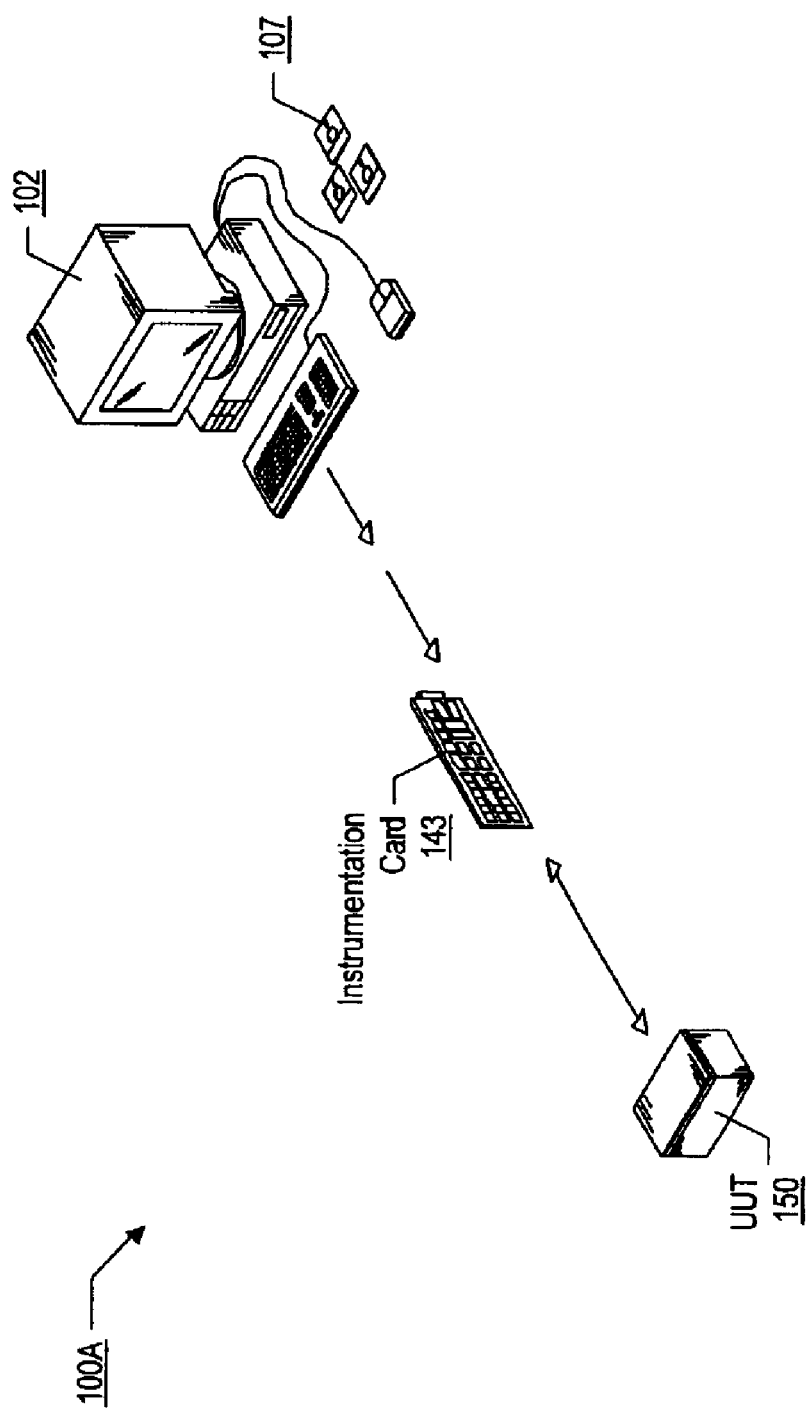
FIGS. 1A–1C illustrate representative instrumentation and process control systems including various I/O interface options.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

The following U.S. patent applications are hereby incorporated by reference as though fully and completely set forth herein:

U.S. application Ser. No. 10/008,792 titled "Measurement System Software Architecture for Easily Creating High-Performance Measurement Applications" filed Nov. 13, 2001, whose inventors were Geoffrey Schmit, Brent Schwan, Jonathan Brumley, Thomas A. Makowski and Christopher T. Bartz, now abandoned;

U.S. Provisional Application Ser. No. 60/301,785 titled "Measurement System Software Architecture for Easily Creating High-Performance Measurement Applications" filed Jun. 29, 2001, whose inventors were Geoffrey Schmit, Brent Schwan, Jonathan Brumley, Thomas A. Makowski and Christopher T. Bartz;

Pending U.S. application Ser. No. 10/010,826 titled "System of Measurements Experts and Method For Generating High-Performance Measurements Software Drivers" filed Nov. 13, 2001, whose inventors were Geoffrey Schmit, Jonathan Brumley, Brent Schwan, and Jack Levy; and Pending U.S. application Ser. No. 10/010,829 titled "Measurements Expert System and Method For Generating High-Performance Measurements Software Drivers" filed Nov. 13, 2001, whose inventors were Geoffrey Schmit, Jonathan Brumley, Brent Schwan, and Jack Levy.

Figure 1B:
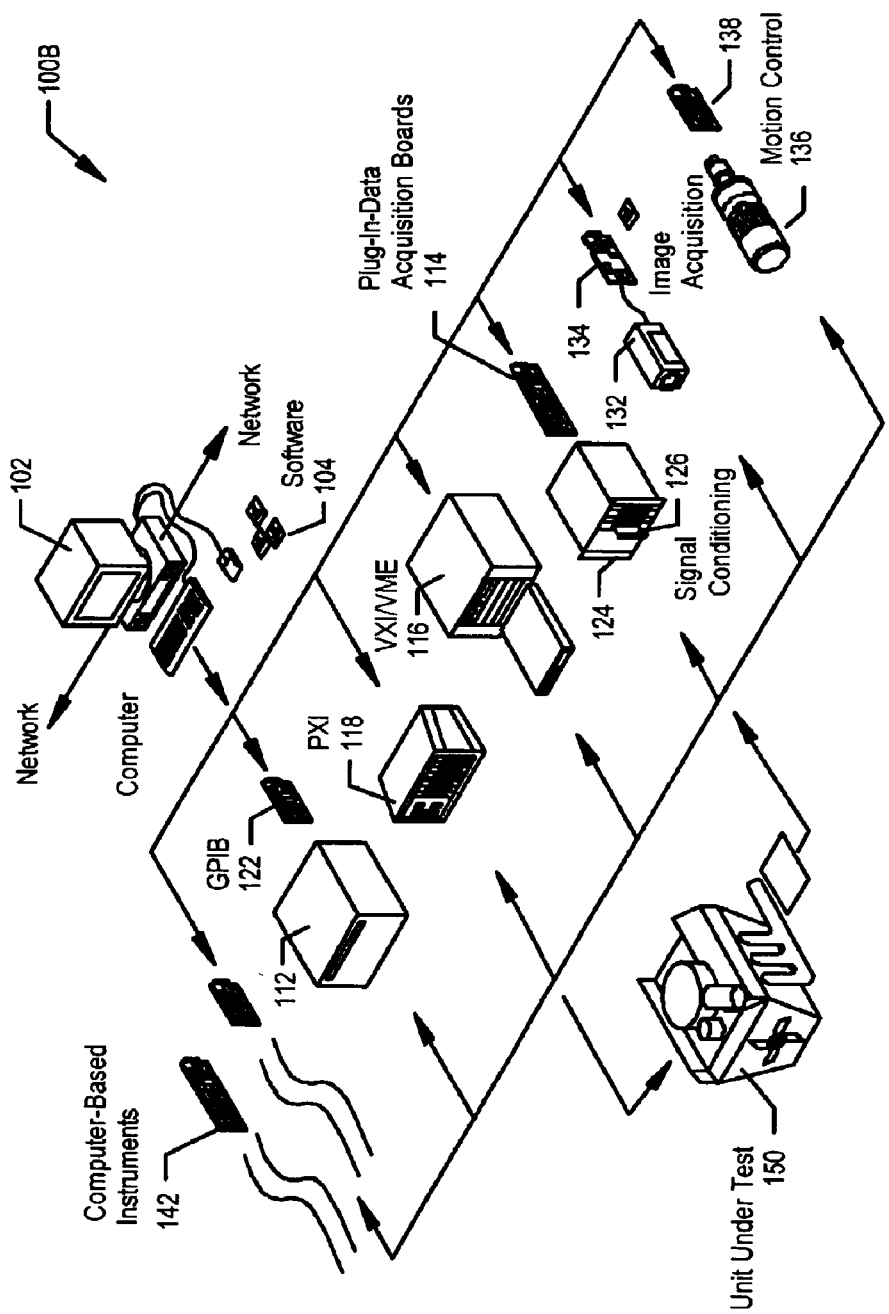
Figure 1C:
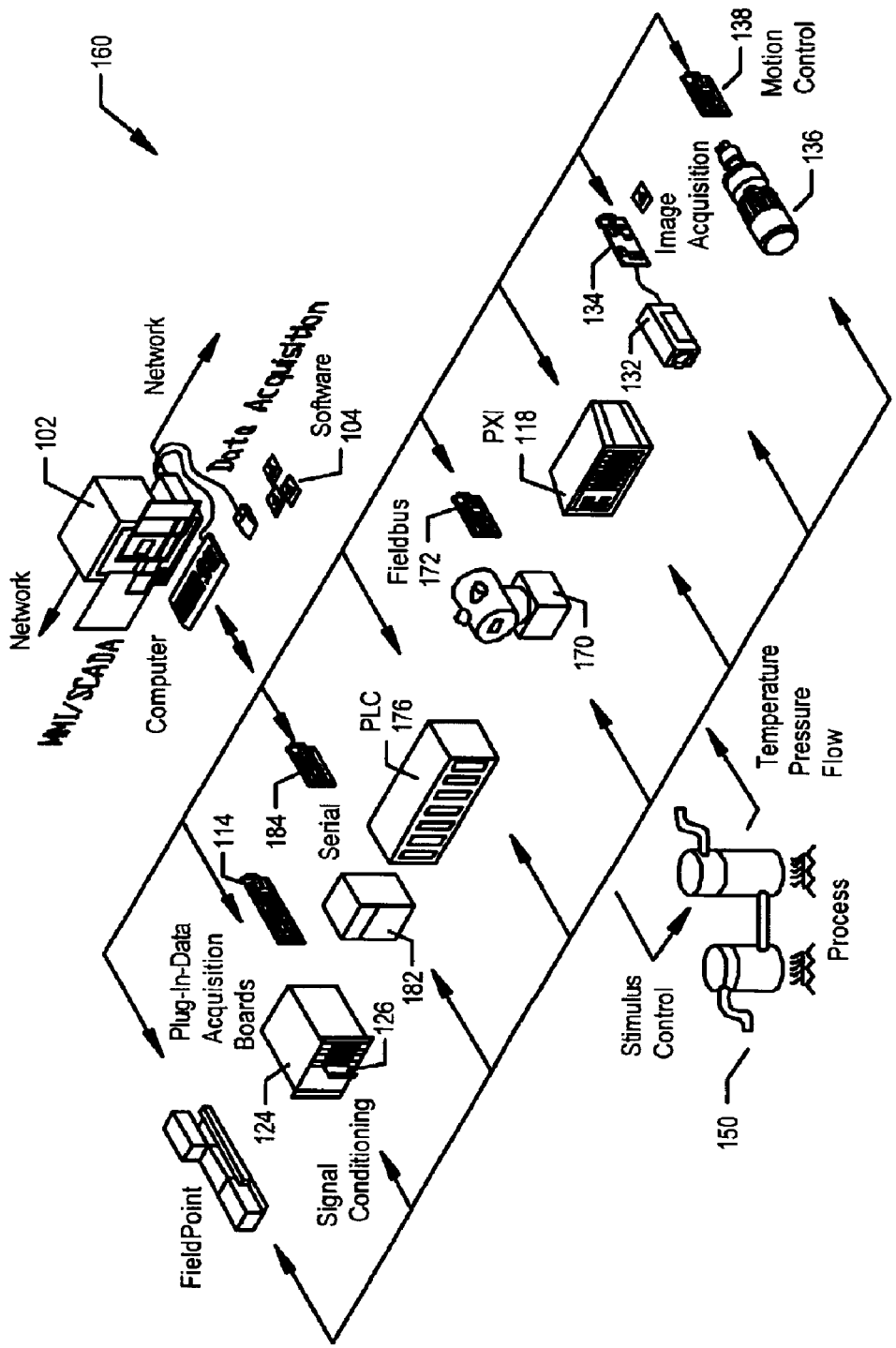

As used herein, the term "measurement system" is intended to include a single measurement device system as shown in FIG. 1A, an instrumentation system such as that shown in FIG. 1B, an industrial automation system such as that shown in FIG. 1C, or a modeling or simulation system involved with the design, validation or testing of a product involving "real world I/O", i.e., the acquisition or generation of data to/from a model or simulation of a device or product being designed, validated or tested, such as hardware-in-the loop validation. The term "measurement" may include instrumentation measurement, data acquisitions, automation, control, and simulation.

As used herein, the term "route" refers to a connection between a pair of terminals. Source and destination terminals make a terminal pair. Usually, the user only specifies one terminal for the route. For example, if the user is exporting a hardware trigger to the I/O connector, then the destination terminal is settable by the user while the source terminal is predetermined by the context of the acquisition. If the user is setting up the hardware trigger for an acquisition, then the source terminal is settable by the user while the destination terminal is a predetermined internal terminal on the device. Routing may encompass a variety of hardware components, including, but not limited to, static and dynamic digital multiplexers, connections, connectors, and signal modifiers, described below.

As used herein, the term "single-device route" refers to a connection between two terminals on the same physical device. In prior art systems, all routes were generally single-device routes. In order to route between two devices, it was necessary for the user to pick a trigger line, export a signal from the source device to the trigger line, and import the signal with the destination device. In effect, users had to piece together routes between devices using single device routing to emulate a multi-device routing.

As used herein, the term "multi-device route" refers to a connection between two terminals where the two terminals are on different devices. In order to create a multi-device route, the source and destination devices may be required to share a trigger bus together physically and logically.

FIGS. 1A–1C—Instrumentation and Industrial Automation Systems

FIGS. 1A–1C illustrate exemplary measurement and automation systems. As used herein, the term "measurement system" is intended to include the types of measurement systems and automation systems shown in FIGS. 1A–1C, as well as other types of systems. The measurement system shown in FIGS. 1A–1C may include software programs according to one embodiment of the present invention. These programs may of course be stored in or used by other types of systems as desired. In accordance with one embodiment of the present invention, the present system and method includes novel software programs for specifying and performing routing functions in measurement and automation tasks (collectively referred to as "measurement tasks").

FIG. 1A illustrates an exemplary measurement system 100A comprising a host computer 102 which connects to a measurement device, in this example, an instrumentation card 143. It should be noted that the instrumentation card 143 is but one example of a measurement device suitable for using the present invention. For example, in other embodiments, the measurement device may be a stand-alone device, such as an oscilloscope, or a chassis, e.g., a PXI chassis, which contains one or more PXI instrumentation cards. The host computer 102 connects through the measurement device 143 to analyze, measure, or control a unit under test (UUT) or process 150. Thus, the measurement device 143 may be operable to receive signals from the UUT 150, process the signals, and send the signals to the host computer system 102, where the signals may be processed further, analyzed, stored, and/or transmitted to other systems, as desired. Conversely, in another embodiment, the measurement device 143 may be operable to receive commands or requests from the host computer 102, and generate a signal to the UUT 150, e.g., for excitation or stimulation. Thus, the measurement device 143 may be a signal acquisition and/or a signal generation device, as desired.

The measurement device 143 may include a plurality of components, such as multiplexers (MUXs), counters, I/O terminals, etc., for routing and/or controlling signals communicated between the UUT 150 and the host computer 102. As noted above, there may be a number of different routes through the measurement device 143, one or more of which may be more suitable for a particular measurement task than the others. The host computer 102 may store and execute one or more software programs for programmatically determining the plurality of routes through the measurement device 143, as will be described in detail below.

FIG. 1B illustrates an exemplary instrumentation control system 100B. The system 100B may comprise host computer 102 which connects to one or more devices or instruments. The host computer 102 may comprise a CPU, a display, memory, and one or more input devices such as a mouse or keyboard, as shown. The host computer 102 connects through the one or more instruments to analyze, measure, or control a unit under test (UUT) or process 150.

The host computer 102 may execute a program which interacts with or controls the one or more instruments. The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition card 134, a motion control device 136 and associated motion control interface card 138, and/or one or more computer based instrument cards 142, among other types of devices. Note that the computer based instrument card 142 may be a board or card with one or more FPGAs, one or more CPUs and memory, or various combinations of the two.

The GPIB instrument 112 may be coupled to the computer 102 via the GPIB interface card 122 provided by the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and may interface through signal conditioning circuitry 124 to the UUT. The signal conditioning circuitry 124 may comprise an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes. These cards 122, 134, 138, 114 may also be connected to the computer 102 through a USB (Universal Serial Bus), IEEE 1394 or 1394.2 bus provided by the computer 102.

The VXI chassis or instrument 116 may be coupled to the computer 102 via a VXI bus, MXI bus, or other serial or parallel bus provided by the computer 102. The computer 102 may include VXI interface logic, such as a VXI, MXI or GPIB interface card (not shown), which interfaces to the VXI chassis 116. The PXI instrument may be coupled to the computer 102 through the computer's PXI bus. The PXI chassis may be coupled to the computer 102 via a MXI-3 bus.

A serial instrument (not shown) may also be coupled to the computer 102 through a serial port, such as an RS-232 port, USB (Universal Serial bus) or IEEE 1394 or 1394.2 bus, provided by the computer 102.

In typical instrumentation control systems an instrument of each interface type may not be present, and in fact many systems may only have one or more instruments of a single interface type, such as only GPIB instruments. The instruments are coupled to the unit under test (UUT) or process 150, or are coupled to receive field signals, typically generated by transducers. The system 100B may be used in a data acquisition and control application, in a test and measurement application, a process control application, a man-machine interface application, or a simulation application.

FIG. 1C illustrates an exemplary industrial automation system 160. The industrial automation system 160 may be similar to the instrumentation or test and measurement system 100B shown in FIG. 1B. Elements which are similar or identical to elements in FIG. 1B have the same reference numerals for convenience. The system 160 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition), portable or distributed data acquisition, process control, advanced analysis, or other control. In FIG. 1C, the computer 102 may execute a program that is involved with the automation function performed by the automation system 160.

The one or more devices may include a data acquisition board 114 and associated signal conditioning circuitry 124, a PXI instrument 118, a video device 132 and associated image acquisition card 134, a motion control device 136 and associated motion control interface card 138, a FieldBus device 170 and associated FieldBus interface card 172, a PLC (Programmable Logic Controller) 176, a serial instrument 182 and associated serial interface card 184, or a distributed data acquisition system, such as the FieldPoint system available from National Instruments, among other types of devices.

The DAQ card 114, the PXI chassis 118, the video device 132 and image acquisition card 134, and the motion control device 136 and motion control interface card 138 may be coupled to the computer 102 as described above. The serial instrument 182 may be coupled to the computer 102 through a serial interface card 184, or through a serial port, such as an RS-232 port, provided by the computer 102. The PLC 176 may couple to the computer 102 through a serial port, Ethernet port, or a proprietary interface. The FieldBus interface card 172 may be comprised in the computer 102 and interfaces through a FieldBus network to one or more FieldBus devices. Each of the DAQ card 114, the serial card 184, the FieldBus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 1A–1C, the computer system 102 and/or one or more of the instruments or devices may include a memory medium (or memory mediums) on which software according to the present invention may be stored. The memory medium may store one or more experts and a plurality of measurement routing primitives. Additionally, the memory medium(s) may store various products produced by or with these software components, such as a run-time specification described in more detail below. In some embodiments, the memory medium may also store a measurement task specifier, an expert system, additional experts, a run-time builder, and a plurality of additional measurement primitives. Additionally, the memory medium (s) may store other products produced by or with these software components, such as a measurement task specification and a run-time, also described in more detail below.

The term "memory medium" is intended to include an installation medium, e.g., a CD-ROM, floppy disks 104, or tape device; a computer system memory or random access memory such as DRAM, SRAM, EDO RAM, RRAM, etc.; or a non-volatile memory such as a magnetic media, e.g., a hard drive, or optical storage. The memory medium may comprise other types of memory as well, or combinations thereof.

In addition, the memory medium may be located in a first computer in which the programs and/or data are stored or executed, or may be located in a second different computer which connects to the first computer over a network, such as the Internet. In the latter instance, the second computer provides the program instructions to the first computer for execution. Also, the computer system 102 may take various forms, including a personal computer system, mainframe computer system, workstation, network appliance, Internet appliance, personal digital assistant (PDA), television set-top box, instrument, or other device. In general, the term "computer system" can be broadly defined to encompass any device having at least one processor which executes instructions from a memory medium.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

In one embodiment, the software programs and software architecture as described herein may be designed for measurement systems, including data acquisition/generation, analysis, and/or display; automation systems; simulation systems; systems for controlling, modeling, or simulating instrumentation or industrial automation hardware; and systems for controlling, modeling or simulating systems or devices being designed, prototyped, validated or tested. However, it is noted that the present invention can be used for a plethora of applications and is not limited to instrumentation or industrial automation applications. In other words, FIGS. 1A–1C are exemplary only, and the software programs and software architecture may be used for any of various purposes and may be stored in and execute on any of various types of systems to perform any of various applications.

Figure 2:
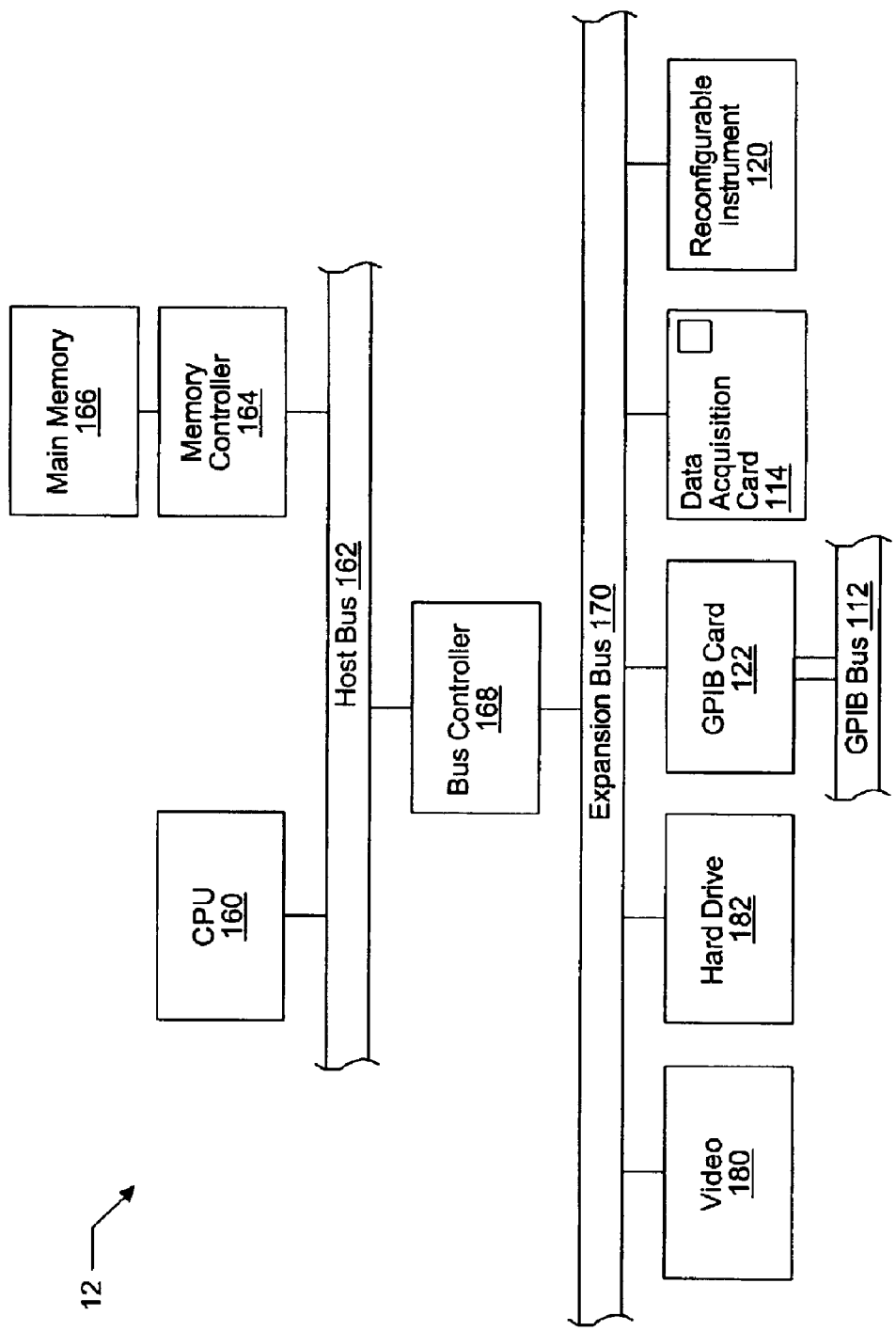
FIG. 2 is a block diagram of the computer system of FIGS. 1A–1C.

FIG. 2—Computer System Block Diagram

FIG. 2 is an exemplary block diagram of the computer system illustrated in FIGS. 1A–1C. It is noted that any type of computer system configuration or architecture can be used in conjunction with the system and method described herein, as desired, and FIG. 2 illustrates a representative PC embodiment. It is also noted that the computer system may be a general purpose computer system such as illustrated in FIGS. 1A–1C, a computer implemented on a VXI card installed in a VXI chassis, a computer implemented on a PXI card installed in a PXI chassis, or other types of embodiments. The elements of a computer not necessary to understand the present invention have been omitted for simplicity.

The computer 102 includes at least one central processing unit or CPU 160 which is coupled to a processor or host bus 162. The CPU 160 may be any of various types, including a x86 processor, e.g., a Pentium class; a PowerPC processor; a CPU from the SPARC family of RISC processors; as well as others. Main memory 166 is coupled to the host bus 162 by means of memory controller 164. The main memory 166 may store one or more computer programs or libraries according to one embodiment of the present invention, e.g., routing management software. The main memory 166 also stores operating system software as well as the software for operation of the computer system, as well known to those skilled in the art.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 1B), a GPIB interface card 122 which provides a GPIB bus interface to the GPIB instrument 112 (of FIG. 1B), and a reconfigurable instrument 120. Note that as used herein, the term "reconfigurable instrument" refers to an instrument with one or more of:

1) a processor and memory which is capable of being configured by a user or software program; and/or 2) reconfigurable logic, such as an FPGA (Field Programmable Gate Array).

For more information on a reconfigurable instrument which includes an embedded processor and embedded memory, please see U.S. Pat. No. 6,173,438 which is hereby incorporated by reference in its entirety as though fully and completely set forth herein. For more information on a reconfigurable instrument which includes reconfigurable hardware, e.g., an FPGA, please see U.S. Pat. No. 6,219,628 which is hereby incorporated by reference in its entirety as though fully and completely set forth herein. The computer 102 may further comprise a video display subsystem 180 and hard drive 182 coupled to the expansion bus 170.

Figure 3:
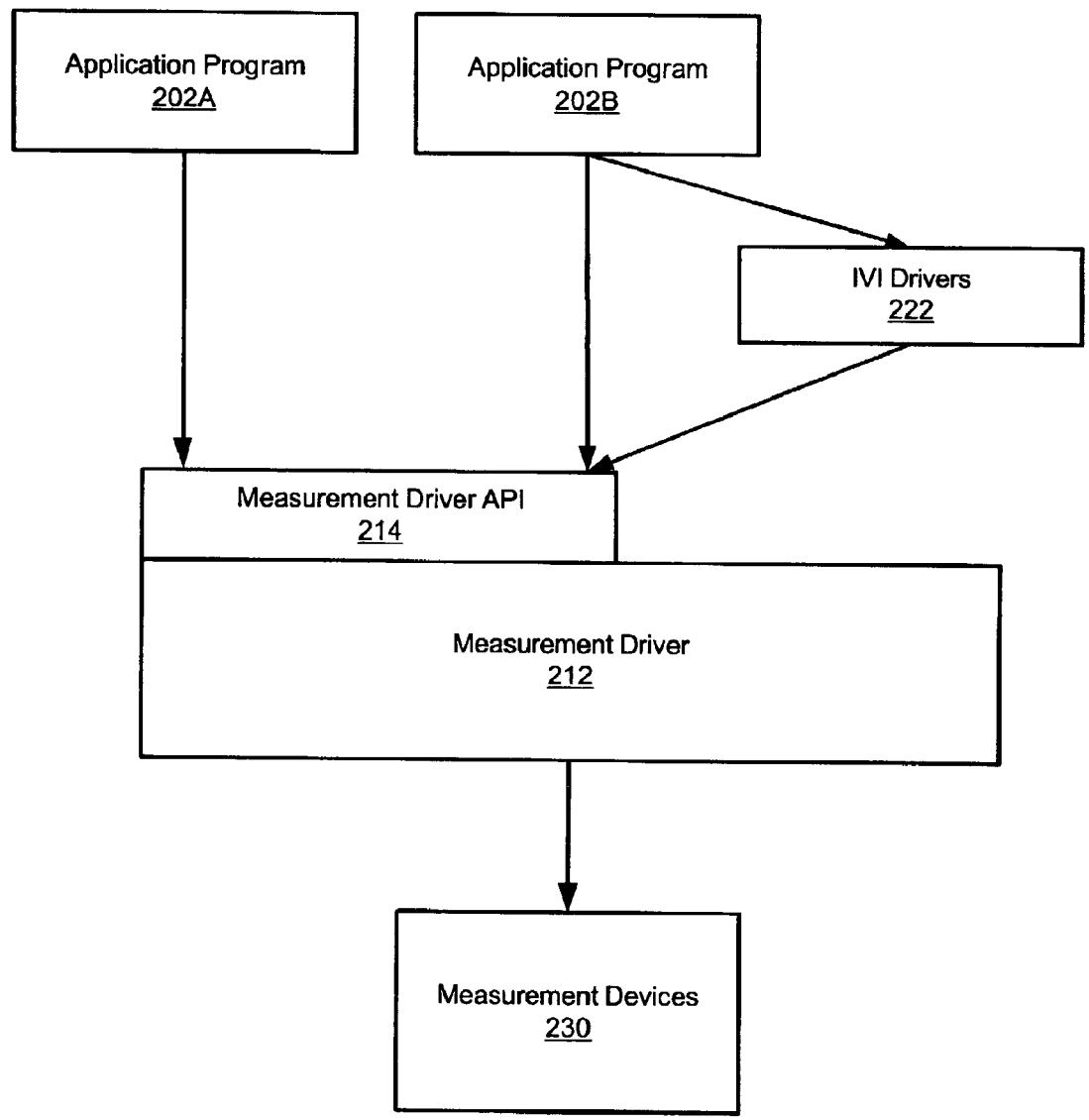
FIG. 3 illustrates one embodiment of a software architecture of a measurement system.

FIG. 3—Creating a Measurement Solution

FIG. 3 illustrates one embodiment of a software architecture for a system such as a measurement system. As shown, the system may include one or more application programs 202. The application programs are typically developed by a user to accomplish a certain task or achieve a certain result. Thus, the application program is typically a user created or developed program to solve a desired problem or accomplish a desired result for the user. The application program 202 may be developed in any of various development environments. For example, the application program may be an application developed in the LabVIEW graphical programming environment of National Instruments Corporation. The application program 202 may also be developed in other applications, such as National Instruments Measurement Studio, Visual Basic, Visual C++, Delphi, or other programming development environments. Thus, the application program may be developed in graphical programming environments such as LabVIEW, or a text-based programming environment such as Measurement Studio or Visual Basic. The application program 202 may thus comprise the customer's entire measurement system, and may include many more features and functions in addition to managing the particular measurement task specification and run-time generation, such as data analysis, report generation, or other higher-level functions of the measurement system.

As shown, the application 202 communicates with a measurement driver 212. The measurement driver 212 may include a measurement driver application programming interface (API) 214. As shown, the application program 202A or 202B interfaces with the measurement driver API 214 in order to access capabilities of the measurement driver 212. In this measurement example, the software architecture may also include interchangeable virtual instrument (IVI) drivers 222 wherein the application program 202B may interface through IVI drivers 222, which interface with the measurement driver API 214, to interface with the measurement driver 212.

The measurement driver 212 interfaces to the one or more various measurement devices 230 comprised in this system. The measurement devices 230 may comprise any of the various devices discussed above with respect to FIGS. 1A–1C and may comprise other devices not shown in FIGS. 1A–1C as desired. In one embodiment, at least one of the one or more measurement devices comprises a hardware measurement device. In another embodiment, at least one of the one or more measurement devices comprises a virtual measurement device.

In one embodiment, the present invention provides an improved system and method for dynamically determining routing in a measurement system for a specified measurement task. Thus, the measurement driver software 212 may include various components for determining, analyzing, and specifying routing functionality in the measurement system, as described below. The components related to programmatic and dynamic route determination for the measurement system may be referred to collectively as a routing manager.

Figure 4:
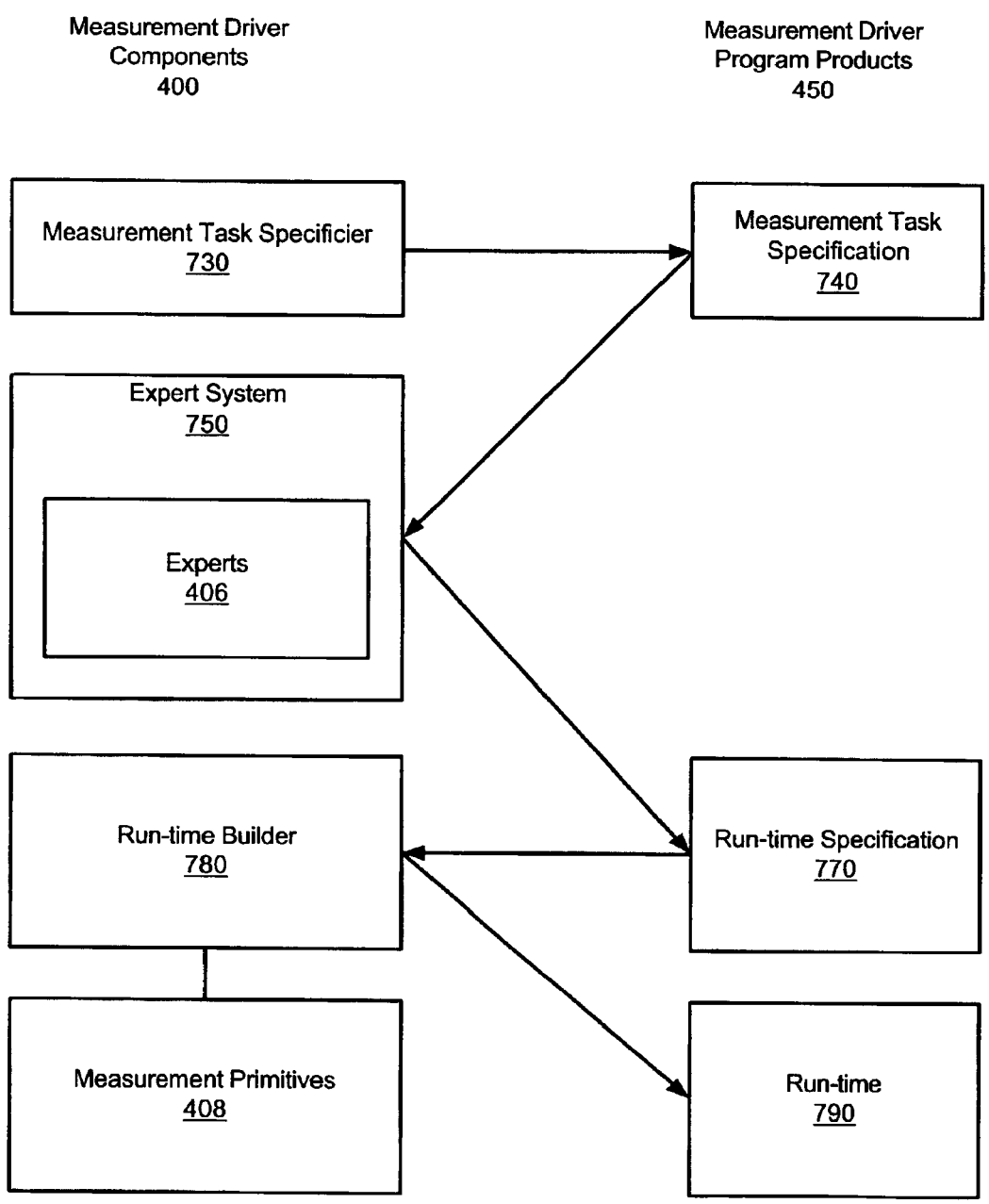
FIG. 4 illustrates measurement driver program components, according to one embodiment.

FIG. 4—Measurement Driver Program Components

In various embodiments, the software programs of the present invention may cooperate with or be used in conjunction with additional programs. In other words, various embodiments of the present invention may be used in other systems, such as, for example, for specifying and performing measurement tasks. FIG. 4 illustrates various software components or programs 400 comprised in one embodiment of the measurement driver program 212. As shown, in one embodiment, the measurement driver program 212 may also include a measurement task specifier 730, a run-time builder 780, and/or various measurement primitives 408. The measurement driver 212 may also include other software components as well. As FIG. 4 also illustrates, various of the measurement driver components may be operable to generate respective products which may be useable by other measurement driver components, by other software programs or systems, or by a user. More specifically, as shown in FIG. 4, in one embodiment, the measurement task specifier 730 may be operable to generate a measurement task specification 740. In one embodiment, the measurement task specification 740 may comprise software objects or data structures, referred to as measurement specification objects (MSOs), such as C++ objects, which may specify the measurement task. In various embodiments, the measurement task specifier 730 may be a measurement task wizard, i.e., a software program which leads the user through a measurement task specification process to create the measurement task specification 740, a measurement task configuration tool, which is a software program invocable by the user under a development environment, such as the National Instruments LabVIEW environment or Measurement Studio programming development environment, or an API through which the user makes calls to generate the task specification. Thus, in various embodiments, the measurement task specifier 730 may generate the measurement task specification 740 in response to user input.

As FIG. 4 shows, the measurement driver program 212 may include an expert system 750 which may itself include one or more experts 406, e.g., routing experts. As shown, the expert system 750 may use the measurement task specification 740 to generate a run-time specification 770. As mentioned above, the expert system 750 may include one or more routing experts. The expert system 750 may also include one or more experts for each of the measurement device types shown in FIGS. 1A–1C, in addition to various other experts, including streaming experts, and synchronization experts, among others. The various experts may analyze the measurement task specification 740 and "solve" the MSOs to generate or initialize primitive settings for components, where the primitive settings may be used to configure the components to perform the specified measurement task.

In one embodiment, the run-time specification 770 may similarly comprise software objects or data structures, such as C++ objects, which may specify the run-time parameters for software and/or hardware used to implement the specified measurement task. More specifically, in one embodiment, the run-time specification 770 may include parameter specifications for one or more measurement primitives 408 which correspond to rudimentary routing tasks or operations, described in more detail below. In another embodiment, the run-time specification 770 may also include parameter specifications for one or more measurement primitives 408 which correspond to rudimentary routing tasks or operations.

The run-time specification 770 may in turn be interpreted by the run-time builder 780 to generate a run-time 790, which may be executable to perform the specified measurement task. For more details of a system for specifying and/or performing a measurement task, please see U.S. application Ser. No. 10/008,792 titled "Measurement System Software Architecture for Easily Creating High-Performance Measurement Applications" filed Nov. 13, 2001, U.S. application Ser. No. 10/010,826 titled "System of Measurements Experts and Method For Generating High-Performance Measurements Software Drivers" filed Nov. 13, 2001, and U.S. application Ser. No. 10/010,829 titled "Measurements Expert System and Method For Generating High-Performance Measurements Software Drivers" filed Nov. 13, 2001, all of which were incorporated by reference above.

As mentioned above, in one embodiment, the measurement driver program 212 may include one or more routing experts which may be operable to analyze routing requirements for a specified measurement task and determine a plurality of routes for the measurement system based on the analysis. Furthermore, in one embodiment, the one or more routing experts may be operable to determine the routes dynamically, e.g., at runtime.

Thus, in one embodiment, the expert system 750 may include a plurality of routing experts, where each routing expert represents one or more routing operations on a signal measured or generated by hardware. A given routing specification or problem, represented by a measurement specification object (MSO), may be broken up into sub-routing problems which may each be solved by an appropriate routing expert. Thus, the solution of the routing problem may involve a significant amount of branching, with subsequent sub-solutions that must be combined to generate the final routing solution. In one embodiment, a decision tree may be used to facilitate the decision process.

In another embodiment, the expert system 750 may include a single routing expert that manages routing through all routing components. In this embodiment, the routing expert may solve the routing problem with one decision. However, it should be noted that internally, multiple branches may occur, although the number of branches is preferably low, e.g., for performance reasons. In other words, the routing expert is preferably implemented so that it branches the fewest amount of times. The routing system may minimize component branching by preprocessing the topography of a static component into an optimized graph representing routes through the component, as described below.

One example where branching may occur is when a device includes a number of similar components that may effectively be interchangeable with respect to a given route. In other words, each of the components is functionally equivalent, also referred to as homogenous, and so the routing system may simply group the components together in the graph. Each component represents a route or a sub-route of a route, and so the collection of components implies route branching, although the routing system may collapse all of the grouped routes into a single branch. The routing system may make the selection of a particular component (and corresponding route) at runtime, based, for example, upon availability.

Another example of multiple solutions relates to multiplexers. As mentioned above, when routing between two terminals, multiple paths may be possible. The multiple possible paths and the corresponding settings may be encoded into primitive settings which may be stored for use at runtime. This may allow alternatives if a particular path is not available due to resource conflicts. Of course, if there are multiple paths between two terminals, the paths may be sorted based upon cost, so that the best available route may be chosen. Encoding multiple solutions into the primitive settings provides a compromise of maximizing flexibility while keeping routing deterministic.

Thus, when a route has multiple possible solutions, the routing system may pre-compute a set of choices that can possibly satisfy the route specification. Situations such as these may occur whenever the routing system encounters an array of homogeneous routing resources while traversing the device topographies.

Figure 5:
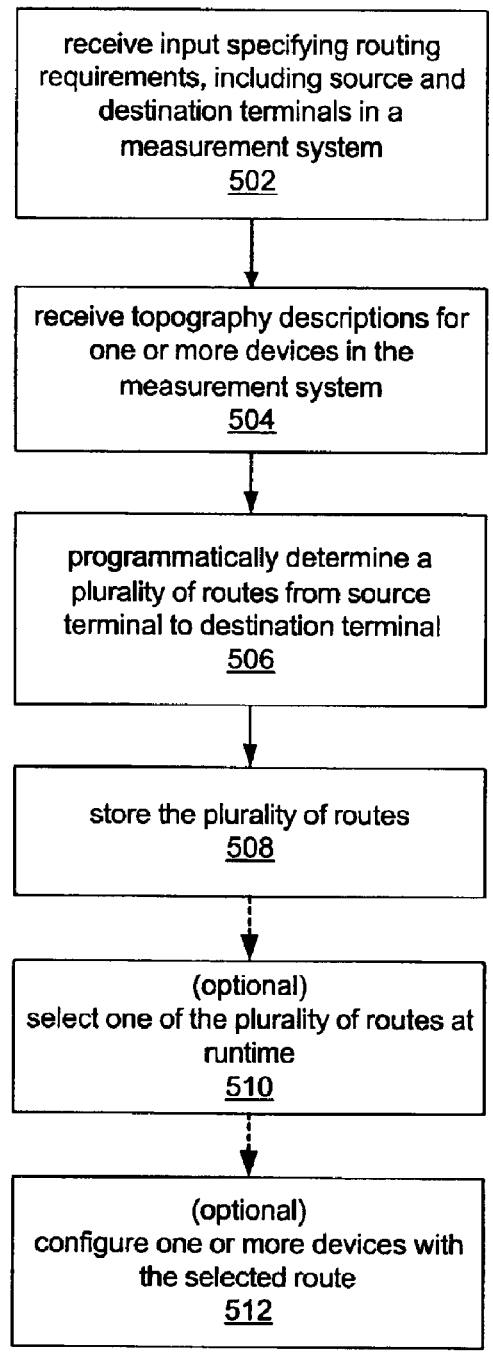
FIG. 5 flowcharts a method for performing dynamic routing in a measurement system, according to one embodiment.

FIG. 5—Method for Performing Dynamic Routing for a Measurement Task

FIG. 5 is a flowchart diagram illustrating one embodiment of a method for performing dynamic routing in a measurement system, the method being used to determine and configure routing in installed measurement hardware and/or software devices in the measurement system to perform a measurement task. In one embodiment, the measurement task may comprise a plurality of measurement sub-tasks. In another embodiment, the measurement task may comprise a complex measurement operation using a plurality of measurement devices. It is noted that the flowchart of FIG. 5 is exemplary only. Further, various steps in the flowchart of FIG. 5 may occur concurrently or in different order than that shown, or may not be performed, as desired. Also, various steps may be added to FIG. 5 as desired.

As shown, in step 502 input may be received specifying source and destination terminals in a measurement system. In other words, a start terminal and an end terminal for a desired (yet to be determined) route may be specified by the input information.

In step 504 topography descriptions for one or more devices in the measurement system may be received. As used herein, the term "topography description" refers to information which indicates connectivity between elements in the measurement system. In one embodiment, a topographical description may be in the form of a text file, i.e., a topographical description file, specifying connections via labels, although any other approaches for indicating connectivity may also be used. In one embodiment, the topography description may indicate a plurality of components in a device in the measurement system, and connectivity between each of the plurality of components in the device. Examples of components for which topographies may be determined include, but are not limited to, STC Chip, NI-TIO Chip, RTSI Chip, RTSI Cable, Normal PXI Trigger Backplane, 18 Slot PXI Trigger Backplane with directional buffers, 6534 FPGA, 4472 FPGA, 5112 FPGA, 5620 FPGA, 5431 FPGA, 5401, FPGA, 5411 FPGA, 5421 FPGA, 4070 FPGA, Switching, and the DHV Motherboard, among others.

In another embodiment, a plurality of topography descriptions may be received respectively indicating connectivity among components of a corresponding plurality of measurement devices in the measurement system. In one embodiment, the topography description may include configuration information for one or more of the components specifying one or more operational parameters for the respective component. In yet another embodiment, a topography description may be received that indicates connectivity between various devices in a multi-device measurement system, i.e., a system map of the hardware devices. Each of these cases is discussed in more detail below with reference to FIGS. 6A–6C. It should be noted that in one embodiment, the input of step 504 may be included in the input of step 502.

In step 506, a plurality of routes from the source terminal to the destination terminal may be programmatically determined, for example, based on the received topographical descriptions of 504. More specifically, a plurality of routes may be programmatically determined which provide the necessary routing functionality for the specified measurement task. Further details of the programmatic determination of the plurality of routes are provided below with reference to FIGS. 6A–6C.

In step 508, the plurality of routes determined in 506 may be stored. In other words, information specifying the determined plurality of routes may be stored, for example, in a memory medium of the computer system 102, or in a memory medium of an external system coupled to the computer system 102. In one embodiment, storing the (information specifying) plurality of routes may include storing the routes in a run-time specification which is usable to configure one or more devices to perform the measurement task, as described above. In other words, the run-time specification may be usable to configure the plurality of routes in the device or devices.

The run-time specification 770 preferably comprises parameter settings for one or more measurement devices or device components included within the measurement system, and may also specify software components or software programs which are to be used during execution of the task. The run-time specification may comprise a specification of the parameters of one or more measurement routing primitives, where each measurement routing primitive includes a software object and corresponding configuration settings, and where each measurement routing primitive is operable to implement at least a portion of one or more signal routes in the measurement system for performing the measurement task. Thus, in an embodiment in which the topographical description for each device includes operational parameters for components of the device included in the plurality of routes, storing the routes in the run-time specification may include storing the operational parameters for components of the device included in the plurality of routes. Thus, the run-time specification may be usable to configure the components of the device using the one or more operational parameters to implement the plurality of routes.

In step 510, a route of the plurality of possible routes may optionally be dynamically determined. In other words, at runtime, a first route may be dynamically determined or selected from the plurality of routes based on a metric. For example, the route may be programmatically determined based on hardware availability, e.g., routing resource availability, as described in more detail below. It is noted that as used herein, the phrase "at runtime" refers to a point in time at or just prior to performance of the measurement task. In other words, an action or process performed "at runtime" of the measurement task is performed upon initiation or execution of the measurement task, e.g., the graphical program, just prior to the execution of the measurement task, or during execution of the measurement task. Said another way, "at runtime" refers to when (or just prior to when) the route is being committed to hardware. Thus, dynamically determining a route refers to determining the route "on the fly" at or during execution of the task.

In step 512, software executing on the computer system and/or the user may optionally configure the measurement hardware and/or software device(s) to implement the selected route. For example, the configuration registers for one or more multiplexers in a device may be set. The configuration registers can, for example, specify that the multiplexer disconnect its output (i.e. tristate on its output), thereby effectively removing the multiplexer from device operations. Once the device(s) has been configured with the route, the device(s) may be used by an application program to perform the specified measurement task, where the configured routing in the device(s) provides the specified routing functionality in the performance of the measurement task. In one embodiment, the run-time specification may be analyzed, and the route configured in the device based on the analysis.

Thus, routing management software, also referred to as a routing manager, executing on the host computer system 102 may perform the above method to determine routing in a measurement system in accordance with a specified measurement task.

In one embodiment, after the selected route has been configured in the measurement device(s) in 510, a run-time may be created which embodies or implements the measurement task based on the generated run-time specification. More specifically, the run-time specification may be analyzed, and the run-time generated based on the analysis, where the run-time is executable to perform the measurement task. The runtime may be executable to utilize the route based on the generated run-time specification. In one embodiment, the run-time may comprise a collection of measurement operation primitives (or instances of measurement operation primitives) sequenced together which are executable to implement the measurement task. For example, the run-time may comprise a collection of instances of routing operation primitives sequenced together which are executable to perform routing functions for the measurement task. After step 512 the user (or a software program) may execute the run-time to perform the measurement task. In other words, the run-time execution may invoke the various configured hardware and/or software components to perform the specified measurement task. For more details on the generation and use of the run-time, please see U.S. application Ser. No. 10/008,792 titled "Measurement System Software Architecture for Easily Creating High-Performance Measurement Applications" filed Nov. 13, 2001, incorporated by reference above.

As noted above, in some embodiments, one or more steps of the method may be omitted. In another embodiment, input specifying a source terminal and a destination terminal in a measurement system may be received, as well as at least one topography description, where the topography description indicates a plurality of components in at least one device in the measurement system, and connectivity between each of the plurality of components in the device. A plurality of possible routes from the source terminal to the destination terminal may be programmatically computed based on the topography description, and the plurality of possible routes stored in a memory. One of the plurality of possible routes is operable to be selected at runtime of the measurement task to configure the measurement system. Each of the plurality of possible routes may include or use a respective one or more routing resources in the measurement system, where one of the plurality of possible routes is operable to be selected at runtime of the measurement task based on routing resource availability.

For another example, in one embodiment, a plurality of possible routes from a source terminal to a destination terminal may already be stored, e.g., in a memory or carrier medium. Then, at runtime, the method may receive an indication that the measurement task is to be executed, programmatically determine a first route of the plurality of possible routes in response to the indication, and then configure the measurement system with the first route, thereby producing a signal path in the measurement system from the source terminal to the destination terminal. Programmatically determining the first route from the plurality of routes may include selecting the first route from the plurality of routes based on routing resource availability. In one embodiment, the measurement system may include a plurality of devices, and configuring the measurement system may include writing route configuration information to each of at least a subset of the plurality of devices to configure each device with at least a portion of the first route.

Figure 6A:
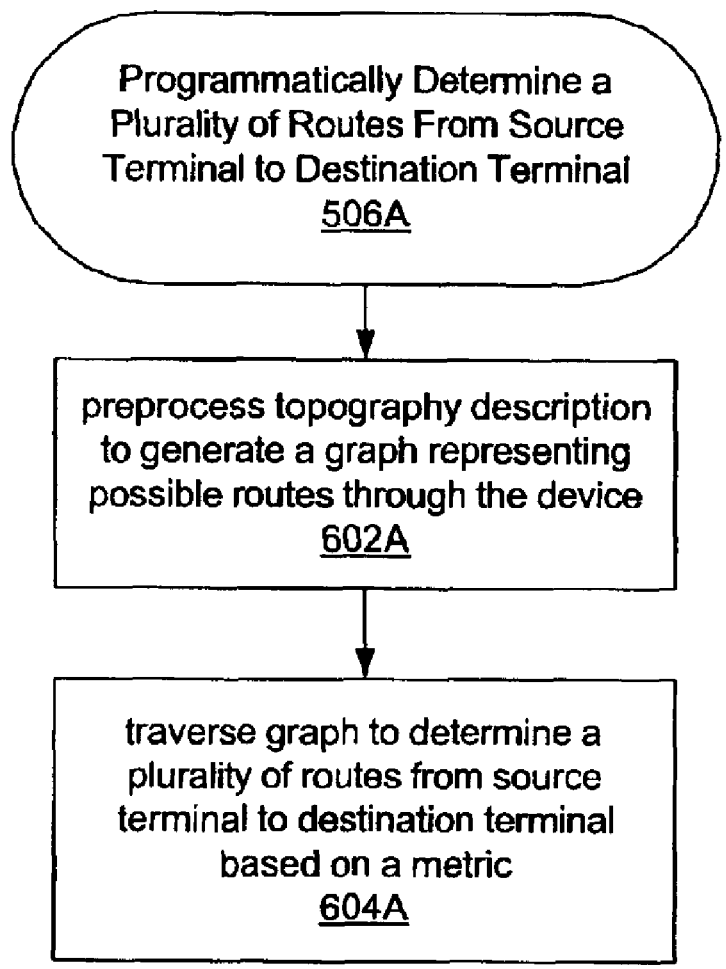
FIGS. 6A–6C flowchart various embodiments of a method for programmatically determining routes in a measurement system.
Figure 6B:
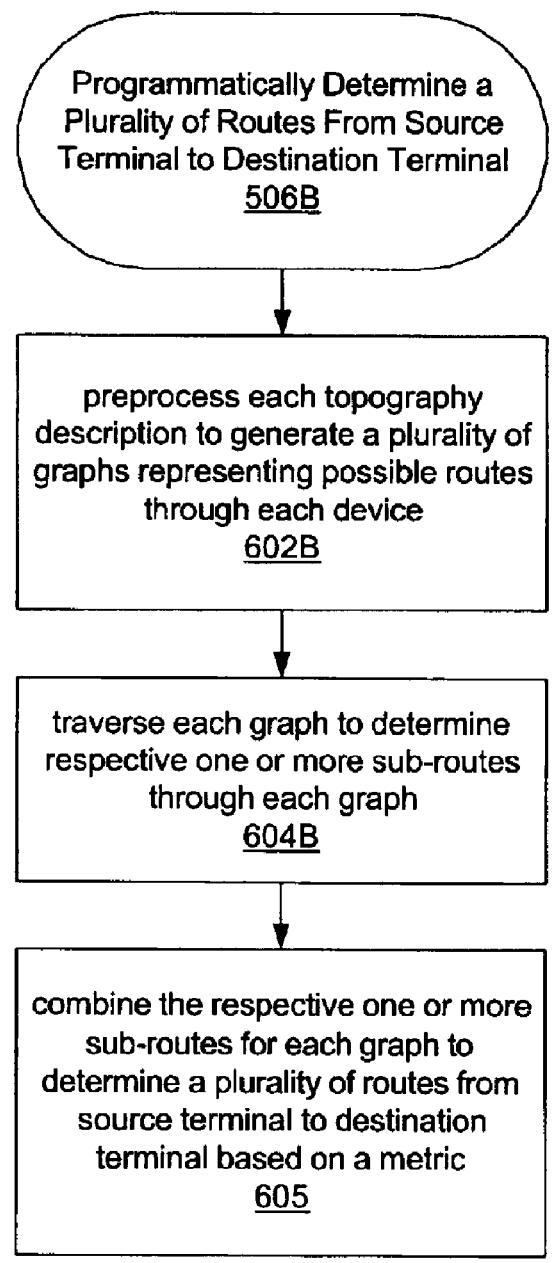
Figure 6C:
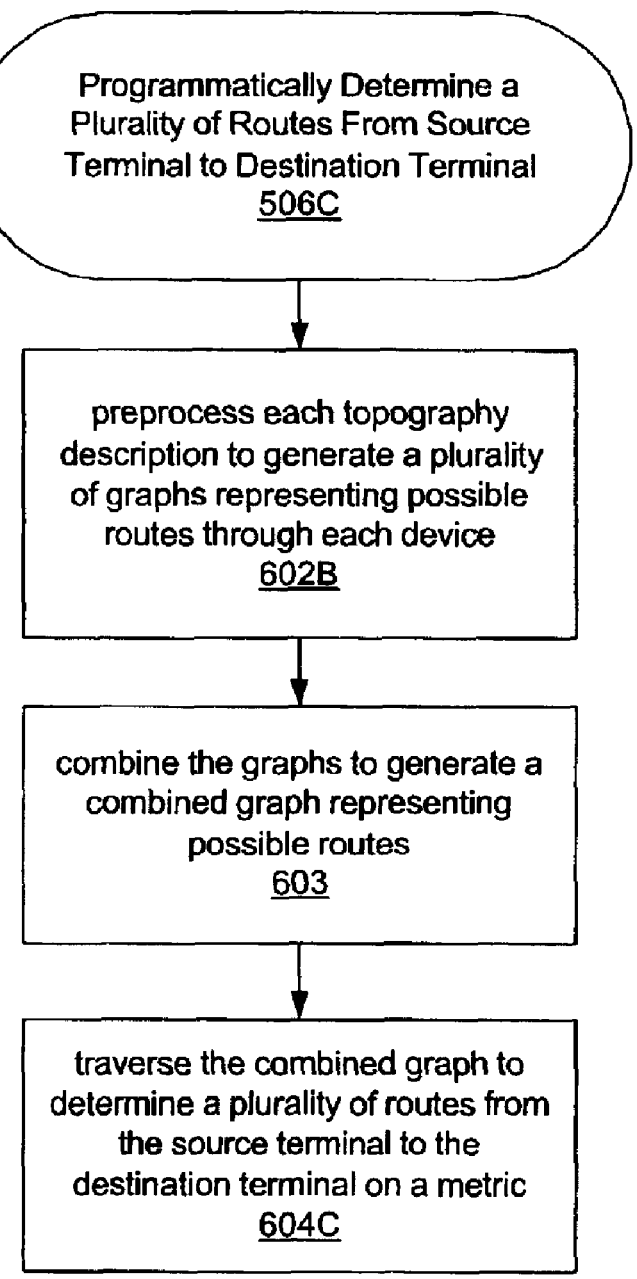

FIGS. 6A–6C—Route Determination

FIGS. 6A–6C flowchart various embodiments of step 506 above, in which plurality of routes from a source terminal to a destination terminal are programmatically determined. In particular, exemplary methods describing this step are disclosed for different measurement systems, ranging from a single-device system, as shown in FIG. 1A, to multi-device measurement systems, as shown in FIGS. 1B and 1C. It is noted that the methods presented in FIGS. 6A–6C are exemplary, and that some of the steps may be performed in a different order than shown, or may be omitted. Additional steps may also be performed as desired.

FIG. 6A is a flowchart of one embodiment of a method for programmatically determining a plurality of routes from a source terminal to a destination terminal, where the source terminal and destination terminal are both included in the same device. In other words, the computed routes are each single-device routes. FIGS. 6B and 6C flowchart two approaches to the dynamic determination of multi-device routes in a measurement system.

As FIG. 6A shows, in 602A, a received topography description may be preprocessed to generate a graph of possible routes through the device. The graph is preferably generated in a preprocess to avoid violating time constraints at runtime. I.e., depending upon the size of the graph, the graph generation (pre)process may be computationally intensive, and thus may not be suitable for performance at runtime.

As is well known in the art, a graph is a collection of nodes and edges, where each edge connects two nodes, often with a direction specified for a given edge. In one embodiment, each edge may represent a respective device, device component, or sub-component, and each node in the graph may represent a terminal of the device or device component. In other words, the graph is a structure that represents the connectivity of the measurement system, or a portion of the measurement system, as described in the topography description. In this example, the graph represents all of the connections of the components in the device, and thus compactly represents all of the possible routes in and/or through the device. In one embodiment, the graph may be a weighted graph, where the edges in the graph are weighted in accordance with a specified metric, e.g., a cost metric.

A number of different cost metrics may be used to facilitate the evaluation of routing choices. Each of these methods can be used in combination with one another, and each functions by adding weight to a graph edge. The more weight the edge has, the higher the cost of the edge. Routes with less weight are typically more desirable than heavier routes. It is noted that none of these metrics are perfect, but by combining them, useful heuristics for weighting components may result. Various examples of cost metrics are described below. It should be noted that the metrics presented are meant to be exemplary, and are not intended to limit the invention to any particular set of cost metrics.

Size Weighting: When the topography gets processed, the initial weight of the routing component is determined by looking at the number of sources and listeners of the component. This approach is based upon the idea that components with more sources and listeners are likely to be more useful. This usefulness is reflected in the weight rating of the component.

Subsystem Trespassing: Terminals in a topography may be tagged with a subsystem. Assume a board with two functions: AI and AO. Also, let some terminals be directly tied to AI or AO, meaning that if a directly tied terminal gets consumed, then there is a very likely chance the associated function will be unusable. For example, if the source input terminal for AI is used, then AI will not be usable unless it can use that identical setting. Terminals associated with AI may still be used, but only for an AI function. In this example, the source input terminal for AI may still be used for a non-AI function, but the price of the terminal may rise, e.g. by doubling its cost, since the entire AI subsystem will probably be unusable for the duration of the route.

Thus, a variety of cost metrics may be used to weight nodes in a prospective route, allowing the graph traversal algorithm to discriminate between competing routes.

As mentioned above, in another embodiment, the measurement system may be a multi-device measurement system, where a plurality of devices may communicate with one another in the performance of the measurement task. In this case, the source terminal may be comprised in a first device in the measurement system, and the destination terminal may be comprised in a second device in the measurement system. Thus, each of the plurality of routes may comprise a multi-device route. In this embodiment, a plurality of received topography descriptions may be preprocessed to generate a plurality of graphs representing possible routes through each respective device, as shown in step 602B of FIGS. 6B and 6C. In other words, a respective graph may be generated from the topography description of each device.

For example, in an embodiment where the measurement system includes two devices, a first topography description may be received which indicates a plurality of components in the first device, and connectivity between each of the plurality of components. Then, a second topography description may be received which indicates a plurality of components in the second device, and connectivity between each of the plurality of components in the second device. The first topography description may be preprocessed to generate a first graph, where the first graph comprises a representation of possible routes in the first device. Then, the second topography description may be preprocessed to generate a second graph, where the second graph comprises a representation of possible routes in the second device. Of course, the actual order in which the topography descriptions are preprocessed may vary. The first graph and the second graph may then be usable to determine the plurality of routes from the source terminal to the destination terminal, where the plurality of routes span the two devices.

For another example, consider a multi-device system in which each of the plurality of routes comprises a multi-device route through a plurality of devices in the measurement system. In other words, the source terminal may be comprised in a first device of the plurality of devices, the destination terminal may be comprised in a second device of the plurality of devices, and the first device may be coupled to the second device through one or more other devices of the plurality of devices. In this example, a plurality of device topography descriptions may be received (in 504 of FIG. 5), where each of the device topography descriptions indicates a plurality of components in a respective device of the plurality of devices, and connectivity between each of the plurality of components in the respective device. Then, each of the plurality of device topography descriptions may be preprocessed to generate a respective plurality of graphs, where each graph is a representation of possible routes in the respective device. The plurality of graphs may then be usable to determine the plurality of routes from the source terminal to the destination terminal.

After the graph (or graphs) has been generated in 602A (or 602B), then in 604A the graph may be traversed to determine a plurality of routes (or a single route, if only one route exists) from the source terminal to the destination terminal. As is well known by those skilled in the art, there is a wide variety of algorithms available for traversing a graph. An exemplary graph traversal algorithm is Dijkstra's shortest path algorithm, as is well known in the art, which finds a "best" path from one node in the graph to another node in the graph, where the term "best" connotes a cheapest path based upon a specified metric. For example, in a graph weighted to represent physical distances between nodes, the best path may be the shortest path joining the nodes, either directly or indirectly. In the course of finding the best path, all other paths in the graph from the source terminal to the destination terminal may be discovered and measured.

In one multi-device embodiment, as mentioned above, each graph may be traversed to determine or compute a respective one or more sub-routes through each graph, as indicated in 604B of FIG. 6B. For example, in the two device example from above, where the first device is coupled to the second device through a bus, the first graph may be traversed to determine a plurality of routes from the source terminal to an input terminal of the bus. Then, the second graph may be traversed to determine a plurality of routes from an output terminal of the bus to the destination terminal. The plurality of routes from the source terminal to the input terminal of the bus and the plurality of routes from the output terminal of the bus to the destination terminal may then be combined to determine the plurality of routes from the source terminal to the destination terminal. In other words, the respective one or more sub-routes for each graph may be combined to determine a plurality of routes from the source terminal to the destination terminal.

Similarly, in the multi-device example from above where the first device is coupled to the second device through one or more other devices, each of the plurality of graphs may be traversed to determine a respective one or more sub-routes through each of the plurality of graphs. The respective one or more sub-routes from each graph may then be combined to generate the plurality of routes from the source terminal to the destination terminal, as indicated in 605 of FIG. 6B.

More specifically, where the first device is coupled to a first bus, where the first bus is coupled to the second device through the one or more other devices and corresponding one or more buses, a first graph of the plurality of graphs may be traversed to determine a plurality of routes from the source terminal to an input terminal of the first bus. Then, each of one or more other graphs of the plurality of graphs may be traversed to determine a plurality of routes from an output terminal of the first bus to the destination terminal. Then, the plurality of routes from the source terminal to the input terminal of the first bus and the plurality of routes from the output terminal of the first bus to the destination terminal may be combined to determine the plurality of routes from the source terminal to the destination terminal. In other words, the respective one or more sub-routes for each graph may be combined to determine a plurality of routes from the source terminal to the destination terminal.

In another multi-device embodiment, programmatically determining a plurality of routes from the source terminal to the destination terminal may include combining the plurality of graphs to generate a combined graph, where the combined graph represents possible routes from the source terminal to the destination terminal, as indicated in 603 of FIG. 6C. Then, the combined graph may be traversed to determine the plurality of routes from the source terminal to the destination terminal, as shown in 604C of FIG. 6C.

For example, in an embodiment where the first device is coupled to a first bus, and the first bus is coupled to the second device through the one or more other devices and corresponding one or more buses, combining the plurality of graphs to generate a combined graph may include linking respective pairs of graphs of the plurality of graphs via respective nodes, where each respective node represents a respective bus of the corresponding one or more buses, and each respective bus couples a respective pair of devices corresponding to the respective pair of graphs.

In yet another multi-device embodiment, in addition to receiving a plurality of topographical descriptions corresponding to the plurality of devices in the measurement system, a system topography description may be received which indicates connectivity between the plurality of devices. The system topography description may be preprocessed to generate a system graph, where the system graph comprises a representation of possible routes through the plurality of devices. The system graph may then be traversed to determine a plurality of routes from the first device to the second device. Each of the plurality of routes from the first device to the second device may pass through zero or more of the one or more other devices. In other words, the system graph may be traversed to determine interdevice routes through the system.

The plurality of routes from the first device to the second device may then be used to generate the plurality of routes from the source terminal to the destination terminal. For example, in the embodiment described above where each of the plurality of graphs is traversed to determine a respective one or more sub-routes through each of the plurality of graphs (FIG. 6B), the respective one or more sub-routes may be combined based on the determined plurality of routes from the first device to the second device, thereby generating the plurality of routes from the source terminal to the destination terminal.

Alternatively, in the embodiment described above where the plurality of graphs are first combined to generate a combined graph (FIG. 6C), the combination may be performed based on the determined plurality of routes from the first device to the second device. The combined graph may then be traversed to determine the plurality of routes from the source terminal to the destination terminal, as described above.

In one embodiment, the plurality of routes may determined from the graph based on the metric, and the routes sorted based on the metric. Then, at runtime, the routes may be considered in the sorted order. In another embodiment, the plurality of routes may be culled against a threshold, then ranked according to the metric. In one embodiment, the best route may be selected for preferred use in performing the measurement task, but one or more secondary routes from the sorted routes may also be selected as contingency routes, for use in the case of resource conflicts detected at runtime. For example, after selecting a first or primary route from the plurality of routes, a resource conflict may be detected on the first route. A determination may be made as to whether a second or secondary route of the plurality of routes exists which circumvents the resource conflict. If such a second route exists, the second route may be selected, replacing the first route. If the second route does not exist, an error may be returned, e.g., the process may fail.

It should be noted that in some embodiments, each of the plurality of routes may traverse one or more public buses in the measurement system. For example, one or more of the public buses may be trigger buses. Examples of trigger buses contemplated include, but are not limited to, a RTSI bus, a PXI trigger backplane, and an external trigger bus. An external trigger bus may include any type of bus including, but not limited to, a simple wire or cable, a fiber optic line or cable, a wireless bus, and a switched fabric, among others. Additionally, the methods described above may include performing one or more reservation protocols for the computed routes to prevent resource conflicts on the one or more public buses, as is well known in the art. It is noted that generally, the one or more public buses provide connections between devices in a multi-device measurement system, as described above. However, in some embodiments, routes through a single device may include a public bus. In other words, a single-device route (or sub-route) may begin in the device, exit the device to the public bus, then return to the device.

In one embodiment, the routing system may arbitrate the reservation of trigger lines, for example, to avoid possible double driving scenarios. In one embodiment, the routing system may leverage PXI's trigger reservation functionality wherever possible to prevent double driving of trigger lines. Another benefit of PXI's trigger reservation functions is its ability to reserve an arbitrary line. This ability removes the necessity to branch on every trigger line over the bus. Thus, if an arbitrary trigger line is required, it may not be necessary to consider and store every trigger line. Ex. Instead of pushing 7 RTSI lines onto an internal decision tree, only one arbitrary RTSI line is pushed. Then, at runtime, the first available RTSI line may be selected from the 7 RTSI lines.

Initialization and Device Detection

As mentioned above, multi-device routes may be determined in a system with multiple heterogeneous devices linked together with diverse bus types. The following describes initialization and device detection for the routing system described above, according to one embodiment. Upon initialization of the routing system, the over-all map or graph of the measurement system may be empty. As the measurement system, e.g., software executing on the computer system 102, recognizes devices associated with the system, information indicating the devices may be passed to the routing system one by one. When a device is removed from the measurement system, these same steps may be performed in reverse.

First, a device may be recognized and passed to the routing system. When the device gets added to the measurement system, the routing system may create a node for it in the routing system. An error may result if the device exists multiple times in the map of the measurement system.

Second, the connectivity of the device may be determined. For example, the routing system needs to determine what buses are connected to the device. This may be achieved by querying a DIM (device interconnect manager) component. The routing system may then create an edge for each bus/device instance. Note that two devices may be connected multiple times if there are multiple buses between the devices.

Third, the edges for the newly inserted device may be weighted. Edges representing connections inside a device may be weighed when the device topography is preprocessed. However, this approach may not be available for a dynamic system map, in that after inserting the device node, the routing system may need to compute the new weight for edges adjacent to the device node. The cost metrics for computing the added weight are preferably identical to the cost metrics for preprocessed topographies.

Multi-Route Processing

The following describes one example embodiment of a multi-device route determination process.

1) A multi-device routing request may be submitted to the routing system.

2) The routing system may then walk (traverse) the system graph from the source device to the destination device. The routing system may then determine what buses are connected to the device by querying the DIM (device interconnect manager) component, as described above. The routing system may then create an edge for each bus/device instance.

3) The route may be partitioned into sub routes. In order to break up the route properly, the routing system may walk the system map. If the route in the system map has n nodes, then the route will preferably be broken up into n pieces.

4) Each of the sub pieces or sub-routes of the route may then be solved individually. The order in which these sub pieces are solved is not important. Each routing sub piece may be a single device routing problem.

5) All the sub route solutions may be combined into a single primitive settings object in the run-time specification.

The order of the settings in the run-time specification may be important, in that routes may need to be committed from source to destination in order to minimize glitching. At this point, the route may be considered solved.

Alternative Architecture

An alternative architecture to using the system map is to make a single map for the entire system. For this architecture, the system and device level would be combined into one entity. The disadvantage to this method results from the dynamic nature of the system map in that a significant amount of processing time may be needed in order to update the system map for a device addition or removal.

FIGS. 7–9E—Examples of Topographies

Figure 7:
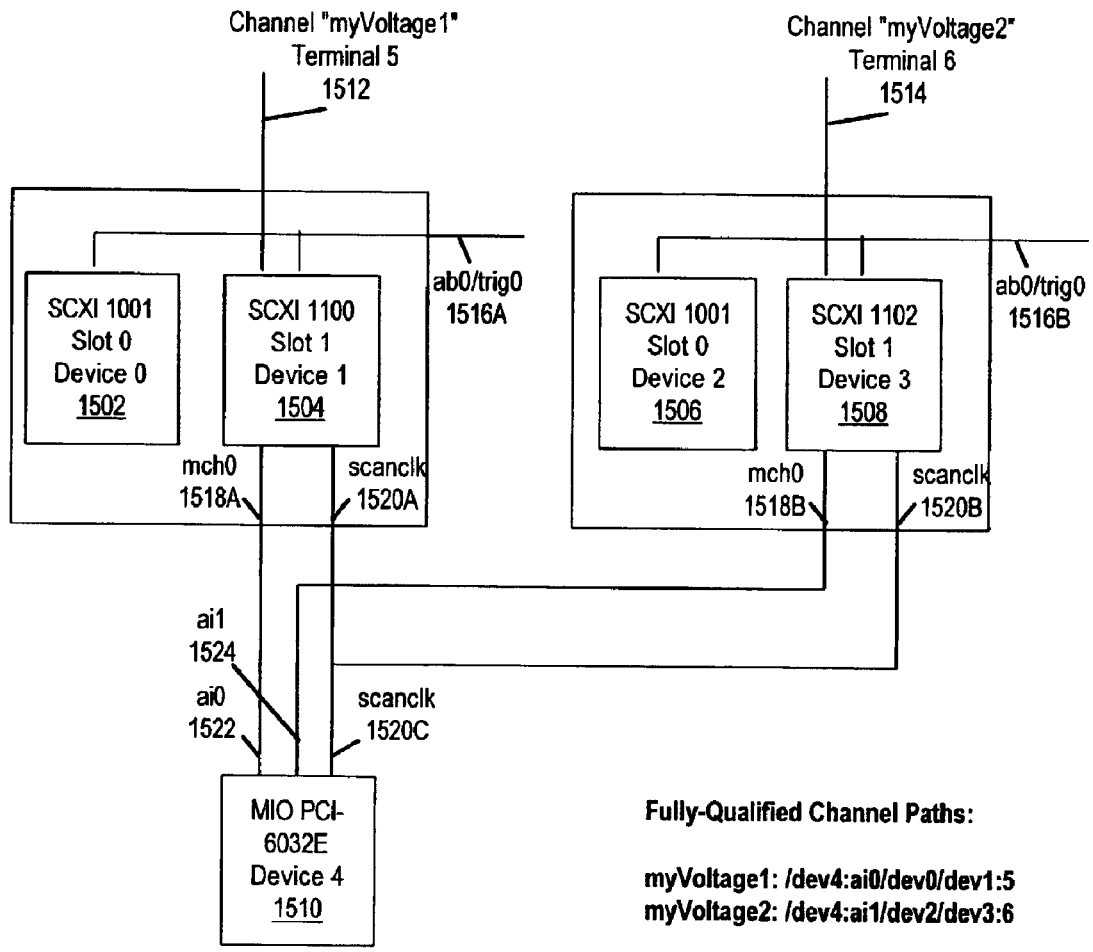
FIG. 7 is a topography diagram for a multi-chassis measurement task, according to one embodiment.

FIGS. 7–9E illustrate various graphical topographies for several example measurement systems (excluding the computer system 102). FIG. 7 represents the connections between devices graphically via lines joining the devices, while FIGS. 8 and 9A–9E represent the connections through text labels indicating input sources and output destinations for each component.

FIG. 7—Topography Diagram for Multi-Chassis Measurement Task

FIG. 7 is a topography diagram for a measurement system or task for measuring two voltage phenomena on two channels with two SCXI modules in two SCXI chassis both connected to an MIO DAQ device. Channel "myvoltage1" 1512 is defined to be terminal 5 of Device 1, which is an SCXI 1100 module 1504 in slot 1 of the SCXI 1001 chassis 1502, identified as device 0. Device 4 1510, a PCI-6032E MIO DAQ device, is connected to the SCXI 1100 module 1504 by a cable connecting the ai0 terminal 1522 of device 4 1510 to the mch0 terminal 1518A of Device 1 1504 and the scanclk terminal 1520C of device 4 1510 to the scanclk terminal 1520A of Device 1 1504. The fully qualified channel path for channel "myvoltage1" 1512 is "/dev4:ai0/dev0/dev1:5". Channel "myVoltage2" 1514 is defined to be terminal 6 of device 3, which is an SCXI 1102 module 1508 in slot 1 of another SCXI 1001 chassis 1506, identified as Device 2. Device 4 1510 is connected to the SCXI 1102 module 1508 by a cable connecting the ai1 terminal 1524 of device 4 1510 to the mch0 terminal 1518B of device 3 1508 and the scanclk terminal 1520C of device 4 1510 to the scanclk terminal 1520B of device 3. The fully qualified channel path for channel "myVoltage2" is "/dev4:ai1/dev2/dev3:6".

Figure 8:
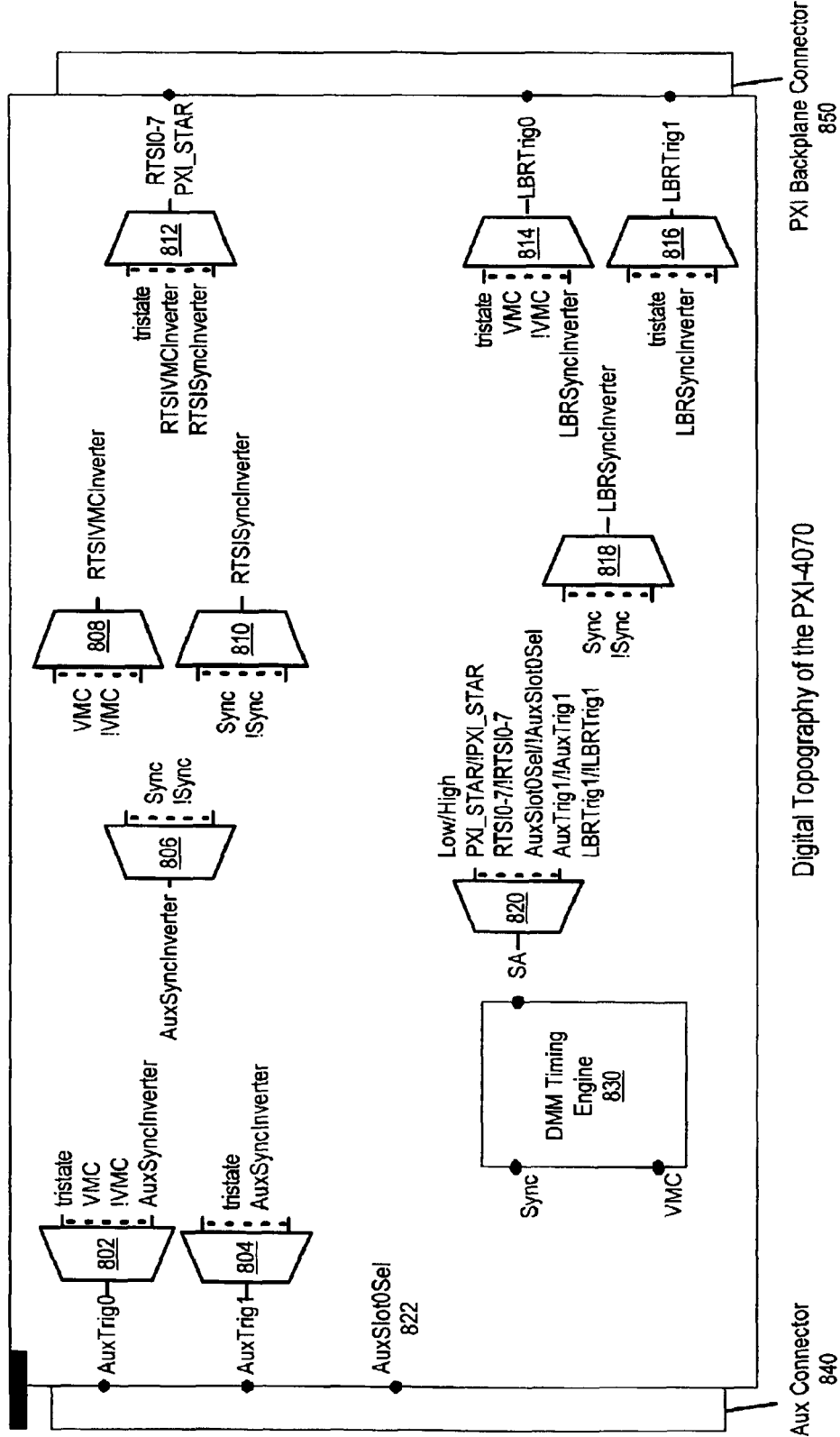
FIG. 8 is a topography diagram of a PXI-4070 card, according to one embodiment.

FIG. 8—Digital Topography of a PXI-4070 Card

FIG. 8 illustrates the topography of a PXI-4070 card from National Instruments Corporation, according to one embodiment. As FIG. 8 shows, the card includes a plurality of MUXs 802–820, and a DMM Timing Engine 830. As FIG. 8 also shows, each MUX may receive input from a variety of sources. For example, the AuxTrig0 MUX 802 may receive input from AuxSyncInverter 806 and VMC (or !VMC) from the DMM Timing Engine 830, or may be set to high-Z with the tristate terminal of the MUX, effectively removing the MUX from any routes. Each MUX may be configured to receive input from another component, thus, a variety of routes may be effected by configuration of the MUXs.

FIGS. 9A–9F—Topographies of PCI E-Series Card

FIGS. 9A–9F illustrate example topographies of a PCI E-Series Card from National Instruments Corporation. As mentioned above, the topographies may each be represented as a topography description file. Alternatively, multiple topographies may be represented in a single topography description file.

Figure 9A:
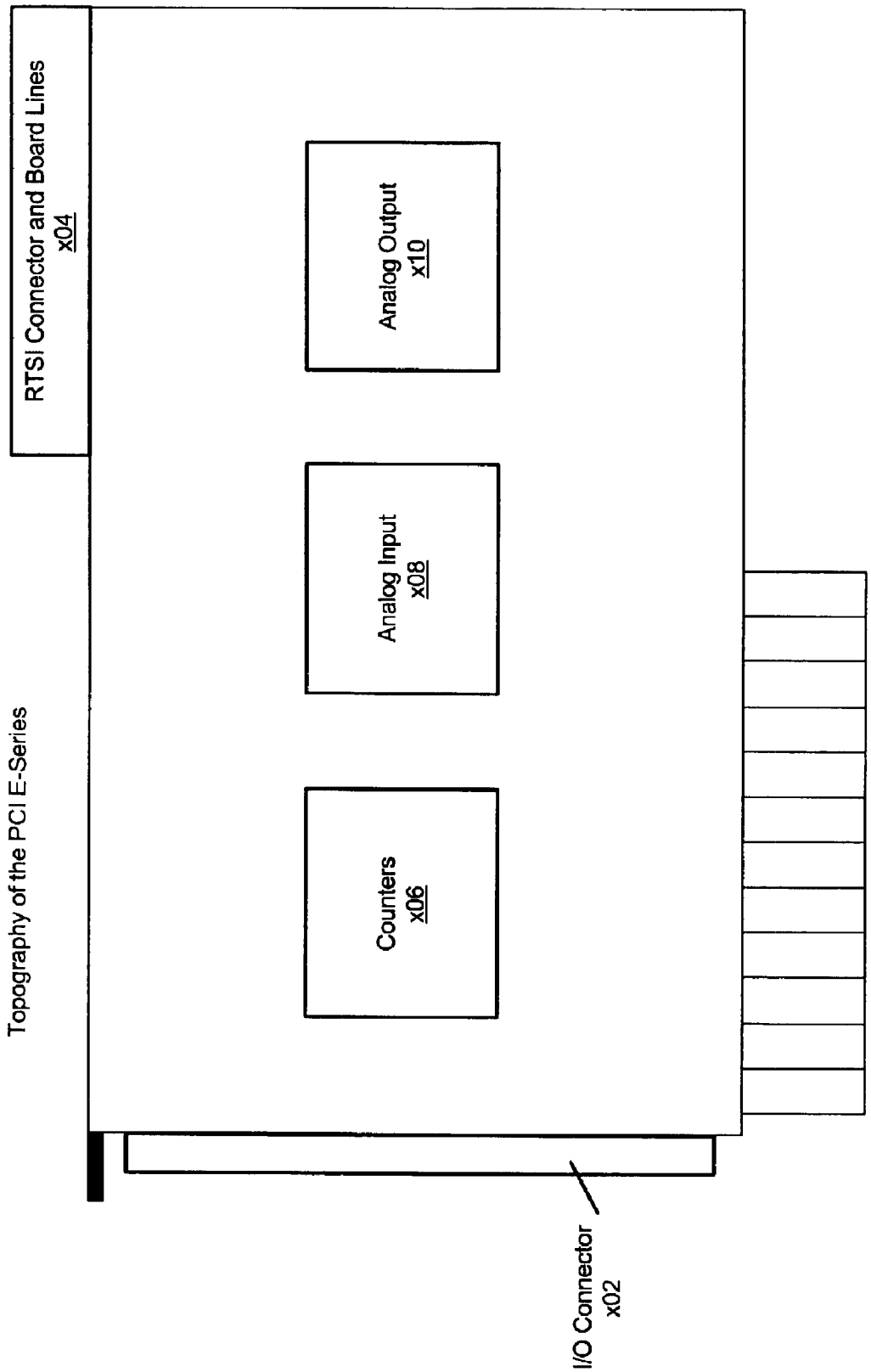
FIGS. 9A–9F are topography diagrams for a PCI E-Series card, according to one embodiment.

FIG. 9A—High Level Topography of PCI E-Series Card

FIG. 9A illustrates the high level topography/components of the PCI E-Series card from National Instruments Corporation. As FIG. 9A shows, the card may include an I/O connector 902 and a RTSI connector (and board lines) 904 for communication with external buses. In the embodiment shown, the card also includes a counters element 906, an analog input 908, and an analog output 910, each of which is described in more detail below with reference to FIGS. 9B–9F.

Figure 9B:
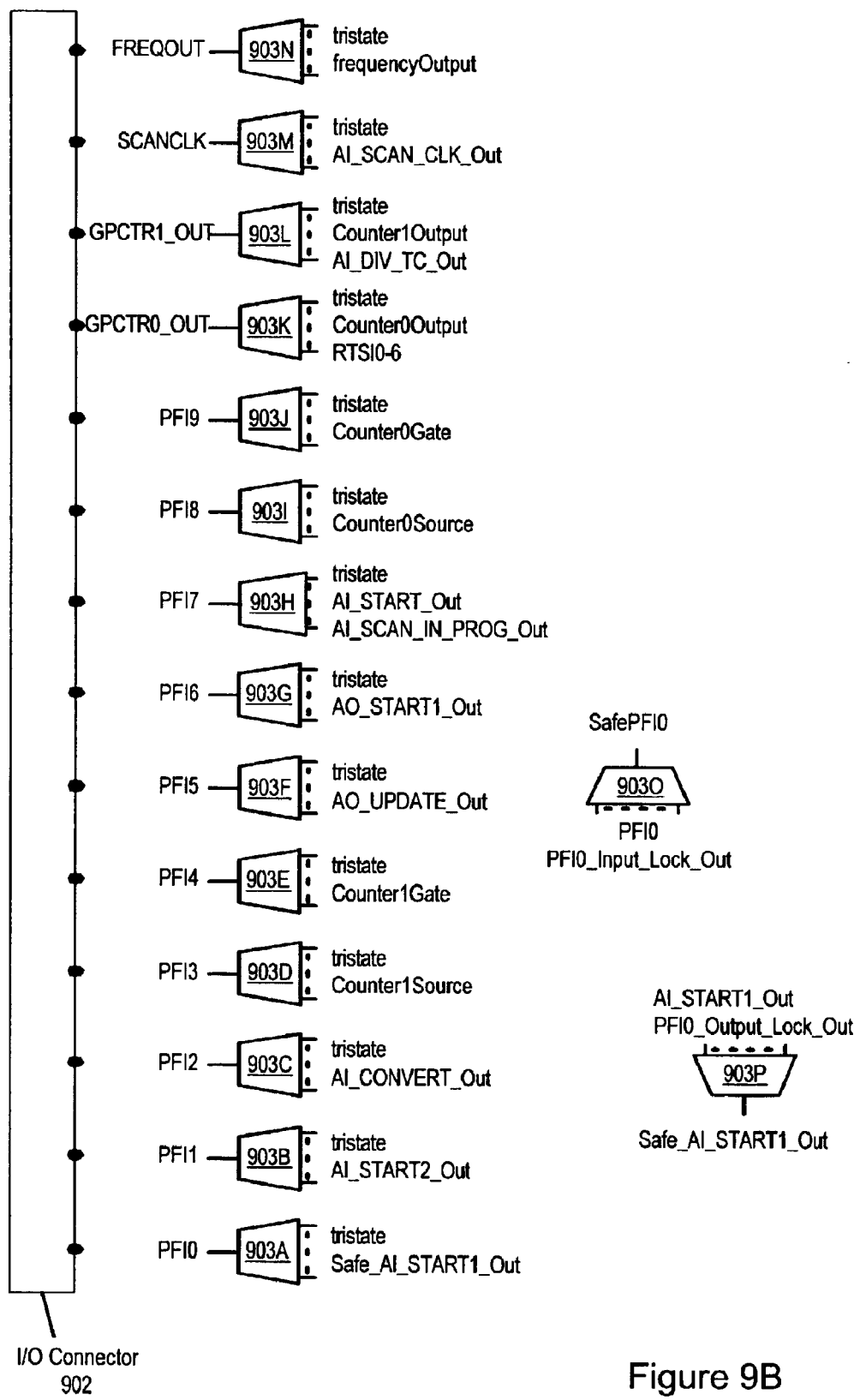

FIG. 9B—PCI E-Series Card: I/O Connector

FIG. 9B illustrates an example topography for the I/O connector element 902 of the E-Series card of FIG. 9A. As may be seen in FIG. 9B, I/O connector 902 connects to a plurality of MUXs 903A–903N, each of which may receive input from two or more sources, as labeled. For example, PFI0 MUX 903A may receive input from Safe_AI_START1_Out MUX 903P, as shown. The PFI0 MUX 903A may also be set to high-Z via the tristate terminal. Note that the various I/O connector MUXs may receive inputs from the components of other card elements, namely, the counters element 906, the analog input 908, and the analog output 910. Thus, the I/O connector MUXs may be configured to implement a variety of routes on the E-Series card.

Figure 9C:
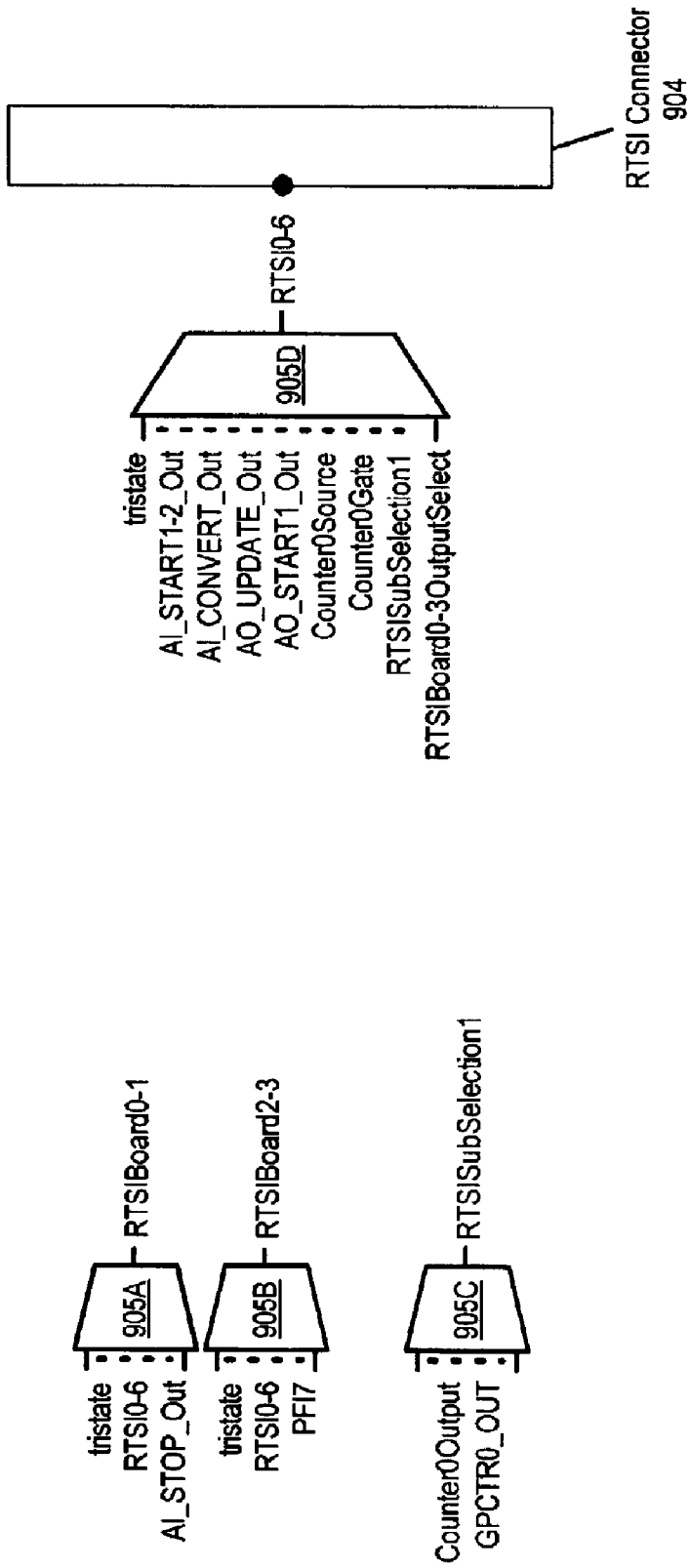

FIG. 9C—PCI E-Series Card: RTSI Connector

FIG. 9C illustrates an example topography for the RTSI connector element 904 (with board lines) of the E-Series card of FIG. 9A. As may be seen in FIG. 9C, RTSI connector 904 connects to a MUX 905D, which may receive input from each of three other MUXs 905A–905C, as labeled. For example, the RTSISubSelection1 MUX 905C may receive input from Counter0Output of the counter element 906 (see MUX 907J of FIG. 9D, described below), as well as from GPCTR0_OUT from I/O connector MUX 903K of FIG. 9B, described above. Thus, the RTSI connector element of the E-Series card may be configured to implement a variety of routes through its resident MUXs.

Figure 9D:
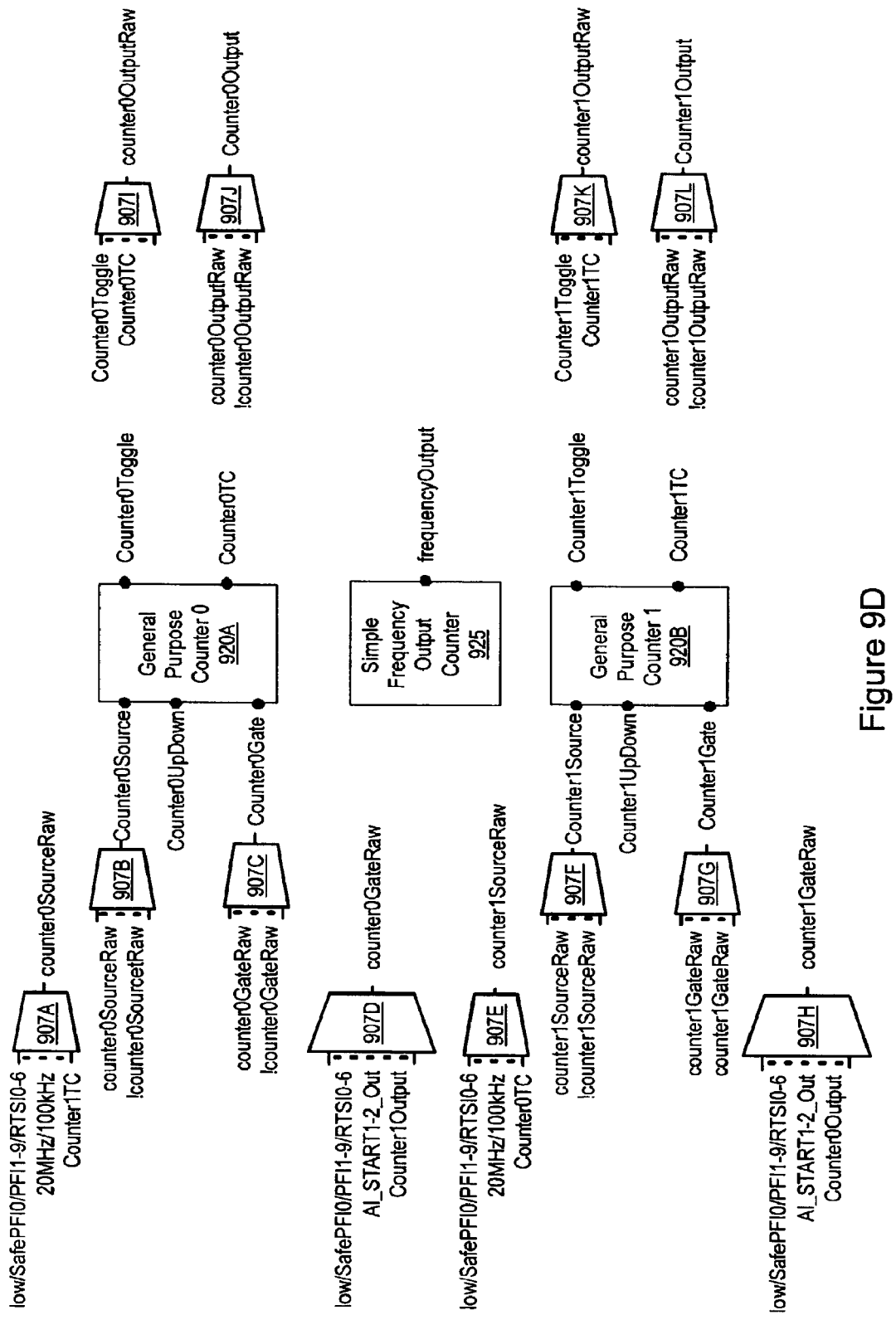

FIG. 9D—PCI E-Series Card: Counter

FIG. 9D illustrates an example topography for the counter element 906 of the E-Series card of FIG. 9A. As shown in FIG. 9D, two general purpose counters 920A and 920B and a simple frequency output counter 925 each may couple to various counter element MUXs 907, each of which is configurable to receive input from a variety of sources, including sources from other elements on the E-Series card. Thus, a plurality of routes may be configured through various counter MUXs and counters to provide various counter functions to the E-Series card.

Figure 9E:
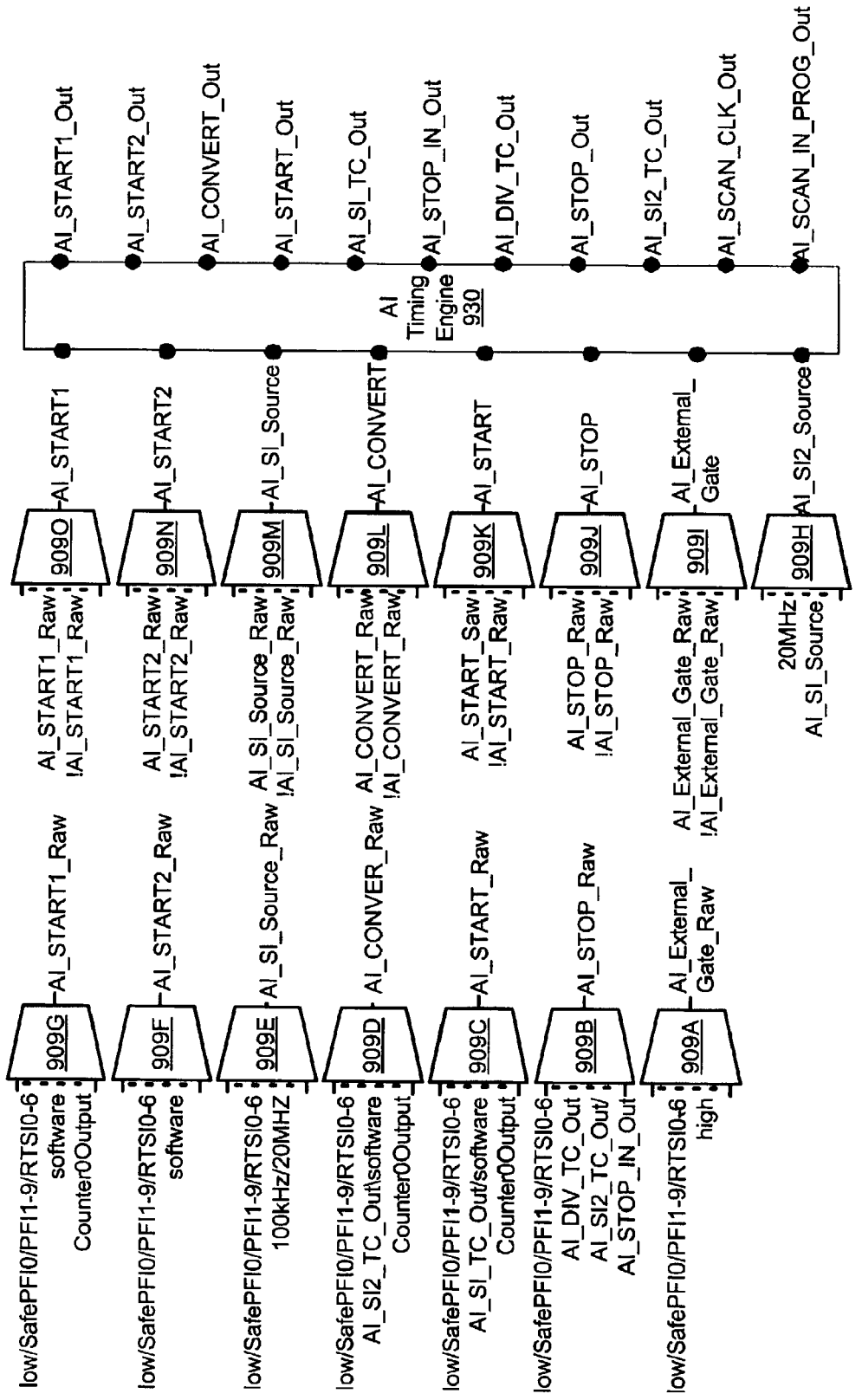

FIG. 9E—PCI E-Series Card: Analog Input

FIG. 9E illustrates an example topography for the analog input element 908 of the E-Series card of FIG. 9A. As may be seen in FIG. 9E, an AI timing engine 930 may receive inputs from a plurality of AI MUXs 909H–909O. MUXs 909I–909O may receive input from corresponding MUXs 909A–909G, as shown, optionally inverting the polarity of the input, as indicated by the '!input' terminals. MUXs 909A–909G may receive inputs from a variety of sources, including RTSI channels, counter outputs, and software control outputs, as shown. Note that AI MUX 909H may receive input from the AI_SI_Source MUX 909M. The AI timing engine 930 may then provide various analog input signals (as output from the analog input element) to other elements of the card. Thus, by configuring the settings on each MUX, a plurality of routes may be implemented in and through the analog input element of the E-Series card.

Figure 9F:
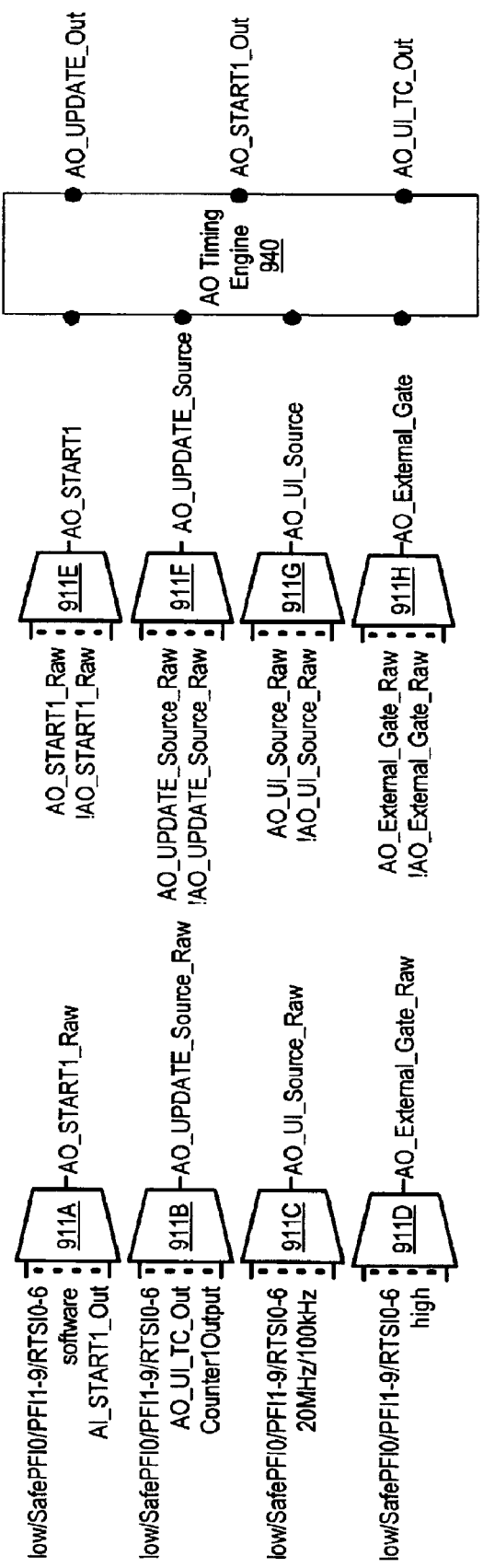

FIG. 9F—PCI E-Series Card: Analog Input

FIG. 9F illustrates an example topography for the analog output element 910 of the E-Series card of FIG. 9A. As may be seen in FIG. 9F, an AO timing engine 940 may receive inputs from a plurality of AI MUXs 911E–911H. MUXs 911E–911H may receive input from corresponding MUXs 911A–911D, as shown, optionally inverting the polarity of the input, as indicated by the '!input' terminals. MUXs 911A–911D may themselves receive input from various sources, including RTSI channels, counter outputs, and software control outputs, as FIG. 9F shows. The AO timing engine 940 may then provide various analog input signals (as output from the analog output element) to other elements of the card. Thus, by configuring the settings on each MUX, a plurality of routes may be implemented in and through the analog output element of the E-Series card.

Thus, the PCI E-Series card may facilitate a plurality of routes through its constituent elements via respective pluralities of MUXs comprised in each respective element. As described above, the method may receive topographical descriptions for the E-Series card and its elements, generate respective graphs for each, and determine a plurality of routes through the card in accordance with routing specifications for a measurement task (e.g., a source terminal and a destination terminal).

Example: Routing Sub-Problem

One example of the use of the routing configuration process involves a routing sub-problem as part of a larger measurement task. In this example, the presented problem includes routing an acquisition timebase signal on a first device (Device 1) to an acquisition timebase signal on a second device (Device 2) to synchronize the two devices for a 1 MHz acquisition.

The corresponding routing task specification may be summarized thus: connect terminal "device1/timebase_out" to "device2/timebase_in". Additional information in the specification may include the fact that the terminal "device1/timebase" is a single-ended TTL digital signal with a bandwidth of 1 MHz.

Figure 10:
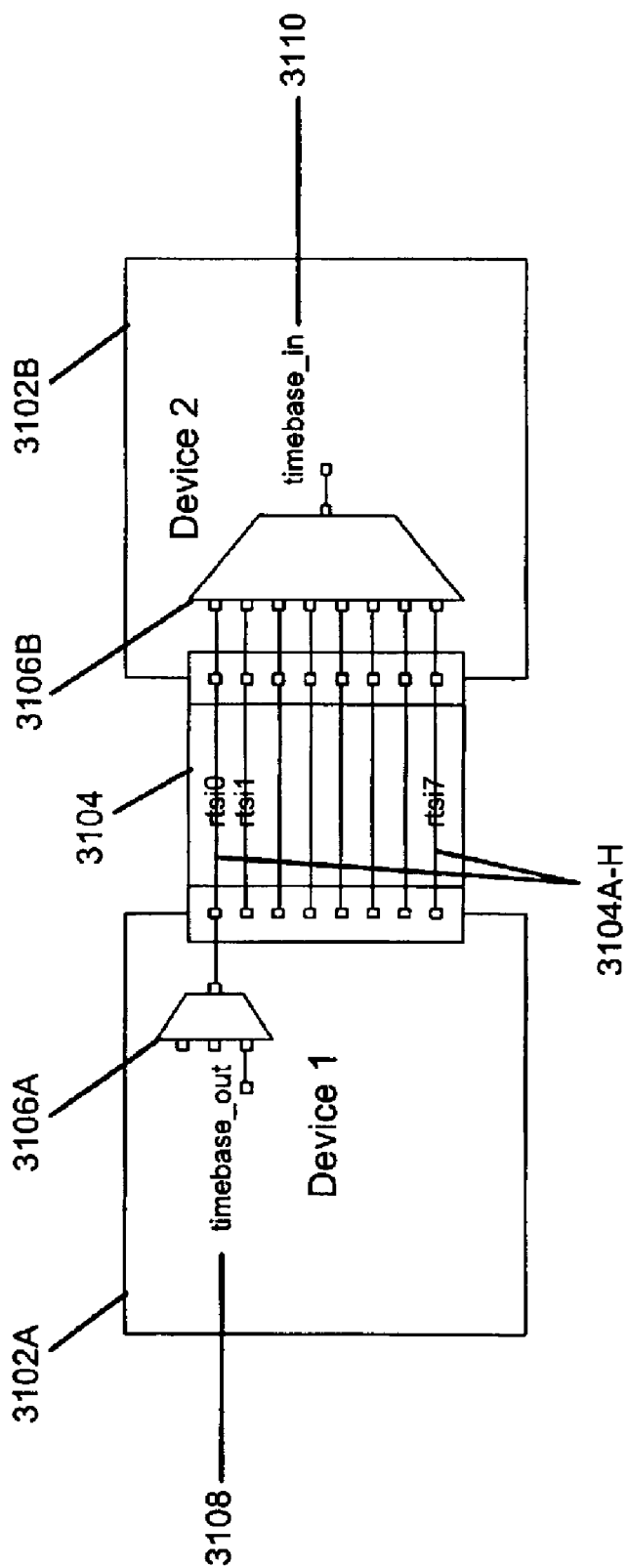
FIG. 10 is a topography diagram for a synchronization routing task, according to one embodiment.

FIG. 10—Topography Diagram for Routing Task

FIG. 10 is a topography diagram for the routing task described above. As FIG. 10 shows, Device 1 3102A may be operable to communicate with Device 2 3102B via a Real-Time System Integration Bus (RTSI) 3104, which may provide support for sending and receiving synchronization signals between devices. In this embodiment, the RTSI bus may comprise a plurality of RTSI lines, e.g., 8 lines designated RTSI0–RTSI7 3104A–H. In one embodiment, device1 3102A may be operable to send the timebase_out signal 3108 through MUX 3106A to the timebase_in 3110 of device2 3102B via line RTSI0 of the RTSI bus 3104, through MUX 3106B, as shown. In one embodiment, the system may include more than one RTSI bus, and so the RTSI bus 3104 shown may be designated as RTSIbus0, and a particular line on the bus, e.g., line 0, as RTSIbus0/RTSI0.

Examples of the Routing Determination Process

Below are described two examples of the sequence of events involved in specifying and performing routing in a measurement task. It should be noted that these are but examples, and are not intended to limit the implementation and use of the present invention to any particular embodiment. It should be further noted that various steps are described which occur before and after the dynamic determination of the routes, and which are performed by software and/or hardware which may not directly be a part of the present invention, but which may work in conjunction with the present invention as part of a larger system. Additionally, two types of users are described: an external user, referred to as the "customer", which refers to the actual end user of the measurement system,; and an internal user, referred to as a "user" which refers to software components, e.g., device specific driver software, which creates routing experts.

Figure 11:
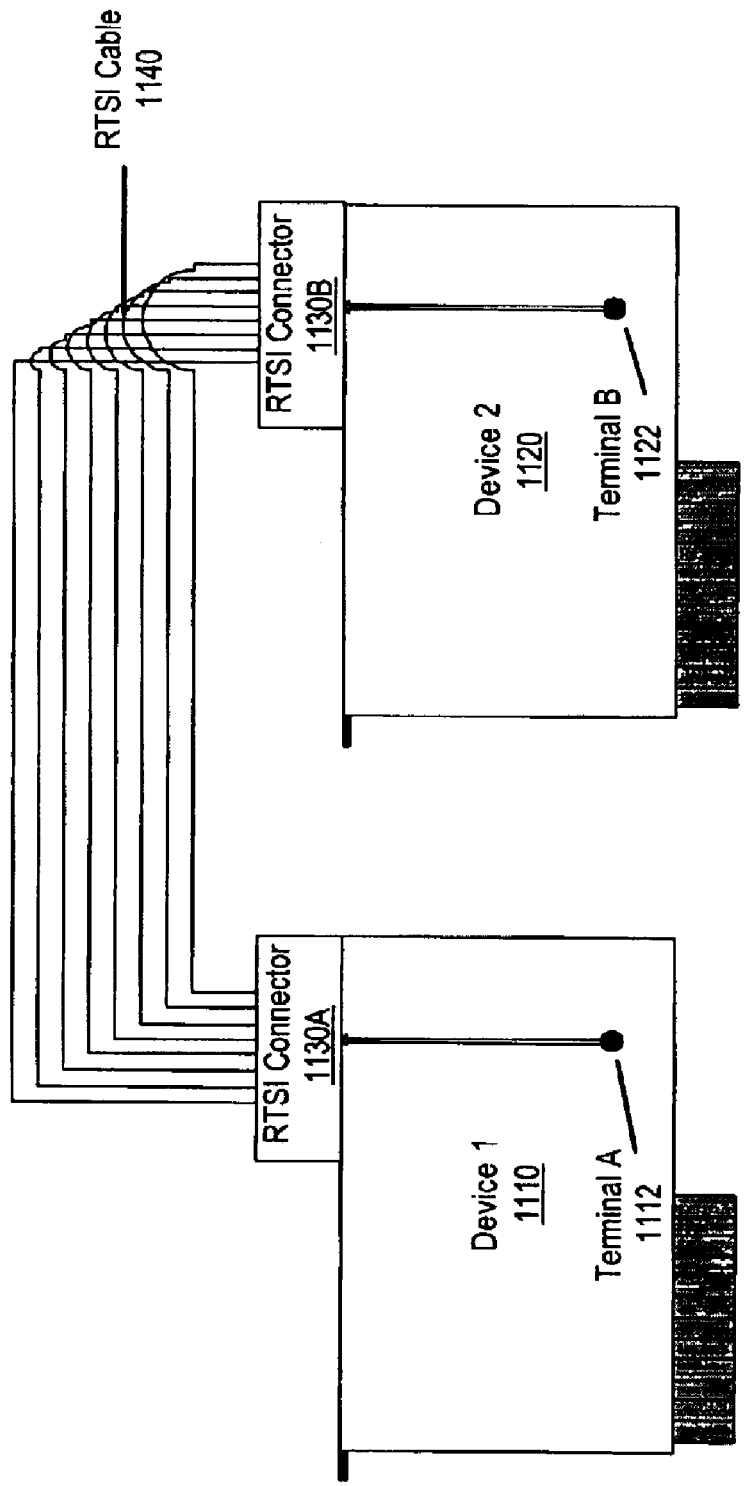
FIG. 11 is a topography diagram for a PCI—PCI routing task, according to one embodiment.

FIG. 11—Routing between Two PCI Devices Over RTSI

FIG. 11 illustrates one example of routing between two PCI devices over an RTSI cable. As FIG. 11 shows, a first PCI device 1110 is coupled to a second PCI device 1120 over RTSI cable 1140. A terminal on each device (terminal A 1112, terminal B 1122) provides a connection to each device's RTSI connector (1130A, 1130B). The following describes one embodiment of a list of events that may occur during manual configuration of a RTSI cable.

Device 1 1110 and device 2 1120 may be inserted into the PC's PCI bus, and connected to a RTSI cable 1140. This step is typically performed by the customer. Then, Device 1 1110 and device 2 1120 may be auto-detected by the device driver. The driver may also use the .ini file of the device to retrieve a list of its reservable resources, e.g., RTSI lines and PFI lines. The customer may then launch a configuration tool, e.g., National Instruments Corporation's Measurements Explorer (MAX), to configure Device 1 1110 and device 2 1120 and the RTSI cable 1140. Note that the customer may now be required to add the RTSI cable 1140 to the system configuration if RTSI cables are not auto-detected.

The configuration tool, e.g., MAX, may then notify the device driver to add the RTSI cable 1140 to itself. An association between the RTSI cable 1140 and Device 1 1110 may be made in MAX, for example, by the customer, after which MAX may tell the driver of the association of the RTSI cable to Device 1 1110. Then, an association between the RTSI cable 1140 and Device 2 may be made in MAX, after which MAX may tell the routing manager of the association of the RTSI cable 1140 to device 2 1120.

Note that the steps of launching the configuration tool to configure Device 1 1110 and device 2 1120 and the RTSI cable 1140, and creating the associations between the RTSI cable and the two devices can be collapsed into a single step if an auto-detect feature is supported. Auto-detect may be implemented as a command in a tool that tests for connections between all device RTSI connectors.

Figure 12:
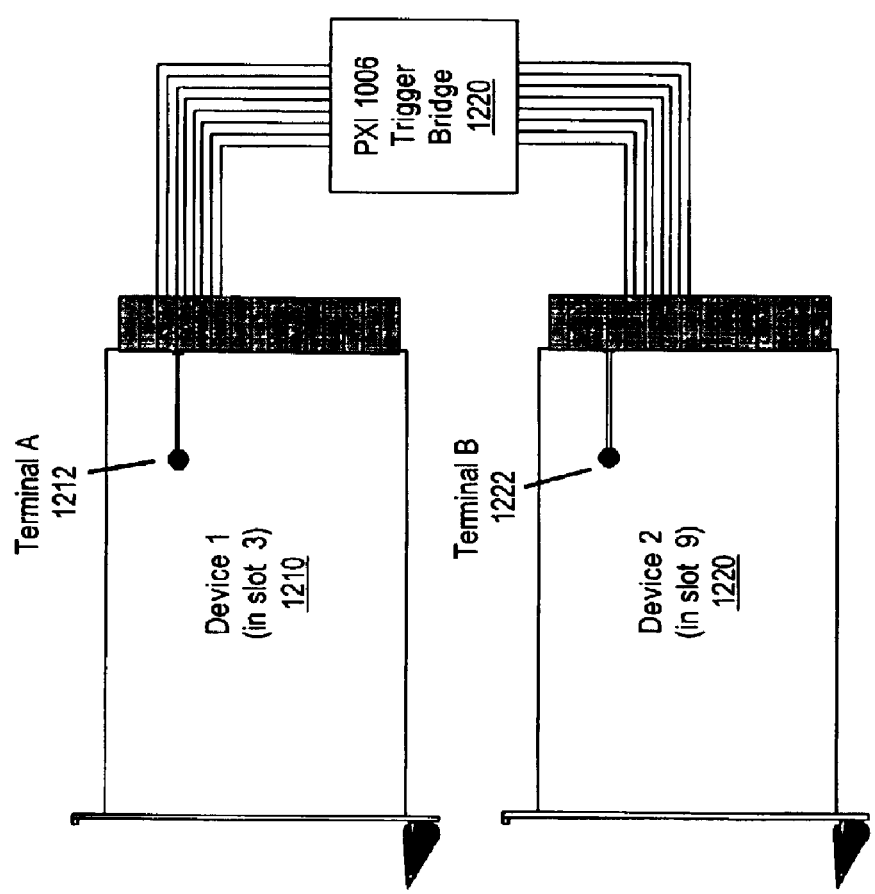
FIG. 12 is a topography diagram for a PXI—PXI routing task, according to one embodiment.

FIG. 12—Routing A Trigger between Two PXI Devices

FIG. 12 illustrates one example of routing a trigger between two PCI devices. As FIG. 12 shows, a first PXI device 1210 is coupled to a second PXI device 1120 over a PXI 1006 trigger bridge 1240. A terminal on each device (terminal A 1212, terminal B 1222) provides a connection to the trigger bridge 1240. There are a great number of possible pitfalls associated with routing triggers in PXI chassis. For the most part, PXI forces cards to be connected to the trigger bus, although with MXI-3 this is not the case. Also, large PXI chassis such as the PXI 1006 have bridges between multiple buses. These bridges may need to be programmed in addition to any normal programming involved. The following describes one embodiment of a list of events which may occur during configuration of the PXI system.

First, a customer inserts Device 1 1210 into slot 3, and device 2 1220 is inserted into slot 9 of a PXI 1006. Note that the cards are located in different trigger buses so that a bridge will be necessary to make a connection between these two devices. Then, Device 1 1210 and device 2 1220 may be auto-detected, e.g., by the device driver. The routing manager may also use the .ini file of the device to get a list of its reservable resources, e.g., trigger lines and PFI lines.

A routing request may then be submitted, e.g., by a customer or an internal software process, to connect Device 1:Terminal A 1212 as a source and Device 2:Terminal B 1222 as a destination, denoted by "Device 1:Terminal A=>Device 2:Terminal B". Note that the steps where a user of the routing system creates an instance of the routing expert have been omitted.

The routing system may examine the canonical or unique device names of the source and destination terminal configurations and determine that they are not equal, meaning that the routing request will cross multiple devices. The routing system may now confirm that there is a possible connection between these two particular devices, then query the routing manager regarding the existence of a trigger connection between Device 1 1210 and device 2 1220. Assuming that the routing manager returns a positive response, the routing system may transform the routing request of "Device 1:Terminal A=>Device 2:Terminal B" into "Device 1:Terminal A=>Device 1:Trigger X" and "Device 2:Trigger X=>Device 2:Terminal B". The transformed routing request no longer spans multiple devices. These two "single devices" sub-path requests will now be resubmitted back to the routing system. It should be noted that "Trigger X" represents all of the homogeneous trigger lines between Device 1 and device 2.

"Device 1:Terminal A=>Device 1:Trigger X" may then be submitted to the routing manager and primitive settings may be returned (assuming that "Device 1 Terminal A=>Device 1:Trigger X" has a valid route). Similarly, "Device 2:Trigger X=>Device 2:Terminal B" may be submitted to the routing manager and primitive settings returned (assuming that "Device 2:Trigger X=>Device 2:Terminal B" has a valid route).

The configuration settings for both sub-paths may be placed into a single primitive settings object. The primitive settings are now returned to the user of the routing system. The primitive settings object contains all the settings for the entire multi-device path. This allows the resolution of "Trigger X" to be passed from the first section of the path to the second section of the path.

The user of the routing system may then place the returned primitive settings into the task, and the verified runtime may be committed. The routing system may then create an instance of the routing primitive supervisor and send primitive settings to the supervisor. The routing primitive supervisor may first attempt to reserve all the necessary resources for the entire route. In one embodiment, the reservation process may be performed in the following manner:

1. Routing resources that connect Terminal A 1212 up to, but not including, one of the trigger multiplexers may be reserved. Since the actual trigger line may not be known beforehand, the trigger multiplexer may not be reserved at this point.

2. A trigger line may be reserved by requesting a specific trigger line from the routing manager. In the case of Trigger X, this request may start by requesting Trigger 0, Trigger 1, . . . to Trigger n. This iterative requesting for Trigger X will end upon the first successful reservation. The routing manager may then check to see if the requested trigger line is available. If the trigger line is available, then the routing manager may reserve the line and return a handle for future reference.

3. Now that the trigger line number is known, the correct trigger multiplexer may be reserved on Device 1 1210 by the routing manager. The primitive settings may have reservation settings and register configurations for every valid trigger line.

4. Next, routing resource reservations may be made in Device 2 1220 by the routing manager. However, which trigger line Device 2 1220 will use to receive the signal must be known. The reservation handle that was returned from calling the routing manager is known, as well as the originating trigger line. However, using the trigger line from step 2 may not be reliable in the case of a PXI 1006 chassis. If the two devices straddle a routing bridge in a PXI 1006, then the trigger line number may change from one trigger bus to another. As a result, the trigger line number may need to be rediscovered. The routing manager may now ask its interconnect manager for listening privileges on a line. The reservation handle may be used to specify which signal is being listened to. The routing manager may start by requesting trigger 0, trigger 1, to trigger n. This iterative requesting for trigger X will preferably end upon the first successful listen request. Now that the trigger line the receiving board will be using is known, the routing manager can reserve the correct multiplexer. It should be noted that in cases where trigger lines are not connected to the trigger bus, the settings for the unconnected trigger lines may not be included in the primitive settings.

The routing manager may then check to see if the signal represented by the reservation handle is available on the requested trigger line for listening. This may not be a trivial function. In fact, listening to a trigger line on a PXI-1006 chassis could instigate a bridge switch. These routings across bridges are also not necessarily a one to one correspondence. For example, Trigger 0 in a bus could be switched over to Trigger 5 in a neighboring bus. Note that the routing system preferably makes reservation and listening requests in numerical order, for example, from 0 to n. This gives the routing system a more deterministic behavior. Also, ordered requests may minimize trigger line waste, e.g., multiple triggers listening to the same signal.

5. The remaining resources needed to complete the route from Device 2:Trigger X to Device 2:Terminal B may be reserved, e.g., by the routing manager.

In another embodiment, the reservation process may be performed in the following manner:

1. The lines what are compatible from the source to "Trigger X" and from "Trigger X" to the destination may be determined.

2. The routing manager may be asked to resolve which lines to use and to reserve one of the lines for the route.

A benefit of this approach is that the method ensures that there is enough information available to prevent the software from performing an incremental reservation: the software does not need to iterate, asking which trigger line is available to use on the source or destination side of the "Trigger X" terminal. On the reservation failure, software must undo what it has done. In this embodiment, because the software gathers enough information to allow the routing manager to chose which line to use, backtracking (i.e. trying a different possible solution) may be avoided.

The committed runtime may now be started, e.g., by the customer. Then, since all the necessary routing resources are reserved, the routing system run-time may write all of its settings to hardware. The route may be committed from source to destination in order to minimize glitching.

The executing runtime may then be stopped, e.g., by the customer. Then, the routing system run-time may uncommits the route or turn the route off in hardware. The route may be shut down from destination to source to minimize glitching. Note that some resources may not have symmetric settings for turning them off. For example, most multiplexers, pre-scalers, and filters, are always on.

The stopped runtime may then be uncommitted, e.g., by the customer. The routing system may then free all previously reserved resources. The order of freeing is not important. Also, when a trigger line in a PXI 1006 chassis is freed, it may result in the bridge switch being tri-stated. In one embodiment, the Listen requests are automatically freed when the trigger line gets released.

Other Routing Issues

In various embodiments of the present invention, a number of issues may arise in the determination of routing for a measurement task. The following describes several of these issues and possible approaches which may be useful in addressing them.

Multi-Device Routing and Trigger Buses

According to one embodiment, in order to create a multi-device route, the source and destination devices may be required to share a trigger bus together physically and logically. For PCI devices, a user may be required to register the necessary RTSI cable. If the RTSI cable is not registered, then routing may not take advantage or the RTSI cable and the system may fail to create a route. In one embodiment, PXI trigger backplanes may be automatically registered.

Dynamic Trigger Bus Line Selection

Management of trigger lines is another important feature of dynamic routing. If two measurement tasks are hard coded to the same trigger line for different signals, then at least one of the measurement tasks may result in a resource conflict. Multi-device routing may allow trigger lines to be dynamically selected at runtime. This means that any available trigger line will be selected. A user can still select a specific trigger bus line by splitting a multi-device route into two single device routes. However, the two static routes may lose the ability to dynamically choose an available trigger at runtime.

Forms of Routing

In one embodiment, routes may be made in two different forms: task based and immediate, also referred to as task-independent. Task based routing is the most common form of routing. It is a route associated with a measurement task. When the user creates a hardware trigger or exports a hardware event, a task-based route may be created. These routes are embedded in a task. When the task is committed, the route is committed. When the task is terminated, the route may be terminated, as well.

Immediate routing is not associated with any task. An immediate route may be denoted by a pair of fully qualified terminal names specifying the source and destination of the route. When an immediate route is created, the route may be committed to hardware immediately, hence the name. Since immediate routes' durations are not governed by tasks, the user may need to actively destroy the route when it is no longer needed. Further details of immediate (task-independent) routing are provided below in the section titled "Task-Independent Routes".

Signal Modifiers

When a route is constructed between a source and destination terminal, the routing is often not just a simple connection. There are often options for modifying the signal as it passes from source to destination. A signal modifier is any in-lined hardware capable of changing (versus just propagating) the digital signal. Examples of signal modifiers are digital inverters, pre-scalers, digital low pass filters, and delay elements. None of these modifiers are symmetric with one another. For instance, inverters are Boolean operators while filtering might affect the signal by shunting off the high frequency portion of the signal. While both of these operations are signal modifiers, they have to be treated differently by routing software.

In one embodiment, the routing system may handle signal modifier components such as these by examining the signal characteristics and modifying the signal as it passes through the signal modifiers. In another embodiment, the routing system may include flags which indicate whether to apply various signal modifications during a connection.

In one embodiment, given a source and destination terminal in a measurement system, the routing system may compute a route that satisfies user-specified constraints. Examples of constraints which may involve signal modification include, but are not limited to, signal polarity, filtering, synchronization, pre-scaling, and logical combinations with other terminals, i.e., with signals from other terminals.

An exemplary treatment of routing with signal modifiers (or constraints) is presented below with regards to signal inverters. It should be noted that similar techniques may also be applied to various other signal modifiers, and that the techniques described are not intended to limit the invention to any particular types of signal modifier. It should be noted that in the examples given, the two paths through a multiplexer, where one path includes and inverter and the other path does not, actually represent two possible configuration states for the multiplexer. In other words, depending upon how the multiplexer is configured, the multiplexer may invert the signal or may not.

Figure 13A:
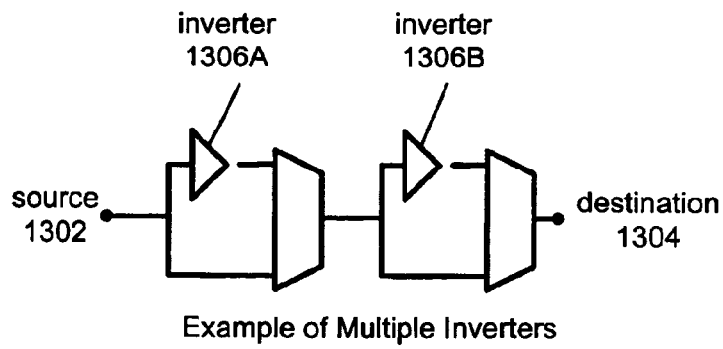
FIGS. 13A and 13B illustrate embodiments of routing with signal inverters, according to the prior art.
Figure 13B:
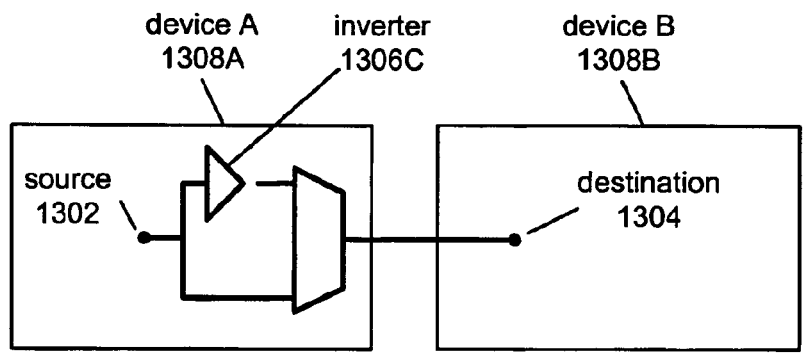
Figure 13C:
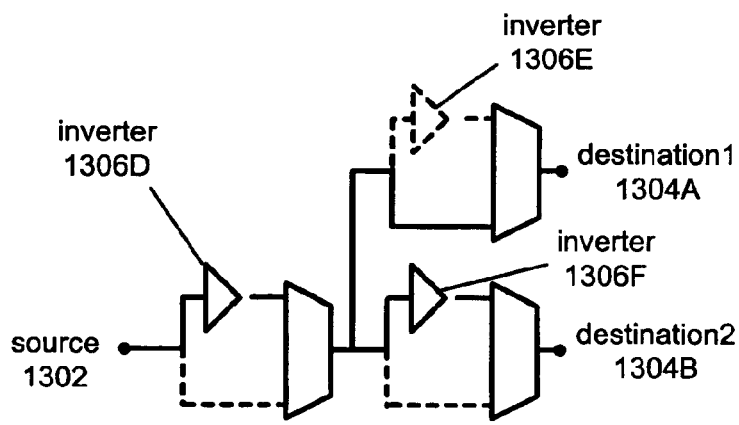
FIG. 13C illustrates a route with signal inverter arbitration, according to one embodiment.

FIGS. 13A–13C—Signal Modifiers: Logical Inversion of Signals

When the user is setting the input terminal for a start trigger or the output for an export hardware event, it may be desirable to invert the signal. For example, the user may want to look at falling edges versus rising edges. In one embodiment, it may be possible to specify that signal inversion takes place in the desired route. Then the routing manager may attempt to select a route which includes signal inversion. However, inversion could fail if an overlapping route has previously reserved the inverter with an incompatible configuration, thus, the method may need to arbitrate between competing demands upon a resource, i.e., the inverter. FIGS. 13A–13C illustrate various examples of the use of signal inverters in a route. As mentioned above, FIG. 13A illustrates multiple signal inverters (1306A and 1306B) in a route between a source 1302 and a destination 1304. It should be noted that in this simple case, the successive inversion operations on the signal would result in an uninverted signal, since the two inversions effectively "cancel out" one another, thus an even number of inverters in a route is equivalent to no inverters in the route, while an odd number of inverters is equivalent to a single inverter in the route.

Like traditional routing, various embodiments of the present invention may accept a source and destination terminal for specifying a route. Unlike traditional routing, however, dynamic determination of a route from source to destination may make determination of the set of routing components used to satisfy the route a difficult task. Thus, satisfying signal modifications with dynamic routing may require a different and dynamic approach compared to prior art techniques, as described below.

Traditional routing approaches may be considered device-centric while various embodiments of the present invention are route-centric, meaning that routes may extend over one or more devices. Similarly, the signal modifiers considered for inclusion in a route may extend across the entire route. FIG. 13B illustrates a simple route which spans multiple devices. As FIG. 13B shows, the source 1302 is in device A 1308A, while the destination of the route 1304 is in device B 1308B. As FIG. 13B also shows, device A includes inverter 1306C. As in traditional routing, the route still needs to be partitioned or broken up into individual device pieces, however, since the system partitions the route itself, the management of the signal modification may now be performed automatically for the user. Thus, the system may partition the route into a first sub-route which includes the inverter 1306C, and a second sub-route which does not include an inverter.

For example, if there are multiple inverters, the system may pick the configuration of inverters based upon several criteria, such as, for example:

Is the inverter already reserved in a compatible configuration? In this case, the system may know how to share the inverter's configuration information.

Is the inverter already reserved in an incompatible configuration? In this case, the system may require a different inverter in a part of the route after the inverter. Otherwise, the system may find the first inverter along the route that satisfies the desired inversion.

In some cases, an inverter may already be reserved from a preexisting route. In one embodiment, the system may be capable of overlaying two routes and arbitrating the inverter settings for the overlaying routes. FIG. 13C illustrates a case where a preexisting route from source 1302 to destination1 1304A with an inversion affects a second route from the source 1302 to destination2 1304B with no inversion. In other words, the route to destination2 1304B shares a sub-route with the route to destination1 1304A, where the sub-route includes an inverter 1306D. The routing requirements specified, however, that the route to destination2 1304B includes no inversion. In this case, the system may determine a route from the source 1302 to destination2 1304B though two inverters 1306D and 1306F so that there is no net inversion for the route.

Figure 14:
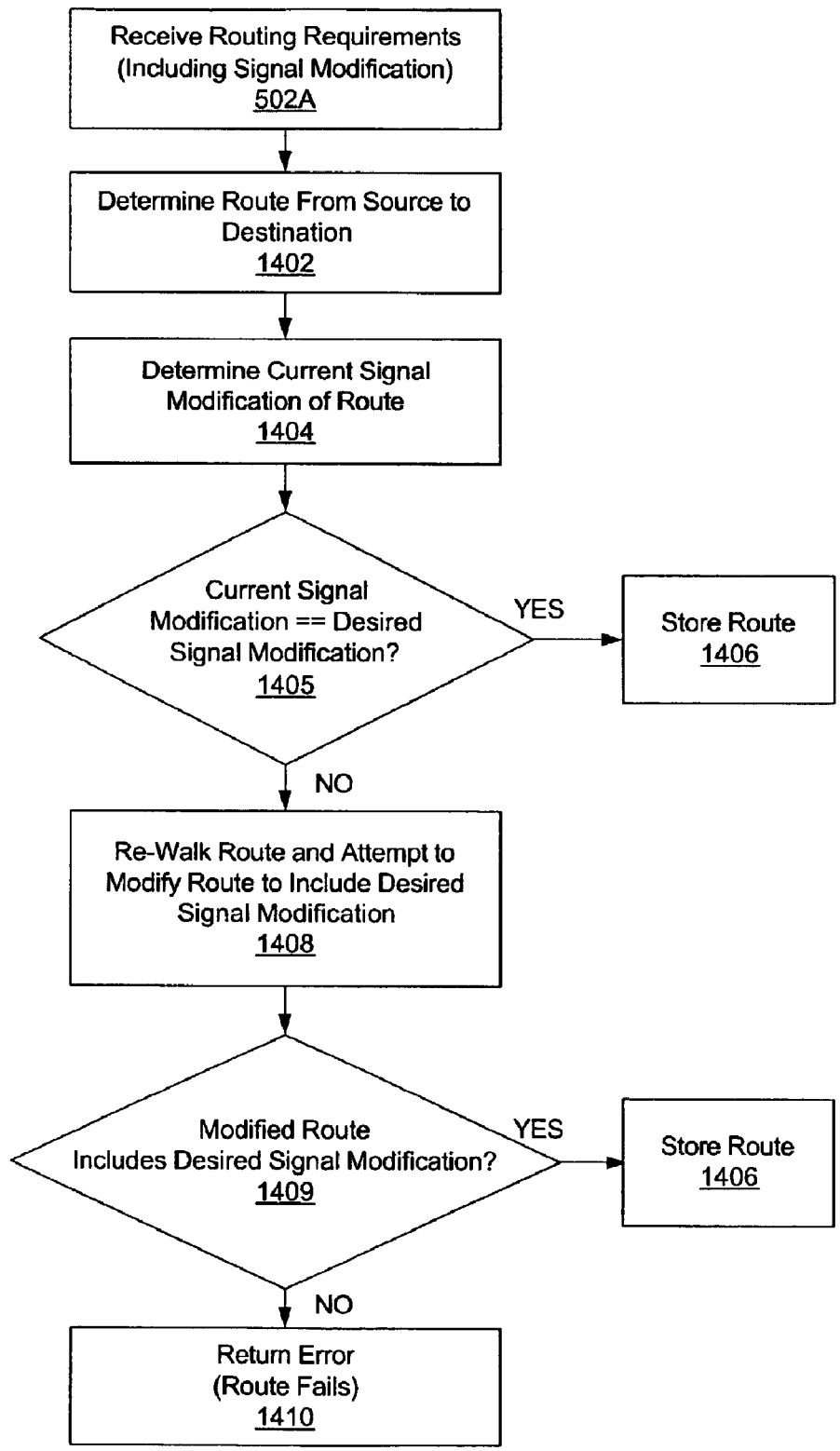
FIG. 14 flowcharts a method for determining routing with inline signal modification, according to one embodiment.

FIG. 14—Routing Determination with Signal Modifiers

Figure 15A:
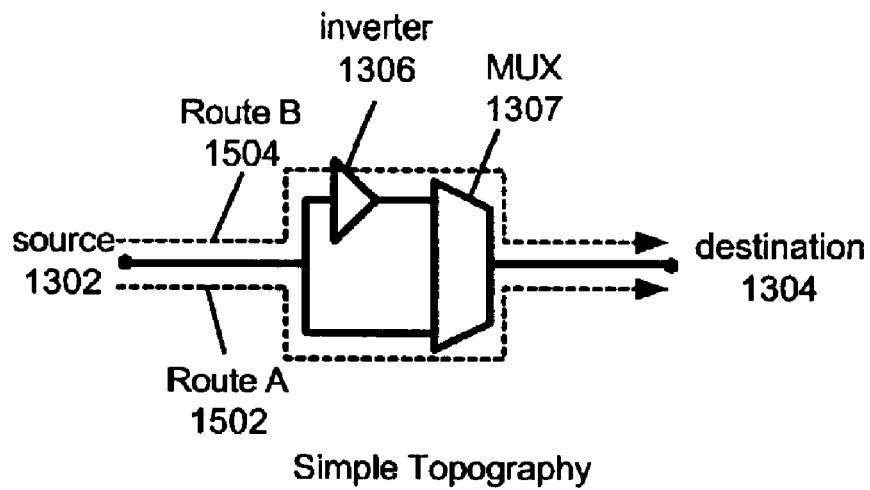
FIGS. 15A–15B illustrate simple routes with signal inversion, according to one embodiment.
Figure 15B:
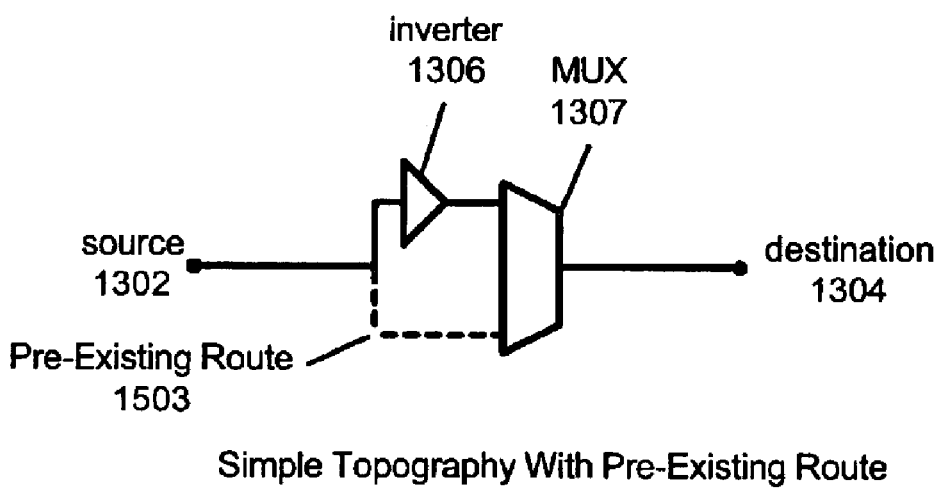

FIG. 14 flowcharts a method for programmatically determining a route from a source to a destination which satisfies one or more specified constraints, specifically as regards inline signal modifications. FIGS. 15A and 15B illustrate simple examples of routing with signal modification. As noted above, the method presented in FIG. 14 is exemplary, and some of the steps may be performed in a different order than shown, or may be omitted. Additional steps may also be performed as desired.

As FIG. 14 shows, in 502A, routing requirements may be received, including signal modification requirements specifying inline signal modifications desired for the route, e.g., signal inversion, pre-scaling, etc., as mentioned above.

Then, in response to the requirements of 502A, in 1402, a route may be determined from the source to the destination, several embodiments of which are described above with reference to FIGS. 5–6C. Then, in 1404, current signal modification of the determined route may be determined. As used herein, the term "current signal modification" refers to the signal modifications, e.g., inversions, synchronizations, etc., present on the route before the routing manager attempts to satisfy the route's specified or desired signal modifications, and thus may be considered the route's "native" configuration. For example, if portions of the route, i.e., legs or components of the route, are shared with a pre-existing route, the shared legs or components may include signal modifications set by or for the pre-existing route. These signal modifications comprise constraints for the current route determination, in that modifying them would interfere with the pre-existing route. Thus, the signal modifications which were set in a prior route determination may not be changed to meet the signal modification requirements for the route.

In one embodiment, the current signal modification of the route also includes information indicating signal modifications for legs or components that are not shared with a pre-existing route. These signal modifications may comprise default signal modifications for the components. In other words, if a component or leg of the route has not been previously reserved or set, then the method may assume a signal modification setting for the component which is "most natural" for the component, e.g., a 'no inversion' setting. These signal modifications may be changed to meet the signal modification requirements for the route, as described in more detail below with reference to FIG. 16.

For example, referring to FIG. 15A, a simple topography is shown where two routes lead from the source 1302, through MUX 1307, to the destination 1304. As FIG. 15A shows, Route B 1504 includes signal inverter 1306, while the Route A 1502 does not. Thus, in the initial determination of the route from the source 1302 to the destination 1304, i.e., in 506 of FIG. 5, the non-inverted path, Route A 1502, may be selected, since initially, no signal modification factored in the determination of routing. The current signal modification of the path is thus 'non-inverted', or 'unmodified'. It should be noted that in general, the two routes may both correspond to a single input terminal on the MUX 1307, and that which of the two routes is active may determined by configuration settings, i.e., settings in the configuration register of the MUX 1307. In other words, the different routes are distinguished by the different signal modifications or modifiers available at the input terminal of the MUX 1307, and the particular signal modification of the input terminal is determined by the configuration of the MUX configuration register.

It should also be noted that the current signal modification of the route may include signal modifications set by pre-existing or prior routes. In other words, some of the route components may be shared by other routes, and thus, the signal modifications set by the other routes may be considered constraints which must be met (i.e., not violated) by the method.

FIG. 15B illustrates the same routing scenario, but where the non-inverted route 1502 is already utilized, i.e., has been reserved by a prior routing solution, e.g., for a preexisting route. Thus, the prior reservation (and signal modification setting) constitutes a constraint for the route determination. In this case, the initial route determination selects the inverted route 1504. Thus, the current signal modification of the route is 'inverted', i.e., includes one signal inversion (by the inverter 1306).

After the current signal modification has been determined for the route, then in 1405 a determination may be made as to whether the current signal modification is the same as the desired signal modification specified for the routing task. If the current signal modification is the same as the desired signal modification, then the routing solution is complete, and the route may be stored, as indicated in 1406.

If, on the other hand, the desired signal modifications are not met by the current signal modification, then in 1408, the route may be re-walked and an attempt made to modify the route to include the desired signal modification. Further details of this step are provided below with reference to FIG. 16. In the example of FIG. 15A, if the route from the source 1302 to the destination 1304 is desired to have no signal modification, then no route modification is required. If the desired route should include a signal inversion, then route B 1504 may replace route A 1502 in the routing solution to meet the signal modification requirements. In the example of FIG. 15B, it should be noted that since there is a pre-existing route, illustrated by the pre-existing route 1503 in FIG. 15B, any determined routing solution must abide by its constraints. Thus, if the desired route includes an inverted signal modification, then the constraint is already satisfied, in that the route leg with the inversion may be shared and used with not modification. However, if the opposite is true, i.e., that the desired route does not include a signal inversion, then a solution cannot be found that meets the constraint, i.e., that does not interfere with the pre-existing route, and an error message may be returned. This is due to the fact that the system, i.e., the hardware, cannot have two routes between the source and destination with different polarities, i.e., with different signal modifications.

Once an attempt to meet the signal modification requirements has been made in 1408, then in 1409, the modified route may be checked for compliance with desired signal modification requirements. If the modified route includes the desired signal modification, i.e., satisfies the one or more signal modification requirements for the route, then the route may be stored, as indicated in 1406. Otherwise, an error may be returned, i.e., the route may fail, as indicated in 1410. In one embodiment, when the route fails and an error code is returned, the process which invoked the routing manager may receive the error code and take some predetermined action, such as, for example, terminating the task, or determining a different, alternative route from the source to the destination, among others.

Thus, various embodiments of the present invention may provide means for programmatically determining routing with signal modification constraints. As mentioned above, further details of the method are provided below with reference to FIG. 16.

Figure 16:
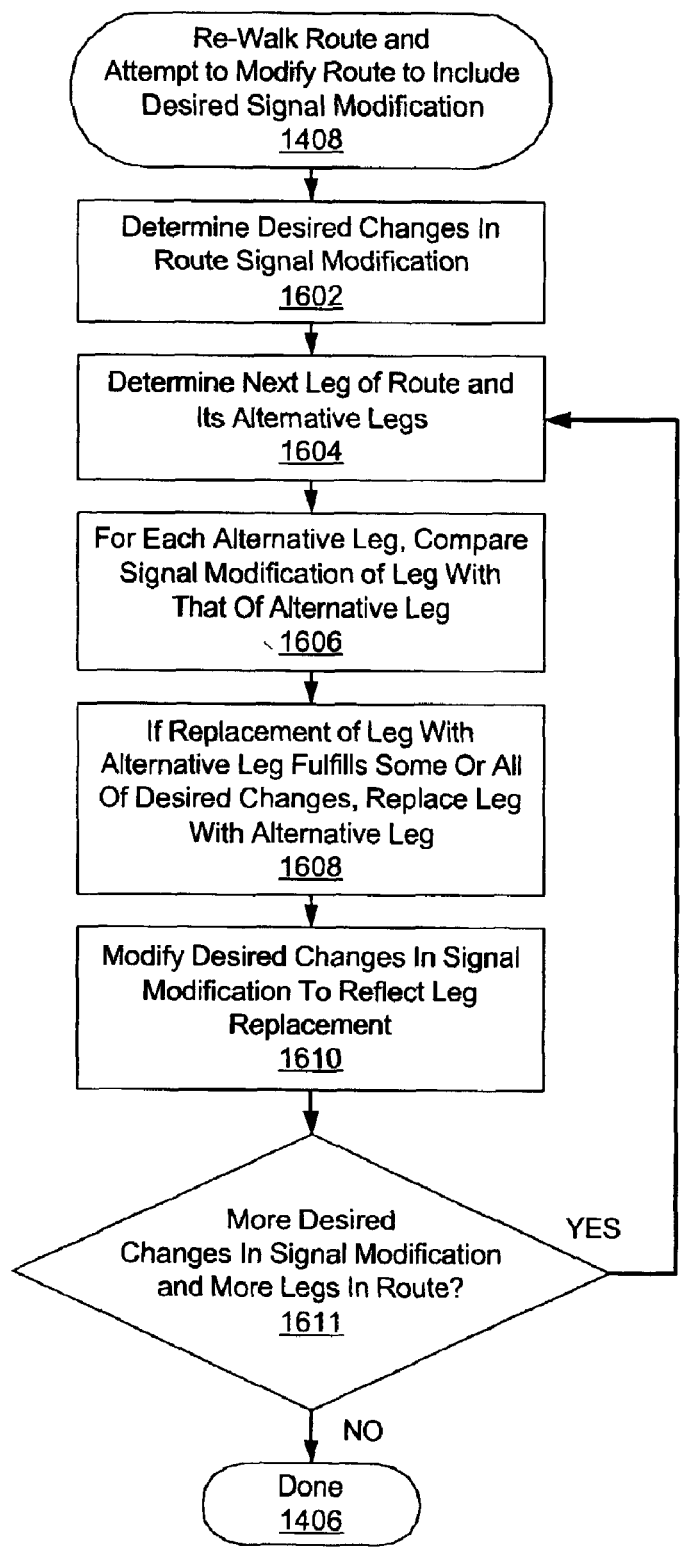
FIG. 16 flowcharts more detailed portion of the method of FIG. 14, according to one embodiment.

FIG. 16—Modifying the Route to Include Desired Signal Modification

FIG. 16 flowcharts a more detailed embodiment of step 1408 of the method of FIG. 14. As noted previously, the methods presented herein are intended to be exemplary, and some of the steps may be performed in a different order than shown, or may be omitted. Additional steps may also be performed as desired.

As FIG. 16 shows, in 1602, desired changes in route signal modification may be determined. Note that prior to performing the method of FIG. 16, an initial route has been programmatically determined (step 1402 of FIG. 14), and desired signal modifications have been determined from route signal modification requirements. In one embodiment, the desired changes in route signal modification may be determined by determining the difference between the current signal modification, i.e., the current signal modification of the route, and the desired signal modification. In other words, the desired changes in the signal modification of the route are the signal modification requirements which are not met by the current signal modification of the route. For example, if the initial determined route does not include signal inversion, and the desired signal modification for the route does include signal inversion, then the desired change in signal modification for the route is a signal inversion. As another example, if the initial determined route does include signal inversion, and the desired signal modification for the route does not include signal inversion, then the desired change in signal modification for the route is removal of the signal inversion. In one embodiment, this may be achieve by addition of a second signal inverter to cancel the initial signal conversion.

In 1604, the next (current) leg of the route may be determined, i.e., selected as the current route. It should be noted that a given route comprises one or more legs, connected sequentially from the route's source to the route's destination. Each of the legs has a leg source and a leg destination, distinguished from the overall route's source and destination. A leg's destination is typically the subsequent leg's source. In the first pass of the method step 1604, a first leg of the route may be selected, i.e., the route leg whose source is the route source. In other embodiments, the route legs may be walked or processed in other orders as desired. In addition to determining the next leg of the route for processing, the leg's alternative route legs may be determined. In other words, any alternative legs of the route which share the same source and destination as the current leg may be ascertained.

In one embodiment, the alternative legs in a route correspond to the various possible signal modifications available for an input to a MUX. For example, if the MUX input terminal may be configured (via settings in the MUX's configuration register) for three different signal modifications, e.g., no inversion, inversion, and synchronization, then the graph may include three corresponding legs, and, assuming that the initial route included the 'no inversion' leg, the alternative legs are the inversion leg and the synchronization leg.

As noted above, if the input terminal of the MUX has already been included in a pre-existing route, i.e., the current route shares the leg with the prior route, then the signal modification of the MUX is set. Thus, the signal modification of the leg is a constraint on the current route determination. In other words, there may be no alternative legs for the leg being considered. In this regard, the current signal modification of the route may be considered a constraint map for the route.

In one embodiment, alternatives to the route leg may comprise more than one leg, i.e., a multi-leg sub-route whose source and destination are the same as those of the current leg may be considered an alternative 'leg'. In another embodiment, an alternative leg in the route may comprise a different hardware component, e.g., a different multiplexer, which shares the source and destination terminals of the route leg.

In 1606, the signal modification of each of the determined alternative legs (if any) may be compared to that of the current leg in light of the desired changes in the route signal modification. Said another way, the signal modification of each of the alternative legs may be analyzed to determine whether replacing the current leg with the alternative leg would satisfy part or all of the desired changes in the route signal modification. In one embodiment, once each of the alternative leg's signal modification has been analyzed, the alternative leg whose signal modification satisfies the greatest portion of the desired changes in route signal modification may be selected for possible replacement of the current leg.

If replacement of the current leg with the selected alternative leg would fulfill some or all of the desired changes in route signal modification (without violating constraints), then in 1608, the current leg may be replaced with the alternative leg, thereby modifying the determined route. For example, if the current leg corresponds to a MUX input terminal with a 'no inversion' signal modification setting, and a signal inversion is needed, then replacing the 'no inversion' leg with an alternate leg may simply mean setting the signal modification setting for the MUX input terminal to indicate a signal inversion.

After the replacement of the leg with the alternative leg, the desired changes in signal modification for the route may be modified to reflect the leg replacement, as indicated in 1610. In other words, if replacement of the leg satisfies part or all of the desired changes, then the signal modifications satisfied by the replacement may be removed from the desired changes in signal modification. In this way, the degree to which the signal modification for the route approaches the desired signal modification may be tracked.

In 1611, a determination may be made as to whether there are further desired changes in signal modification for the route, and whether there are more legs in the route to be processed. In other words, the method may first see if there are additional desired changes in signal modification to be attempted, and also whether there are additional legs in the route to process in the manner described above to attempt to satisfy the additional desired changes. In one embodiment, if there are no further desired changes, the method may omit the check for further legs of the route.

If the method determines that there are no further desired changes in signal modification for the route, or that there are no further legs in the route to process, then the method may terminate, as indicated in 1406. Otherwise, as FIG. 16 shows, the method may return to step 1604 and repeat the above described steps until either all of the desired changes to signal modification for the route have been satisfied, or there are no more legs in the route to process.

Thus, the method may iteratively walk or process legs of the route in an attempt to substitute respective legs of the route with alternative legs whose signal modifications more closely meet the desired signal modifications for the route. It should be noted that although the examples above were described in terms of a simple route with a single signal inverter, more complex signal modification scenarios are contemplated, including, for example, various combinations of signal (polarity) inversion, filtering, synchronization, pre-scaling, and logical combinations with other terminals, i.e., with signals from other terminals, among others. Furthermore, it is noted that the route may be a single-device route, or a multi-device route, as described above.

Thus, various embodiments of the methods described above may programmatically determine routing with signal modifications for a measurement task. More specifically, information specifying a route from a source terminal to a destination terminal in a measurement system may be received that includes one or more signal modification requirements for the route. A current signal modification of the route may be determined. Additionally, one or more desired changes in the signal modification of the route may be determined based on the one or more signal modification requirements for the route and the current signal modification. The route may then be modified to include at least one of the one or more desired changes in the signal modification of the route, thereby generating a modified route which satisfies at least a portion of the one or more signal modification requirements for the route. Finally, the modified route may be stored. The modified route may then be usable to route signals in performing the measurement task.

Routing and Hardware Sharing

It is possible that two or more routes might overlap in a compatible fashion, e.g., if these two routes have the same source and destination. When routes overlap in a compatible fashion, the routing software may handle this situation as follows:

As an example, assume that two separate tasks generate the same route. The resources associated with the routes will generally not be released until both tasks have completed. Mixing task-based and immediate routes may also be allowed. However, the hardware resources may not be released until all task-based routes have been released and the immediate route has been disconnected. The releasing of a task-based route is preferably handled by the software client of the route. It should be noted that typically, releasing a task-based route by calling a termination or destroy function may not be allowed, i.e., in general, task based routes must be released by stopping the task.

When multiple routes are programmatically determined for a task, such as a measurement task, routing resources may need to be managed at a more granular level than in traditional routing systems, especially when one or more legs, i.e., routing resources, are shared between multiple routes. Examples of routing determinations with shared routing resources are shown in FIGS. 17-19C, and described below.

Figure 17A:
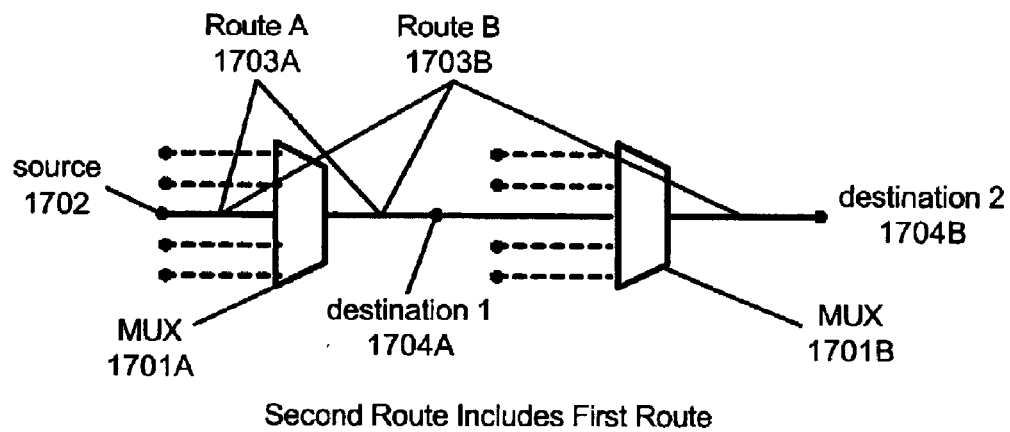
FIGS. 17A and 17B illustrate two simple examples of shared routing, according to one embodiment.
Figure 17B:
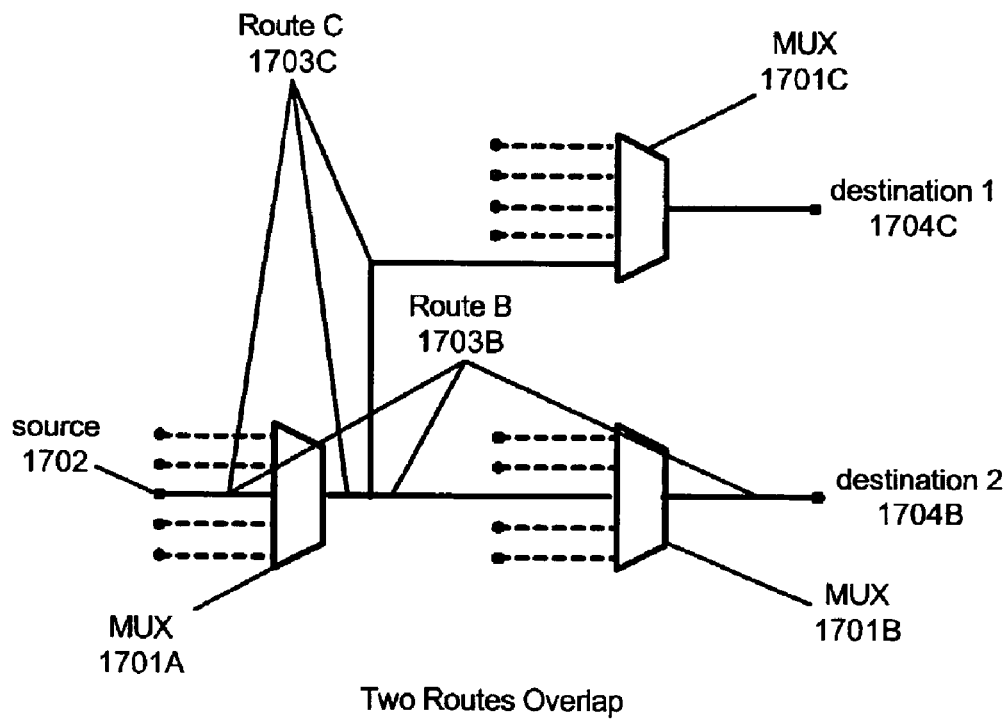

FIGS. 17A and 17B—Examples of Simple Shared Routing

FIGS. 17A and 17B illustrates two simple route sharing scenarios. More specifically, FIG. 17A illustrates a scenario where a first route, route A 1703A, runs from source 1702 through a first MUX 1701A to destination 1 1704A, and a second route, route B 1703B, runs from the source 1702 through the first MUX 1701A, destination 1 1704A, and a second MUX 1701B, to destination 2 1704B. As may be seen, route B 1703B includes route A 1703A in its entirety, thus, route A 1703A is a subset of route B 1703B, and thus the first MUX 1701A is shared between the two routes. It is noted than in other embodiments, the source 1702 may not be shared, but rather, each route may have a distinct source, where both the source and destination for route A 1703A lies between the source for route B 1703B and the destination for route B 1703B.

FIG. 17B illustrates a scenario where a first route, route C 1703C runs from source 1702, through MUX 1701A and MUX 1701C, to destination 1 1704C, and the second route, route B 1703B, runs from the source 1702, through MUX 1701A and MUX 1701B, to destination 2 1704B. It may thus be seen that route C 1703C and route B 1703B overlap at the source 1702 and the first MUX 1701A, and thus share MUX 1701A. Further descriptions of route determination for these two scenarios are presented below with reference to FIGS. 18A–18C and FIGS. 19A–19C.

Figure 18A:
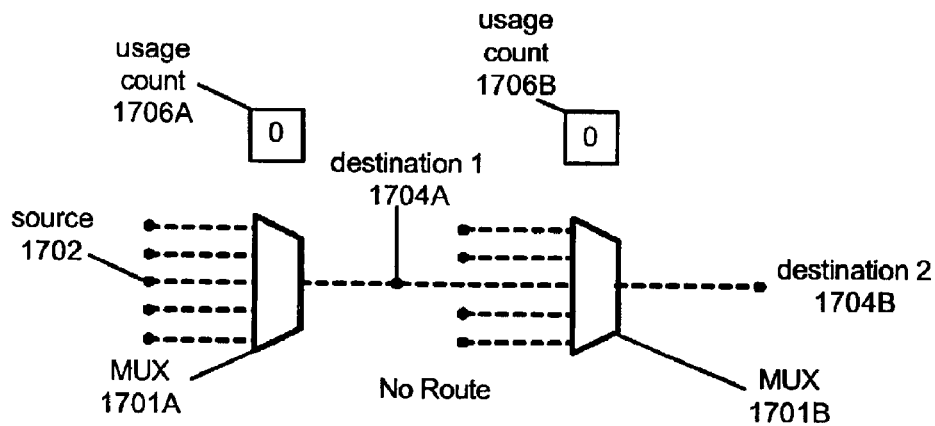
FIGS. 18A–18C illustrate a route determination sequence for the routing scenario of FIG. 17A, where a first route is a subset of a second route, according to one embodiment.
Figure 18B:
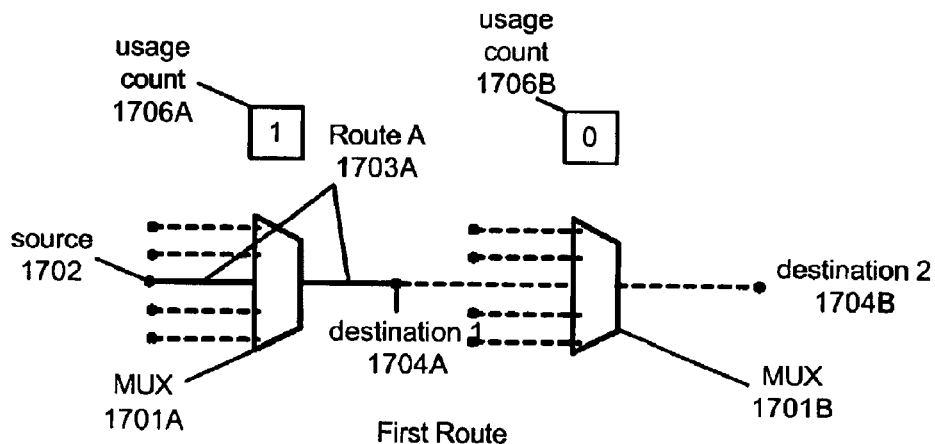
Figure 18C:
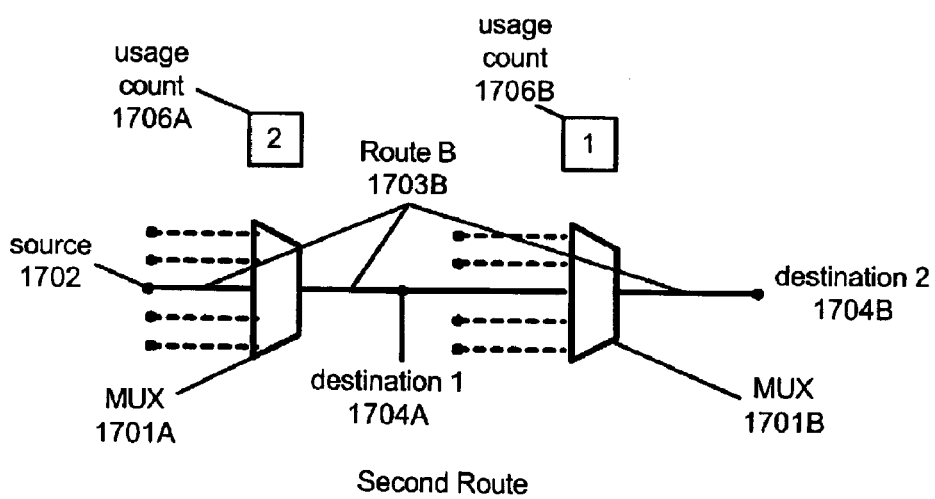

FIGS. 18A–18C—Example of Routes with A Subset/Superset Relationship

FIGS. 18A–18C illustrate the routing scenario of FIG. 17A, where a first determined route is a subset of a second determined route, according to one embodiment. In other words, the route "source-destination1" is a subset of route "source-destination2". In this scenario, a first route is determined, then a second route is determined which includes the first route in its entirety.

As FIG. 18A shows, in this simple example routing scenario, the source 1702 is an input terminal for MUX 1701A, destination 1 1704A lies between MUX 1701A and MUX 1701B, and destination 2 1704B is on the output terminal of MUX 1701B. As FIG. 18A also shows, the two MUXs 1701A and 1701B have respective usage counts 1706A and 1706B, each with a value of 0, indicating that the respective routing resources, namely the two MUXs, have not been reserved by or for a prior route.

In FIG. 18B, the measurement system (or measurement subsystem) of FIG. 18A is shown where route A 1703A, with source 1702 and destination 1 1704A, has reserved multiplexer 1701A. To indicate the reservation of the routing resource (the MUX) 1701A, the usage count 1706A is incremented, e.g., from zero to one, thus indicating to subsequent routing processes that the routing resource 1701A is already included in a route, and thus constitutes a constraint on the subsequent routing determinations.

FIG. 18C illustrates the measurement system (or subsystem) of FIG. 18B, but where a second route 1703B has been determined, in this case, from source 1702 to destination 2 1704B. The second route 1703B thus traverses both MUX 1701A and MUX 1701B, and includes the first route 1703A entirely. Note that once the first and second multiplexers 1701A and 1701B are included in or reserved by the second route 1703B, their respective usage counts 1706A and 1706B are incremented, as shown.

Figure 19A:
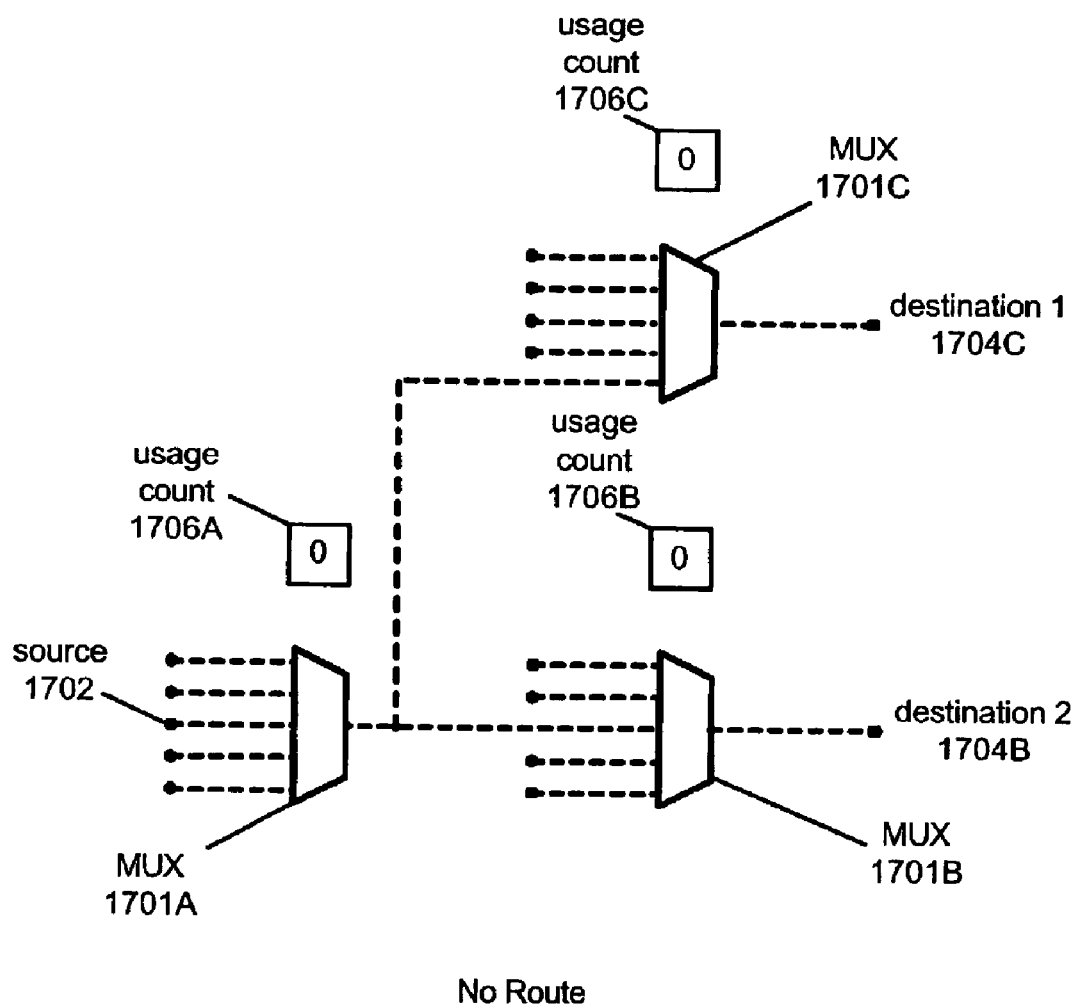
FIGS. 19A–19C illustrates a route determination sequence for the routing scenario of FIG. 17B, where a first route and a second route overlap, according to one embodiment.
Figure 19B:
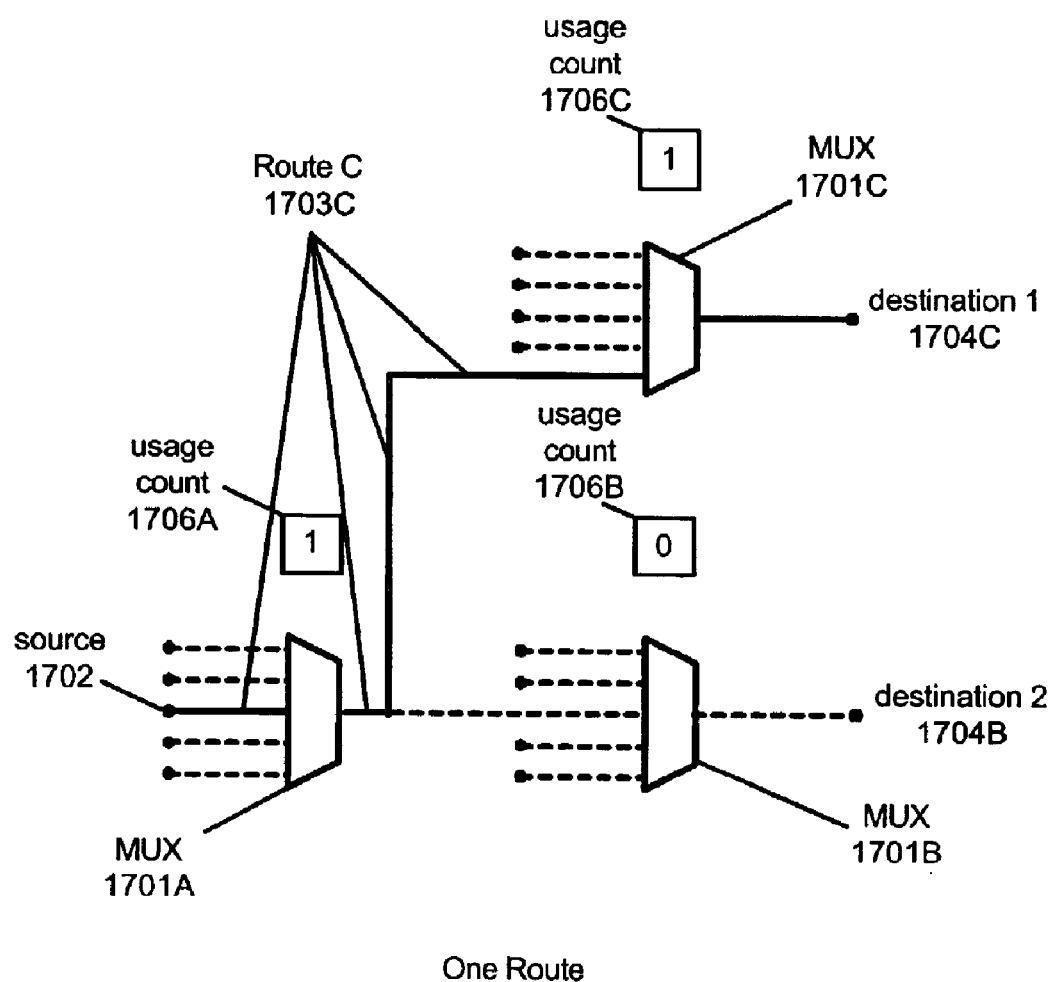
Figure 19C:
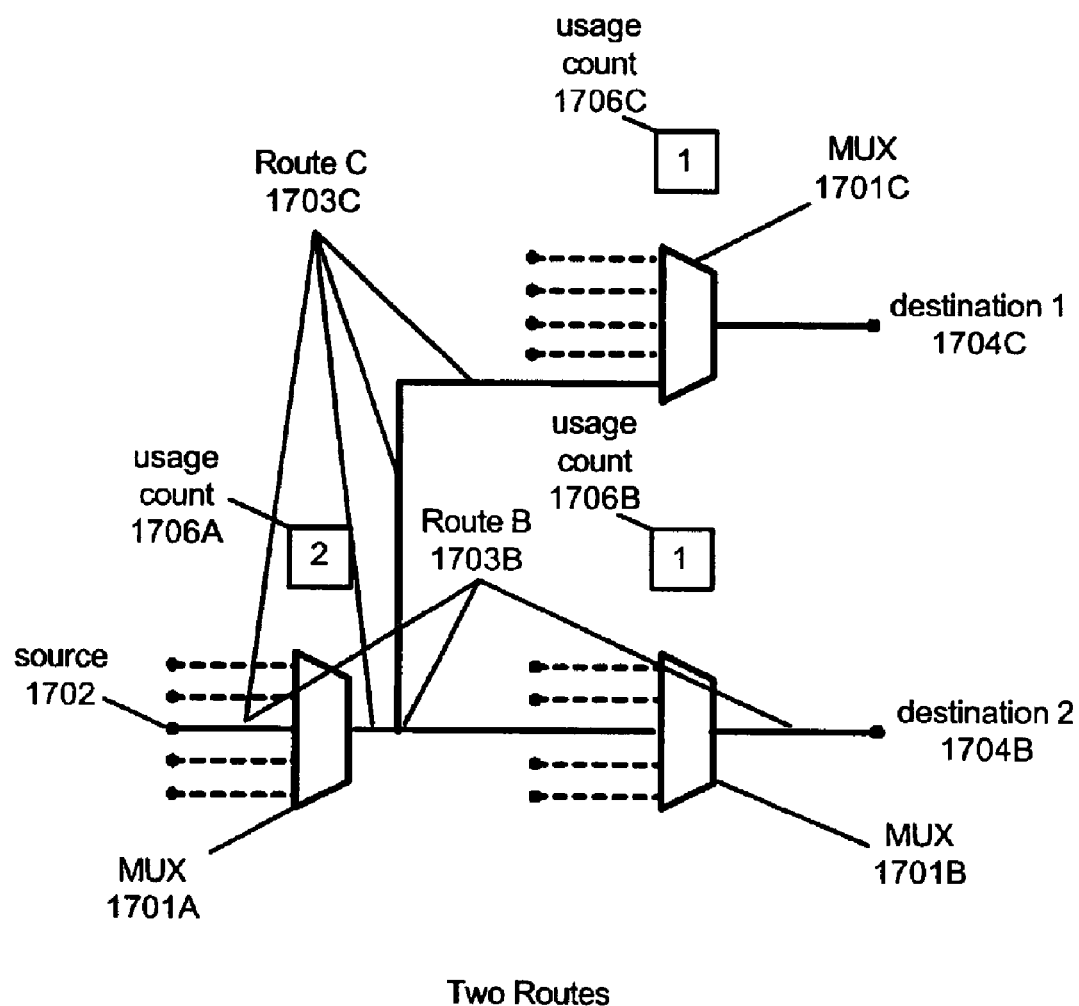

FIGS. 19A–19C—Example of Overlapping Routes

FIGS. 19A–19C illustrate the routing scenario of FIG. 17B, where a first determined route overlaps a second determined route, according to one embodiment. In other words, the two routes simply overlap one another. In this use case the route "source-destination1" overlaps "source-destination2" at the beginning of the route, but the ends of the routes do not overlap.

As FIG. 19A shows, in this example routing scenario, the source 1702 is an input terminal for MUX 1701A, destination 1 1704C is on the output terminal of MUX 1701C, and destination 2 1704B is on the output terminal of MUX 1701B. As FIG. 19A also shows, initially the three MUXs 1701A, 1701B, and 1701C have respective usage counts 1706A and 1706B, each with a value of 0, indicating that the respective routing resources, namely the three MUXs, have not been reserved by or for a prior route.

In FIG. 19B, the first route, route C 1703C has been determined, running from source 1702 to destination 1 1704C, and thus reserving and incrementing the respective usage counts of MUX 1701A and 1701C, as shown.

Then, as FIG. 19C shows, the second route, route B 1703B is determined, where the route 1703B begins at the source 1702, traverses MUX 1701A and MUX 1701B, and ends at destination 2 1704B. The usage counts of MUX 1701A and MUX 1701B are incremented to indicate reservation by the route 1703B, as shown. Thus, the usage count 1706A of MUX 1701A, which was previously reserved by route A 1703, is incremented from 1 to 2, and the usage count 1706B of MUX 1701B, which was not previously reserved, is incremented from zero to one.

Figure 20:
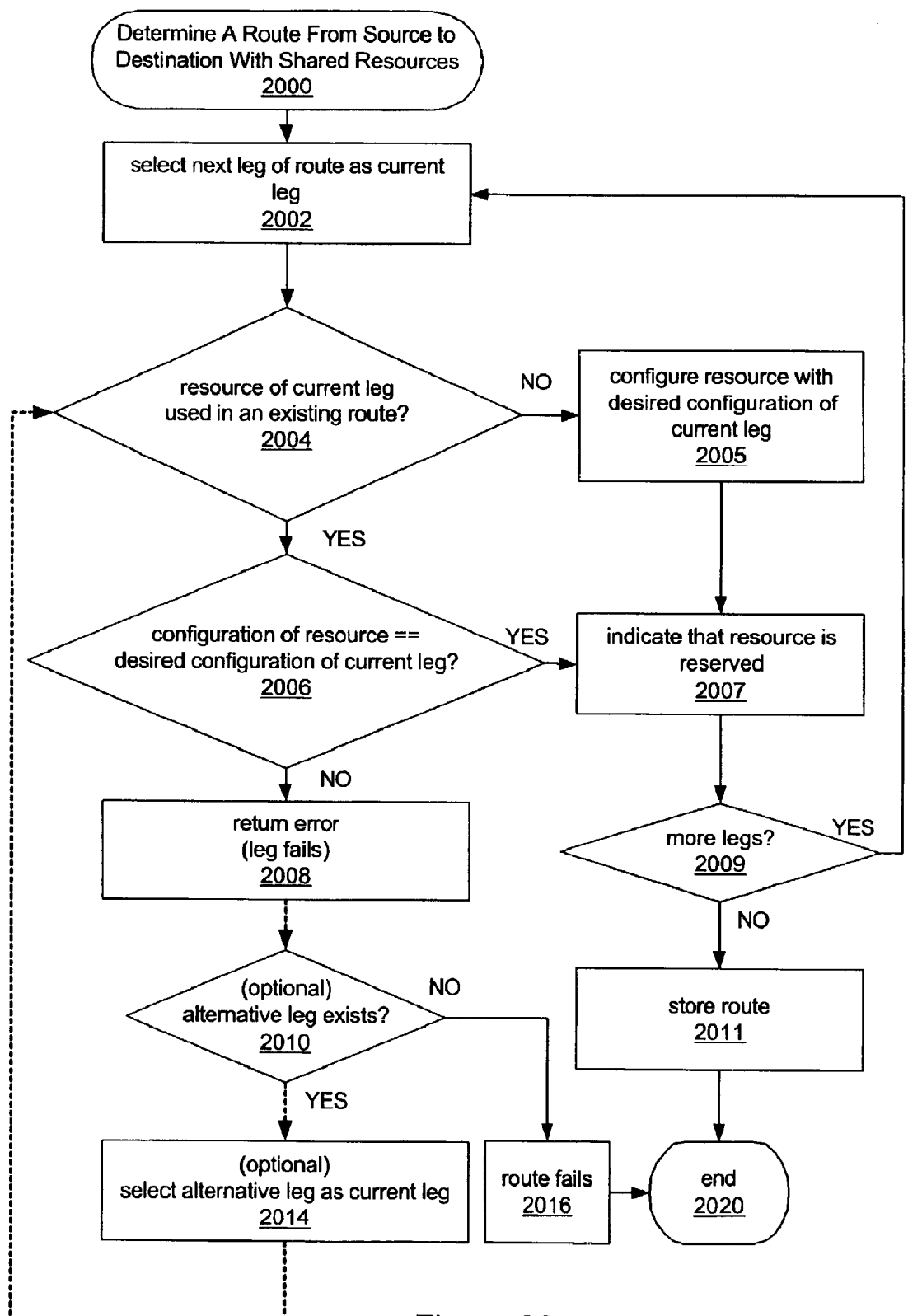
FIG. 20 flowcharts a method for dynamically managing shared routing resources for a measurement task, according to one embodiment.

FIG. 20—Method for Route Sharing

FIG. 20 is a flowchart of one embodiment of a computer-implemented method for managing routing resources in a measurement system, where at least one of the routing resources is shared between routes. As noted above, the method presented in FIG. 20 is exemplary, and some of the steps may be performed in a different order than shown, or may be omitted. Additional steps may also be performed as desired. In this embodiment, the source and destination of the route have been specified, and the respective legs of the route may be created and/or analyzed for inclusion in the route, as described below. In one embodiment, the legs of the route may already by selected as a preliminary or proposed set of legs. In another embodiment, the proposed set of legs may not be previously determined, and thus may be determined as the method is performed.

As FIG. 20 shows, in 2002, a next leg of the route may be determined or selected as the current leg. In one embodiment, in a first pass of the method, this selected next leg of the route is the first leg of the route, i.e., the leg of the route which includes the route source.

In 2004, a determination may be made as to whether a routing resource of the current leg is already reserved for use by a prior or existing leg. In other words, the method may determine if the routing resource for the respective leg is not currently used in an existing route. In one embodiment, the routing resource has a usage count indicating the number of prior or existing routes that have reserved the routing resource. In this embodiment, determining if a routing resource for the respective leg is not currently used in an existing route comprises determining if the usage count has a value of zero.

Then, as indicated in 2005, if the routing resource of the current leg has not been used or reserved in a prior or existing route, then the routing resource may be configured with a desired configuration of the current leg. In other words, the routing resource is not constrained by a prior configuration, and thus may be set to the current leg's desired configuration. In one embodiment, the current leg may have a default configuration, and so, if the default configuration is the desired configuration, configuring the resource may not be necessary.

Once the routing resource has been configured, then in 2007, the method may indicate that the resource is reserved. In the embodiment where each routing resource has a usage count, indicating that the routing resource is reserved may comprises incrementing the usage count of the routing resource by one. Thus, since the resource was not previously reserved, the usage count was initially equal to zero, thus, incrementing the usage count by one results in a usage count of one.

After the resource has been reserved, then the method may determine if there are more legs in the route to analyze or create, as indicated in 2009, and if there are more legs in the route, the method may return to step 2002, as shown.

If there are no more routes to process, then in 2011, the route may be stored, e.g., in a memory of the computer, and the method may terminate, as indicated in 2020, where the route is operable to route signals in performing the measurement task.

In step 2004 above, if the method determines that the routing resource of the current leg is used in a prior or existing route, i.e., has been reserved for use by another route, then in 2006, the method may determine whether the routing resource's configuration is the same as the desired configuration of the current leg. If the routing resource's configuration is the same as the desired configuration of the current leg, then the method may proceed with step 2007, as described above.

If the routing resource's configuration is not the same as the desired configuration of the current leg, then an error, e.g., an error message or code, may be returned indicating that the leg failed, as shown in 2008. In one embodiment, if the leg fails, then the method may optionally determine if alternative legs (to the current leg) are possible or exist, as indicated in 2010, and if no alternative legs for the current leg exist, the route may fail, as 2016 indicates, and the method may terminate in 2020. For example, the method may analyze a graph representing the connectivity of routing resources and identify alternative possible legs for the route, i.e., legs with the same source and destination as the current leg. Note that the source and destination of a leg is not generally the same as the source and destination of the route. Thus, determining if an alternative leg exists may mean checking whether an alternative leg is possible, rather than whether the alternative leg is already existent in a previously determined route.

If one or more alternative legs for the current leg do in fact exist, i.e., are possible, then in 2014, the method may optionally select an alternative leg as the current leg, and the method may continue with step 2004, as described above. In other words, an alternative leg for the route may be created if the desired configuration of the current leg does not match the current configuration of the routing resource, where the alternative leg includes a different routing resource than the respective leg.

Thus, in one embodiment, the method may repeat the above steps for each respective leg of the route until either the route fails, or there are no more legs in the route to determine or create, in which case the route determination is successful and the route is stored. The stored route may then be useable at runtime of the task, as described above. For example, if a plurality of routes are determined, then at runtime, one of the routes may be selected, e.g., based on routing resource availability, and one or more devices in the measurement system configured with the route, as described above in steps 510 and 512 of FIG. 5.

In one embodiment, after performance of the measurement task, the route may be released. In other words, the routing manager may indicate that each of the routing resources reserved by or for the route is "un-reserved" by the route. In the embodiment where each routing resource has a usage count, releasing the route may include decrementing usage counts of the routing resources of the respective legs of the route by one. If and when the usage count of a routing resource is zero, the routing resource of is freed, i.e., is available as a free resource for use and/or re-configuration in subsequent route determinations. Thus, in one embodiment, each respective routing resource has a usage count which indicates the number of routes which have reserved the respective routing resource. Furthermore, reserving the respective routing resource includes incrementing the usage count, and releasing the respective routing resource includes decrementing the usage count, where a usage count of zero indicates that the respective routing resource is free.

In some embodiments, the mechanism of usage counts for routing resources may be used in different ways. For example, in one embodiment, when creating and storing the legs of the route are performed in a verify stage, i.e., as a pre-process, the usage count of a respective routing resource may be a temporary usage count indicating the number of routes in the measurement system which have reserved the respective routing resource for the measurement task. In other words, the usage count may only reflect reservations by routes for a particular task. In this case, when route determination for the measurement task begins, the usage counts will preferably be set to zero, indicating that no prior routes for this task have reserved the routing resource. Thus, in this context, the usage count may be considered to be a local usage count.

In another embodiment, creating and storing the legs of the route may be performed in a runtime stage, i.e., at or just prior to execution of the measurement task.

The usage count of the respective routing resource may indicate the number of routes in the measurement system which have reserved the respective routing resource, including route reservations by and for routes for other tasks. In other words, the usage count of the respective routing resource may represent an actual state of the respective routing resource hardware. Thus, in this case, the usage count may reflect reservations by and for prior or existing routes associated with other tasks, as well as any reservations may by and for the current task. In this context, the usage count may be considered to be a global usage count, meaning that the usage count reflects use by any routes in the measurement system.

It should be noted that in some embodiments, both usage counts may be used. For example, the route determination may be performed initially in a verify stage of the measurement process, where the feasibility of routes is checked for a proposed measurement task. In this situation, some or all of the actual hardware of the measurement system (except the computer 102, of course) may not be installed. In other words, the route determination may be performed using data, e.g., topography descriptions, route specifications, etc., to determine the routes, where the local usage counts are used to track routing resource usage/reservations. Then, at runtime, the route determination may be performed again, but with the hardware in place. In this context, the global usage counts may be used to manage the routing resources, as described above.

Task-Independent (Immediate) Routes

Routes created for a measurement task may generally include a task reference which indicates the associated measurement task. However, in some embodiments, it may be desirable to create routes outside the context of a measurement task. In other words, there may be a need to create and release a route independent of the task(s) in which it is used. Immediate routes may thus not have an associated task reference. Such routes may be referred to as task-independent routes, or immediate routes, as described briefly above.

In one embodiment, an immediate route may be created and destroyed by API (Application Programming Interface) calls. For example, in one embodiment, a call to "Connect Terminals" with the source and destination terminals as arguments may be used to create the route, and a call to "Disconnect Terminals" for destruction of the route.

Creation and destruction of immediate routes may differ somewhat from task-based routes. For example, usage counts of components in a task-based route may be incremented each time a route reserves the components, and thus, if a task-based route is reserved three times, then the route must be released three times (or the task terminated) before being destroyed. In contrast, in the case of an immediate route, if route were created multiple times for a source and destination, then the route could be destroyed with a single function call, as will be described below. In one embodiment, there may only be one immediate route between a particular source and destination, and so immediate routing calls may be tracked on a source/destination basis. More specifically, immediate routes may be tracked by storing their associated source/destination pairs in a routing table. Because of the fact that only one immediate route may exist between a particular source/destination, the first immediate route reserved between that source and destination will be the immediate route for that pair. In other words, in task-independent routing, there may not be multiple routes between a particular source and destination. Creation and destruction of an immediate route are described below with reference to FIGS. 21A and 21B.

Figure 21A:
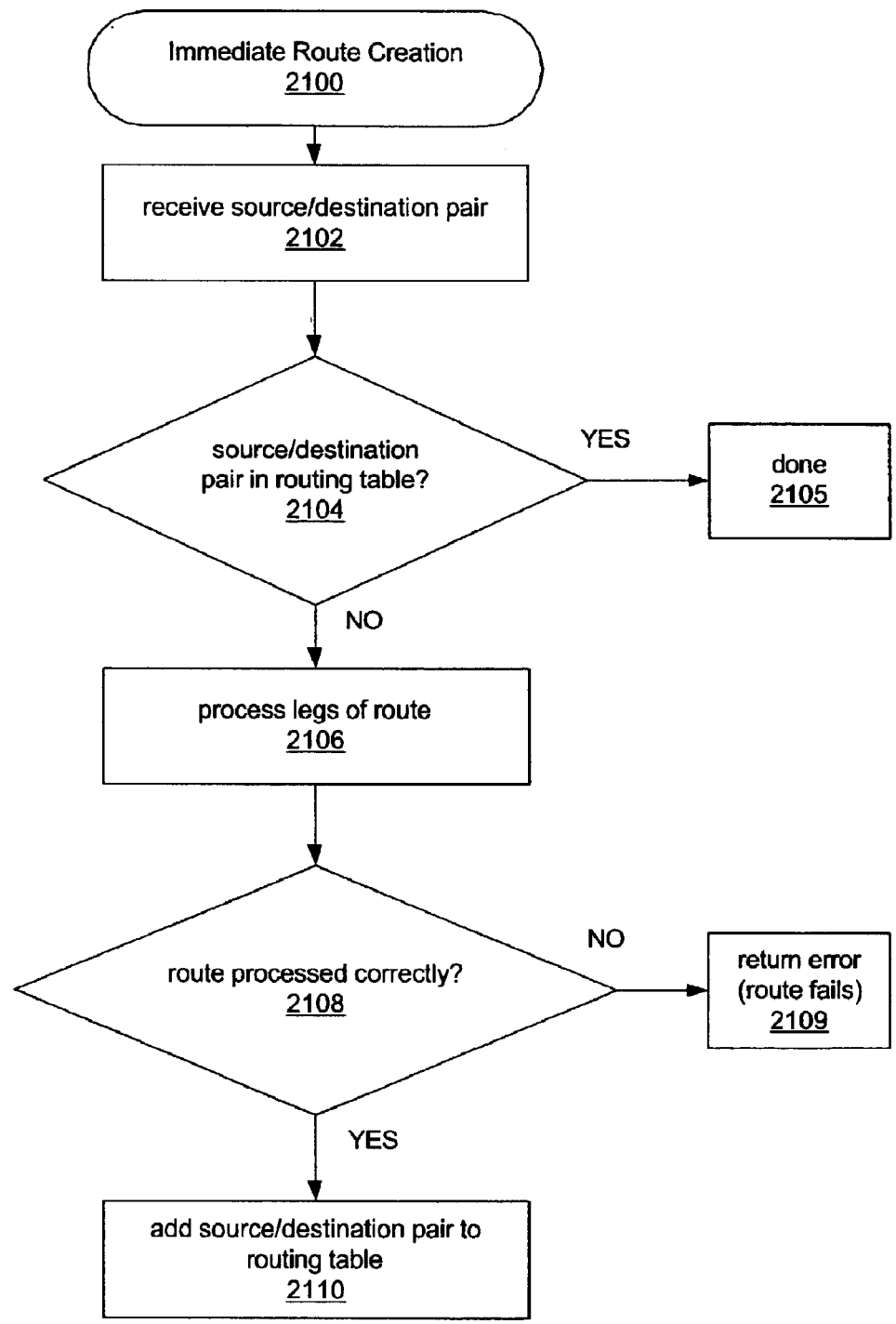
FIGS. 21A and 21B respectively flowchart creation and destruction of task-independent routes, according to one embodiment.
Figure 21B:
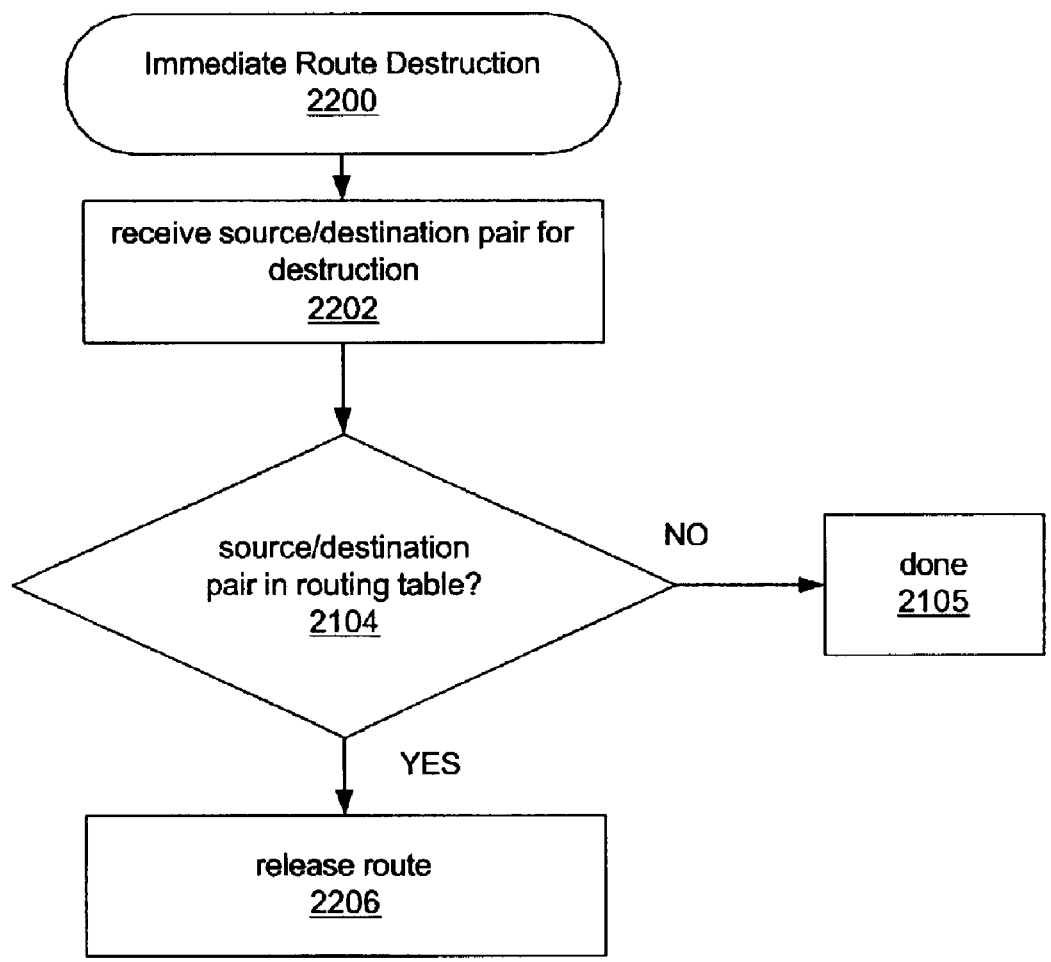

FIGS. 21A and 21B—Creation and Destruction of Immediate Routes

FIGS. 21A and 21B illustrate the creation and destruction of immediate, or task-independent routes, respectively. As noted above, in some embodiments, various of the steps may be performed in a different order than shown, or may be omitted. Additional steps may also be performed.

FIG. 21A flowcharts one embodiment of a method for creating an immediate or task-independent route. As FIG. 21A shows, in 2102, a source destination pair may be received. For example, in one embodiment, a call to "Connect Terminals" may be made with the source/destination pair as arguments.

Then, in 2104, the routing table may be checked for inclusion of the received source/destination pair.

If the source/destination pair is found in the routing table, then the method may simply return, as indicated in 2105. In other words, the immediate route between the source and destination already exists, and so nothing more needs to be done.

If the source/destination pair is not found in the routing table, then in 2106, the method may process the legs of the route normally, as described above with reference to FIG. 20.

Then, in 2108, a determination may be made as to whether the route has processed successfully, i.e., if the route was successfully determined from the source to the destination. If the route was not processed successfully, then an error may be returned, as indicated in 2109. If, on the other hand, the route was process successfully, then the source/destination pair may be added to the routing table, as 2110 indicates. It is noted that this route may then be the only immediate route allowed between the source and destination. It is also noted that when the route is committed to hardware, the method may proceed in the same manner as with task based routes.

FIG. 21B flowcharts one embodiment of a method for destroying an immediate route. As FIG. 21B shows, in 2202, a source/destination pair may be received for immediate route destruction. In one embodiment, for example, a call to "Disconnect Terminals" may be made with the source/destination pair as arguments.

Then, in 2104, the routing table may be checked for inclusion of the received source/destination pair.

If the source/destination pair is not found in the routing table, then the method may simply return, as indicated in 2105. In other words, the immediate route between the source and destination has already be destroyed, and so nothing more needs to be done.

If the source/destination pair is found in the routing table, then the method may release the route normally, as indicated in 2206. In other words, all of the routing resources reserved by the route may be decremented and possibly freed.

Thus, various embodiments of the systems and methods presented above may programmatically manage shared routing resources, preserving and utilizing pre-configured or specified routing resources reserved by prior determined routes. The route determination may be performed programmatically, utilizing routing resources in a more efficient manner by sharing the resources where possible. Additionally, the method may operate for both task-based and task-independent route determination (and destruction).

Line Tri-Stating Issues

In one embodiment, during device initialization, all terminals on the I/O connector and trigger buses must be tri-stated. Tri-stated means the multiplexer is electrically disconnected from its output bus. In order for the terminal to be driven from the device, the tri-state buffer associated with the terminal must be enabled. There are a number of different cases of tri-state buffer configuration, as illustrated by the examples described below.

In a first case, a device includes a single bi-directional terminal on the I/O connector, referred to as the trigger terminal for reference purposes. The trigger terminal of the device is bi-directional in that the device can read from the trigger terminal or drive onto the trigger terminal.

Scenario:

The trigger terminal is being driven by an external trigger signal only.

Usages and Consequences:

This is a common use case for triggering an operation from an external source. As a result of this operation, the tri-state buffer associated with the trigger terminal must be disabled so that the internal trigger signal does not drive the trigger terminal too.

Scenario:

The trigger terminal is being driven by the internal device trigger only.

Usages and Consequences:

In this use case, an internally generated trigger triggers an operation of the device. This signal could be useful for other devices, as well. In order to export this trigger signal, the tri-state buffer associated with the trigger terminal must be enabled so that the device is able to drive the terminal with the trigger signal. It is important that there be no other devices driving the trigger terminal, thus any other connected device terminal should be tri-stated.

Scenario:

The trigger terminal is being driven by both the internal device trigger AND an external trigger signal.

Usages and Consequences:

Driving the trigger terminal both internally and externally is called double driving. If the internal and external sources drive the terminal differently, usually the driving hardware will be damaged, but more extreme consequences can occur, as well. Thus, care should be taken to avoid double driving any terminals on I/O connectors.

Lazy Line Transitions

When a route gets created and released, it need not program the hardware to disable the route. The hardware resources associated with the route may certainly be released, but the configuration may remain so that glitches may be minimized.

In one embodiment, all tri-state buffers associated with I/O connector pins may be disabled by default. When a route with a destination on the I/O connector is released, the tri-state buffer associated with the I/O connector may not be disabled. This means that even though the route was released, glitches are minimized on the destination pin on the I/O connector. If this behavior is not desirable, the tri-state buffer associated with the I/O line may be disabled by using the tri-state mode. Putting the line back into a tri-state mode is necessary if an external signal must be connected to the I/O pin. If the line is not tri-stated first, then double driving the line may damage the hardware.

In contrast, terminals on public buses may not be driven if the terminal is not reserved. This is so because the routing manager may allow another device to drive that terminal. If the terminal were not properly released, then more than once device may be driving that terminal. Terminal contention for the I/O connector may not be handled by the routing manager if the user is responsible for managing it.

Device Resetting and Interactions with Routing

In one embodiment, when the user resets a device, every route associated with the device may be invalidated. If a task-based route is invalidated using a device reset, then its parent task may be invalidated, as well.

For example, assume device A is used by a task that performs a measurement operation. This same measurement operation receives a trigger from device B. This task spans devices A and B via multi-device routing. If device B is reset, then all routes associated with device B will be destroyed. The invalidation of the task based route on device B may cause its parent task on device A to be invalidated, as well. The user should consider these possible consequences when issuing a device reset. If the route between device A and B were an immediate route, then there would not be a relationship between the immediate route and the task, thus, the task will not be invalidated. However, because an integral route was destroyed without the task's knowledge, the task may not behave correctly.

Wired-Or and Routing

In an embodiment where the measurement system includes an SCXI trigger backplane, the SCXI trigger backplane may support wired-or functionality. Wired-or allows multiple devices to send multiple signals over a single trigger line. Since "n" devices can send "n" signals over a single trigger line, then "n-1" trigger lines are saved.

Terminal Aliasing

Some terminals may have more than one name, referred to as terminal aliasing. By default all terminals have a physical terminal name. For example, the counter source selection for counter 0 on an E-series board has a fully qualified terminal name of "MyDevice/stc0/Counter0SourcePolarity". This functional terminal name is not very useable to an end user, so it is mapped to "MyDevice/Counter0Source". Both names refer to the same internal terminal on the STC chip, but the aliased name is provided as a user friendly label. Of course, both terminal names may be used interchangeably.

Meta-Routing Tool

In one embodiment, the routing system may include a meta-routing tool which operates to provide routability information for one or more devices in the measurement system. The meta-routing tool may include a meta-routing API which gives users means to query the system for a broad range of routing information. The meta-routing tool may not allow users to make routes, but it may allow users to query the system regarding possible or current routes.

While prior art solutions to meta-routing generally present all possible routes for a device, the meta-routing tool may provide this information, and may also provide additional benefits. For example, in one embodiment, the meta-routing tool may generate routability tables automatically. While the source of the tables or device topographies may, in some cases, still be built by hand, the table building process may be fully automated and thus more reliable. In embodiments where device topography files are generated automatically, the entire process may then be substantially automated, thereby reducing the chance for human error. Furthermore, because the routability tables are generated automatically, no additional effort is required by the user, i.e., there is no human investment in the building of the routability tables.

The meta-routing tool preferably uses device topographies, as described above, to generate the routability tables, thus, any device which has a topography file supports the meta-routing tool. In one embodiment, if a device's routing information changes, with a corresponding change in its topography file, then the meta-routing tool may update itself. The meta-routing tool may only be available on the user's machine in its dynamic form, and thus, the generated routing tables may not get stale, i.e., may not become outdated. Furthermore, because each device has generally has its own topography, the meta-routing tool may create a routability table individual to each device.

In one embodiment, the meta-routing tool may be coupled to or comprised in a device manager on the users computer system 102. For example, in one embodiment, the meta-routing tool may be available in the National Instruments device manager known as MAX (Measurements and Automation Explorer). The inclusion of the meta-routing tool in the device manager may provide a single location for the tool where it is always available and always up to date.

As mentioned above, in one embodiment, the meta-routing tool may augment the information traditionally given in a routability table. For example, a user may be able to see the actual path a route takes through the hardware. As another example, the user may be able to see potential side effects a route may have upon the device.

Figures 22A, 22B:
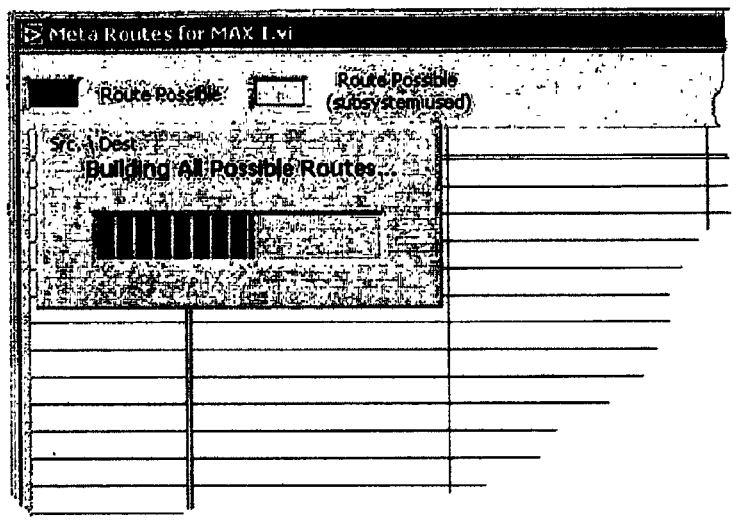
FIGS. 22A and 22B illustrate a meta-routing table, according to one embodiment.

FIGS. 22A and 22B—Meta-Routing Tool Display

FIGS. 22A and 22B illustrates the meta-routing display, according to one embodiment. In the embodiment shown in FIG. 22A, when the user invokes the meta-routing tool for a device, for example, by opening or executing a device manager program, a screen may be displayed indicating that the meta-routing tool is determining all of the possible routes for the device. In other words, the meta-routing tool may initialize itself, using the device's topography description to determine a route from every public source to every public destination in the device. This process is described in more detail below with reference to FIG. 23.

Then, once the initialization process is complete, then as FIG. 22B shows, a screen may be displayed indicating the determined routes. As FIG. 22B shows, the valid sources are displayed in the left most column and the destinations are shown in the top row. The other cells in the table represent the possible routes between the sources and destinations. Black cells symbolize valid routes while gray cells represent valid routes with some side effects. In the screen shown in FIG. 22B, the user has clicked on the cell corresponding to a route with the source PFI7 and destination PFI3, shown with black border.

In the embodiment shown, more detailed information regarding the selected route may be displayed in an information window below the table. In this example, because the route is valid, a list of terminals from the source to the destination, e.g., a component-wise path, appears in the information window. Since the cell is gray, the side effect of the selected route is also described. More specifically, the information indicates that counter 1 on the device is used in the route, and thus may be unusable for other routes.

Users may use this table to peruse, assess, and analyze the routability of a device. For example, a user will generally require routability information for a device for setting up triggers or exporting hardware events. Additionally, if there is a resource conflict on the device, the user may use the meta-routing tool to gather information for resolving the conflict. For example, the user may use the meta-routing tool to compare the side effects of two conflicting routes, and may select one of the routes as a higher priority route based on the side effects and/or other criteria. The user may then use the meta-routing tool to determine an alternative route to replace the lower priority route.

Figure 23:
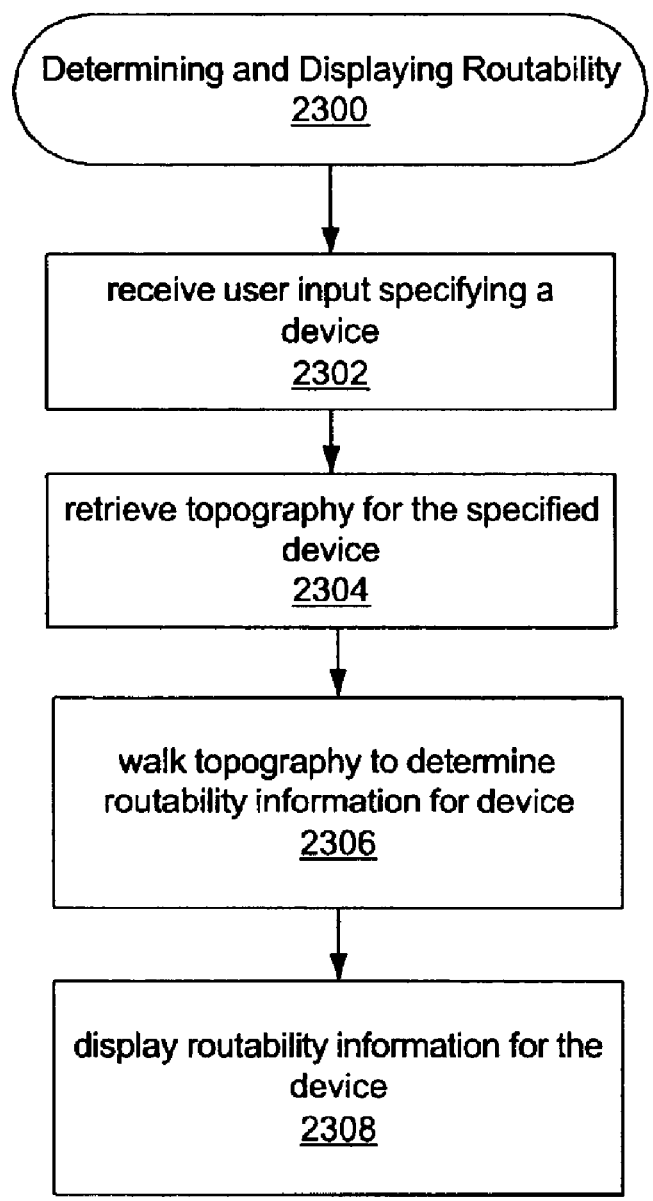
FIG. 23 flowcharts a meta-routing method, according to one embodiment.

FIG. 23—Determination of Device Routability

As mentioned above, the meta-routing tool may generate the routability information based on device topography information. Thus, the meta-routing tool may require that all supported devices have a map or topography of the (device) board, e.g., in the form of a topography file. FIG. 23 flowcharts one embodiment of a method for generating the routability display shown in FIGS. 22A and 22B. As noted above, in various embodiments, some of the steps of the method may be performed in a different order than shown, or may be omitted as desired. Additional steps may also be performed.

As FIG. 23 shows, in 2302, user input may be received specifying a device for which routability information is desired. In an embodiment in which the meta-routing tool is comprised in (or coupled to) a device manager program, the user may run the device manager on the computer system 102, and select the device for routability analysis. The device manager may automatically invoke the meta-routing tool, or may receive input from the user specifically invoking the tool for the specified device.

In response to specifying the device in 2302, the meta-routing tool may retrieve topographical information for the device, e.g., in the form of a topography file, as indicated in 2304. For example, the topographical information may be retrieved from a database. As described above, in one embodiment, the topography file for a device may be a text file which indicates the connectivity among the components of the device. In other embodiments, the topography file may be in the form of a graphical diagram, or a graph comprising nodes and edges representing the terminals and components of the device. The topography file may be stored on the user computer system 102, or alternatively, may be stored on a server computer which is coupled to the computer system 102 over a network, such as the Internet. For example, in one embodiment, a routability information server may store topography descriptions for many devices, and may be accessed by the client computer 102, e.g., over a network, to retrieve respective topography descriptions for supported devices, e.g., by device IDs. In one embodiment, device manufacturers (or providers) may register devices with the routability server, providing topography descriptions for the registered devices. Users may then access the server (e.g., via respective client computer systems 102) to retrieve the topography descriptions as needed (e.g., via the meta-routing tool, or a routing manager program). In one embodiment, payment of a fee may be required to retrieve the latest topography description for a device, and thus payment information, e.g., a credit card number, may be provided by the client to an e-commerce server prior to retrieving the topography description.

Once the topography description for the device has been retrieved, then, in 2306, the meta-routing tool may walk the topography of the device to determine routability information for the device. In other words, the meta-routing tool may parse the topography file, tracing the connectivity through all of the routing components of the device. Additionally, the meta-routing tool may retrieve information from the topography file indicating side effects for routes through one or more of the components. For example, if a routing component in a proposed route includes a counter, then use of the route may preclude use of the counter by other routes (see FIG. 22B, described above).

Finally, in 2308, the meta-routing tool may display the determined routability information for the device in a routability table, e.g., as shown in FIG. 22B and described above. In one embodiment, the method may further include receiving user input specifying one of the indicated possible routes in the routability table. The meta-routing tool may then display additional routing information related to the specified route. For example, as shown in FIG. 22B and described above, the additional material may include the actual path, e.g., a component-wise path, taken by the route. Additionally, if there are any potential side effects of the route, they may be displayed as well. For example, if one or more sub-systems are used in the route, e.g., a counter, then the subsystems may be listed in an information window, as shown in FIG. 22B, indicating that use of the sub-system by other routes may be constrained or precluded.

In one embodiment, the determined routability information may not only be displayed to the user for analysis, but may also be made available to other systems. In other words, the routability information may be provided in various formats to external systems, e.g., other software programs, for a any of a variety of uses, such as automatic route determination, among others. It is noted that if the topography of the board is updated because of a software or hardware upgrade, then the meta-routing tool will return up-to-date routability information. In other words, the meta-routing tool is data-driven from the device's topography, and thus the routability table generated automatically reflects any updates of the topography descriptions for the device.

In one embodiment, the meta-routing tool may be used to determine routability in a system which includes a plurality of devices. For example, the user may specify two or more devices for routing analysis, and the meta-routing tool may retrieve a corresponding two or more topology descriptions, determine all possible routes through all of the devices, and present the information to the user. Alternatively, the meta-routing tool may retrieve a system topography description for the two or more devices, and provide routing information to the user at the device level. In yet another embodiment, the meta-routing tool may retrieve both device topography descriptions and a system topography description, and determine complete system routability for presentation to the user.

Thus, in various embodiments, the meta-routing tool may provide means for a user to easily and reliably determine routability for a device, or, in other embodiments, for a system comprising two or more devices. The meta-routing tool may display information indicating all possible routes in the device or system, and may optionally also provide information indicating any possible side effects for particular routes. The meta-routing tool may also be operable to display the actual path a route takes through the hardware. Additionally, if there is a resource conflict related to the route, the meta-routing tool may provide means for gathering information for resolving the conflict.

Thus, various embodiments of the systems and methods described above may provide improved means for determining, analyzing, and implementing routing in measurement systems.

Glossary of Terms actuator—device used to convert from one phenomenon to another. Typically, the user will need to use an actuator to convert the phenomenon generated by a device to a more useful phenomenon.

application program—a software program which is executable to perform one or more functions, e.g., a software program that is executable to perform one or more specified measurement tasks.

attribute desirability—expressed by clients of the measurements expert system or measurements experts themselves. Specifies preferences (weighting) for the value of a specification attribute when there exists multiple possibilities.

branch—a proposal made by a measurements expert to extend a partial solution. Measurements experts may present several possibilities for extending one partial solution, effectively branching that partial solution into several independent partial solutions.

capabilities—capabilities store all attributes unique to the registration of an expert. Ex. A multiplexer expert is registered for three multiplexers, so the multiplexer has three capability records. For a multiplexer, the capability record will store the name of the multiplexer, the name of the output terminal, the names of all the input terminals, a list of the register settings for multiplexer configuration, and finally the limitations of the multiplexer. Anything that makes an expert registration unique or different is stored in the capability record. Expert developers can circumvent the need for capabilities by creating a unique expert subclass per registration.

channel—hardware and software resources used to make a measurement or a generation. Hardware resources of a channel include I/O connector resources and internal resources such as filters, ADC, counters, and the like. Software resources of a channel include scaling, analysis, transfer, and the like. Experts may choose the optimal attribute settings for a channel based on the task specification.

compile—the act of the measurements expert system solving a problem, effectively transforming a measurement task specification into a complete run-time specification. The Lenn "compile" also refers to converting a software program from source code into executable object code.

complete solution—a collection of decisions in which the measurement task specification has been fully solved by measurements experts.

completeness—a quantification of how close a measurement task specification is to being solved. The measurements expert system currently expresses this in the form of an estimate.

connection—a link between a two terminals. Physical manifestation of a connection could be a wire, trace, fiber optic line, or infrared link.

connectors—a set of pins made to link with a set of sockets or vise versa. Connectors also delineate when one component ends and another component begins. Components are joined to one another using connectors. Connectors allow connection MSOs to propagate across components. Examples of components are boards (PWBs), chips, cables, PXI chassis, and any other component that is reusable. Every component has one or more connectors. If a component is capable of joining with five other components, then the component will have five connectors. Two components can only join with one another if their connectors are compatible. When a connector pin is driven, the pin needs to be reserved so that it cannot be double driven in the future.

constraints—associated Boolean expressions of a solution that must be satisfied for the solution to meet the designer's needs. Example constraints include an attribute expression where measurable attributes include: price, maximum latency, throughput, determinism, accuracy, precision, and mass. An example expression could be (price<$5000). Other constraints may be fixed hardware settings (i.e. jumpered settings), limited resources (memory, computational power, counters, terminals), fixed hardware connectivity or fixed phenomenon connectivity, or artificial user constraints (i.e. gain must be 1)

cost—a composite measurement of attribute desirability, complexity, and resource consumption achieved by a particular solution. The measurements expert system uses costs and estimates to prioritize solutions. When selecting complete solutions, the measurements expert system chooses those complete solutions with the least cost. When selecting partial solutions, the measurements expert system chooses those partial solutions with the least cost and the lowest estimate of work remaining. Also referred to as a metric.

crystal oscillator—a component that generates a signal at a fixed frequency.

data store—destination specified for samples from a measurement, or source of updates specified for a generation.

decision—encapsulates a single extension of a partial solution. Measurements experts create one or more decisions based on their inputs which may be a measurement task specification. These decisions are either branched or failed digital high—a level of voltage that corresponds to a binary 1 versus a 0.

digital low—a level of voltage that corresponds to a binary 0 or ground.

divide down counter—also known as a pre-scaler counter, divide down counters output one pulse for every N pulses received.

event—used to control the timing and triggering of a measurement, generation, or connection. Users indicate timing and triggering by associating events with measurements, generations, and connections through messages. Users register observers with events to receive notifications while the task is running. The source of the event is often a hardware resource, but may be a software program, as well. Events can also be associated with other events to construct more complex events.

failed solution—a partial solution terminated by a failed decision.

fully qualified terminal names—unique identifiers that refer to a physical terminal in a system. In order to guarantee the uniqueness of a terminal name across multiple homogeneous devices, terminal names are scoped by placing the name of the device before the name of the terminal. The filly qualified terminal name for "PFI3" on device "DancingMonkey" would be "DancingMonkey/PFI3". The delimiter for fully qualified terminal names is the forward slash "/". Many fully qualified terminal names may have multiple delimiters. For example, the start trigger for the analog input subsection of the "Dancing Monkey" device would be "DancingMonkey/ai/start".

generation—production of a phenomenon, or a process which produces a phenomenon. The act of driving a phenomenon on a terminal. If the generation is specified using a MSO (Measurement Specification Object), then the generation will have specific attributes such as frequency, voltage levels, and the destination terminal for the generation. Generations may seem similar to connections. The difference is that the routing experts instead of the user figure out the source of the generation.

generation specification—a specification for the generation of a phenomenon, which might include the type of generation (waveform, sine wave, control function), and other attributes of the generation (amplitude, frequency, etc.)

independent—a specification is considered independent if it can be solved in parallel with any other specifications in a given measurement task specification.

digital low pass filter—low pass filters have the ability to reject portions of signals whose frequencies are above a certain level. Low pass filters can achieve this by sampling the signal at a certain frequency. If the signal stays constant between two subsequent samples, then the output of the low pass filter reflects the filter's input value. Another interesting side effect of low pass filters is that the propagation of a signal is delayed proportionally to the sampling frequency of the filter.

measurement—the retrieval of one or more characteristics of a phenomenon in order to produce a useful sample of information. For example, measurements may be performed by instruments or other types of devices which acquire real world data. Measurements may be performed for the purposes of simulation, hardware in the loop testing, validation, test, instrumentation, and manufacturing assembly, among other purposes. Measurements are how users quantify a phenomenon on a terminal. If the measurement is specified by a MSO (Measurement Specification Object), then the measurement will have specific attributes such as scaling factors, sampling rates, descriptions of the phenomenon, and the source terminal for the phenomenon being quantified.

measurement device—a hardware or virtual device which is operable to perform a measurement on a phenomenon, a generation of a phenomenon, or a connection. Example measurement devices include any of the devices shown in FIGS. 1A–1C.

measurement expert registry—a data structure correlating one or more experts with respective types of measurement tasks. The registry may be used by an expert system to select experts to populate run-time specifications for a given measurement task.

measurement expert system—a software program which may compile a measurement task specification into a run-time specification by selecting and invoking one or more experts.

measurement specification—a specification for the measurement of a phenomenon, which may include the type of measurement (e.g., present-value, frequency), other attributes of the measurement, and preferences of the measurement (e.g., accuracy, precision, throughput, latency).

measurement specification object (MSO)—the atomic objects used to describe concepts in the measurements domain. Measurement specification objects are associated to form a measurement task specification. MSOs are a way to specify a measurement, generation, or connection. Classical measurement APIs are centered on specifying the device, solution, and technology used to make the measurement. MSOs center around the specification of the problem versus the solution. It is the job of the decision tree to map the MSO to the measurement, generation, or connection to devices, solutions, and technology. Decision trees make this mapping happen using experts. In this way, the customer's specification is now loosely coupled to devices, solutions, and technology.

measurement task—a group of measurements, generations, and connections that share timing, synchronization, and control.

measurement task configuration tool—a software program which may be used to configure measurement tasks; this may be a general purpose development tool or a specific tool; a type of a measurement task specifier, below.

measurement task specification—a set of phenomena specifications, measurement specifications, generation specifications, timing specifications, and program specifications that comprise a measurement and automation application. A collection of one or more related specifications. Conceptually, the contents of a task specification represent one task which a customer would like to solve atomically. The measurements expert system uses measurements experts to compile a task specification into a populated run-time specification.

measurement task specifier—a program which accepts user input and may be used to produce a measurement task specification for a given measurement task; similar to a task configuration tool, below. An example measurement task specifier is a measurement task configuration tool which may be invoked from a graphical or text-based development environment. Other examples of a measurement task specifier include a measurement task wizard, and a measurement task API. Specific examples of a measurement task specifier include LabVIEW, LabWindows/CVI, DiaDem, DasyLab, Visual Basic, Visual C++, Delphi, Mathwork's Simulink, Agilent Vee, SoftWire, and other similar programming development environments.

measurements expert—a type of expert designed to operate under arbitration of the Measurements Experts Library.

The goal of a measurements expert is to compile a portion of a measurement task specification into a populated run-time specification.

partial solution—a collection of decisions for which no complete solution for the measurement task specification has yet been found.

phenomenon—a detectable signal. Users make measurements on phenomena, or generate them. Sensors and actuators convert from one phenomenon to another.

phenomenon specification—a characterization of a phenomenon in the real world, containing information about the type of the phenomenon (such as voltage, temperature, rotation speed, area luminosity, etc.), and characteristics of that phenomenon (such as range, bandwidth, shape, periodicity, etc.).

preferences—a formula that qualifies how well a solution meets a designer's needs. An example formula is f(mass), where f is the square of mass, such that less mass is a better solution. Another example is g(maximum latency, throughput) where g is a formula that calculates the throughput less 1000 times the maximum latency. In this case, a higher value for g is a better solution for the user (an identical concept is the "cost" function of a solution).

primitive—a single, cohesive object implementing a particular aspect of a measurement system. Primitive supervisors broker primitives. A run-time is composed of an aggregation of primitives.

primitive setting—a collection of properties associated with a particular primitive. Primitive settings are configured by measurements experts, and interpreted by primitive supervisors.

primitive supervisor—invoked by run-time builders, primitive supervisors interpret a specific primitive setting, using the contained properties to reserve an associated primitive.

reader—used to retrieve samples from a data source. Readers may be specific to the data source and the attributes will reflect this. For example, a buffer reader may have a parameter to indicate where in the buffer to retrieve data from.

registrations—expert registrations are how the decision tree knows which experts to ask to solve an MSO. If an expert is not registered, then they never get asked. An expert may be registered by using software calls or by placing entries in the registration portion of a component topography. Most hardware experts will use the latter method.

resource—a single, reservable element of the total means available for performing measurements in a measurement system. Examples of resources include a hardware counter, a RTSI line, or a fixed amount of CPU cycles.

route—a route is a connection between two terminals. When the user is setting up a data acquisition, routes may be implicitly created. The user may only be required to know the source or destination of the created connection.

run-time—a collection or sequence of primitives in a specific environment implementing a measurement system. Run-times are built by run-time builders, and may be executed to perform a specific measurement task or operation. The term "runtime" may also refer to other forms of a software program that implement a measurement system.

run-time builder—a software program which may analyze a run-time specification, reserve one or more primitives according to the run-time specification, and configure one or more primitives according to the run-time specification. Interprets a particular run-time specification and builds a run-time. Primitive brokering is delegated to primitive supervisors. The term "run-time builder" may also refer to a software program which may analyze a run-time specification and configure other types of software entities, such as by configuring other types of software program(s) or data structures according to the run-time specification.

run-time specification—a set of parameters specifying hardware or software primitive configurations required for a specified measurement task. A collection of primitive settings populated by measurements experts. Run-time specifications are interpreted by run-time supervisors. The term "run-time specification" may also include a data structure or other representation of information that specifies a measurement task.

sensor—device used to convert from one phenomenon type to another. Typically, the user will need to use a sensor to convert the phenomenon to a type the device can sample. Example sensors include thermocouples, pressure transducers, cameras, etc.

signal modifier—any hardware in a route which capable of changing versus just propagating the digital signal. Examples of signal modifiers are digital inverters, prescalers, digital low pass filters, and delay elements.

solution—a complete solution, failed solution, or partial solution.

solution builder—a self-contained piece of expert logic ("expertise") used to perform post-processing on a complete or failed solution. Measurements experts attach solution builders to decisions at solution-time when a partial solution is expanded. Deployed solution builders are invoked when a complete or failed solution is selected by the measurements expert system.

specification attribute—a data member of a measurement specification object. Used to describe some characteristic of a particular object.

static digital multiplexer—a multiplexer (MUX) which is programmed then used without further modifications. Some switching boards have multiplexers that are dynamic. Digital refers to the fact that the multiplexer is binary and directional. Digital multiplexers can only drive from an input pin to their output pin. Mechanical multiplexers used in switching applications are bidirectional. Digital multiplexers are unidirectional. Static digital multiplexers are used to route one out of a list of discrete list of inputs to its single output.

terminal—a physical location on a measurement device, cable, terminal block, accessory, or other measurement product where an phenomenon resides. For example, a terminal may be a connector on a terminal block, a pin on an ASIC, or the end of a thermocouple. Said another way, terminals are points on hardware where a signal is present. A terminal may be physically impossible to probe—especially if it is located within a chip.

terminal configuration—a collection of terminals with a specified usage. Examples of terminal configurations are referenced single-ended, non-referenced single-ended, two-wire differential, and four-wire excitation.

timing specification—a specification for the timing of measurements, generations, and control functions in the systems. Timing can include specification of synchronized measurement and generation, timed sequences and constraints on the completion of tasks.

topography—a topography normally refers to the layout of a component. People sometimes refer to a collection of topographies as a single topography. This too is correct. A topography has three main sections: 1) list of connectors 2) list of registrations 3) list of capabilities. The variation of these three sections is what makes topographies customizable and powerful. Topographies are stored as data dictionaries and are retrieved using MXS. It is the responsibility of the device group to create their device topographies. Sub components could possibly be specified by outside group. If a single device group only uses the sub component, then it is the responsibility of the using group to create the sub component topography.

trigger bus—a trigger bus is a collection of lines that many devices share by reading signals from or driving signals to the trigger bus. Examples of trigger buses are RTSI and the PXI Trigger backplane.

tri-state—tri-stating is a mode in which an output driver (e.g. on a multiplexer) electrically disconnects its output terminal from its bus.

virtual measurement device—a device which is implemented as a software program, or at least a portion of which is implemented as a software program.

writer—used to write updates to a data store. Writers are generally specific to the data store and the attributes will reflect this. For example, a buffer writer may have a parameter to indicate where in the buffer to write data to.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A carrier medium which stores program instructions for programmatically determining routing for a measurement task, wherein the program instructions are executable by a processor to perform:

receiving information specifying a route from a source terminal to a destination terminal in a measurement system, wherein said information includes one or more signal modification requirements for the route;

determining a current signal modification of the route;

determining one or more desired changes in the signal modification of the route based on the one or more signal modification requirements for the route and the current signal modification of the route;

modifying the route to include at least one of the one or more desired changes in the signal modification of the route, thereby generating a modified route, wherein the modified route satisfies at least a portion of the one or more signal modification requirements for the route; and storing the modified route in a memory medium, wherein the modified route is usable to route signals in performing the measurement task.

2. The carrier medium of claim 1, wherein the program instructions are further executable to perform:

determining if the modified route satisfies the one or more signal modification requirements for the route; and if the modified route does not satisfy the one or more signal modification requirements for the route, generating an error message.

3. The carrier medium of claim 1, wherein said information further includes a graph of possible routes from the source terminal to the destination terminal;

wherein the route comprises one or more legs; and wherein said modifying the route to include at least one of the one or more desired changes in the signal modification of the route comprises:

walking the one or more legs of the route in the graph; and replacing at least one of the one or more legs with an alternative leg, wherein the alternate leg includes said at least one of the one or more desired changes in the signal modification of the route.

4. The carrier medium of claim 3, wherein said walking and said replacing comprise:

a) selecting a current leg of the one or more legs of the route;

b) determining from the graph and/or the current signal modification of the route whether one or more alternative legs for the current leg exist;

c) if the one or more alternative legs exist, for at least one of the one or more alternative legs:

d) comparing signal modification of the current leg with signal modification of the at least one alternative leg; and e) if replacement of the current leg with the at least one alternative leg in the route fulfills at least a portion of the one or more desired changes in signal modification for the route, replacing the current leg with the at least one alternative leg.

5. The carrier medium of claim 4, wherein the program instructions are further executable to perform:

after said replacing the current leg with the alternative leg, f) modifying the one or more desired changes in signal modification for the route to reflect said replacing;

g) if at least one of the one or more desired changes in signal modification for the route remains and at least one of the one or more legs of the route has not been selected, h) selecting a next leg of the one or more legs of the route as the current leg; and i) repeating b) through g).

6. The carrier medium of claim 4, wherein the current signal modification of the route includes signal modifications for one or more legs of the route that are shared with a pre-existing route;

wherein said signal modifications for one or more legs of the route that are shared with a pre-existing route comprise constraints on the route which may not be changed to meet the one or more signal modification requirements for the route; and wherein determining from the graph and/or the current signal modification of the route whether one or more alternative legs for the current leg exist comprises determining whether the current leg includes a constraint from the pre-existing route, and wherein if the current leg includes a constraint, then there are no alternative legs for the current leg.

7. The carrier medium of claim 1, wherein the route includes a plurality of components;

wherein the current signal modification of the route comprises information indicating signal modifications for one or more components of the plurality of components that are shared with a pre-existing route; and wherein said signal modifications for the one or more components of the route that are shared with the pre-existing route may not be changed to meet the one or more signal modification requirements for the route.

8. The carrier medium of claim 7, wherein the current signal modification of the route comprises information indicating signal modifications for one or more components of the plurality of components that are not shared with a pre-existing route;

wherein said signal modifications for the one or more components of the route that are not shared comprise default signal modifications for the one or more components; and wherein said signal modifications for the one or more components of the route that are not shared may be changed to meet the one or more signal modification requirements for the route.

9. The carrier medium of claim 1, wherein said signal modifications include one or more of:
signal inversion;
synchronization;
filtering;
pre-scaling; and
logical combination with a signal from another terminal.

10. The carrier medium of claim 1, wherein the route comprises a single device route, and wherein the source terminal and the destination terminal are both comprised in a single device in the measurement system.

11. The carrier medium of claim 1, wherein the route comprises a multi-device route, wherein the source terminal is comprised in a first device in the measurement system, and wherein the destination terminal is comprised in a second device in the measurement system.

12. The carrier medium of claim 1, wherein the program instructions are further executable to perform:
programmatically determining the route from the source terminal to the destination terminal prior to said receiving information.

13. The carrier medium of claim 12, wherein, prior to said programmatically determining the route, the carrier medium further comprises:
receiving input specifying the source terminal and the destination terminal in the measurement system;
receiving at least one topography description, wherein the topography description indicates a plurality of components in at least one device in the measurement system, and connectivity between each of the plurality of components in the at least one device; and
preprocessing the at least one topography description to generate a graph of possible routes from the source terminal to the destination terminal.

14. The carrier medium of claim 13, wherein the graph comprises a weighted graph, and wherein edges in the graph are weighted in accordance with one or more metrics, and wherein said programmatically determining the route comprises:
traversing the graph to determine a plurality of routes from the source terminal to the destination terminal; and
selecting the route from the plurality of routes based on the one or more metrics.

15. The carrier medium of claim 13, wherein the at least one topography description further comprises:
configuration information specifying one or more operational parameters for respective components of the at least one device.

16. The carrier medium of claim 15, wherein said storing the modified route comprises storing the modified route in a run-time specification, wherein the run-time specification is usable to configure the modified route in the at least one device.

17. The carrier medium of claim 16,
wherein said storing the modified route in the run-time specification comprises storing the one or more operational parameters for components of the at least one device included in the modified route; and
wherein the run-time specification is usable to configure the components of the at least one device using the one or more operational parameters to implement the modified route.

18. The carrier medium of claim 17, wherein the program instructions are further executable to perform:
analyzing the run-time specification; and
configuring the modified route in the at least one device based on said analyzing.

19. The carrier medium of claim 17, wherein the program instructions are further executable to perform:
analyzing the run-time specification; and
generating a run-time based on said analyzing, wherein the run-time is executable to perform the measurement task.

20. The carrier medium of claim 17, wherein the run-time specification comprises a specification of the one or more operational parameters of one or more measurement routing primitives, wherein each measurement routing primitive comprises a software object and corresponding configuration settings, and wherein each measurement routing primitive is operable to implement at least a portion of the modified route.

21. A computer-implemented method for determining routing with signal modifications for a measurement task, comprising:
receiving information specifying a route from a source terminal to a destination terminal in a measurement system, wherein said information includes one or more signal modification requirements for the route;
determining a current signal modification of the route;
determining one or more desired changes in the current signal modification of the route based on the one or more signal modification requirements for the route and the current signal modification of the route;
modifying the route to include at least one of the one or more desired changes in the current signal modification of the route, thereby generating a modified route, wherein the modified route satisfies at least a portion of the one or more signal modification requirements for the route; and
storing the modified route, wherein the modified route is usable to route signals in performing the measurement task.

22. The computer-implemented method of claim 21, further comprising:
determining if the modified route satisfies the one or more signal modification requirements for the route; and
if the modified route does not satisfy the one or more signal modification requirements for the route, generating an error message.

23. The computer-implemented method of claim 21,
wherein said information further includes a graph of possible routes from the source terminal to the destination terminal;
wherein the route comprises one or more legs; and
wherein said modifying the route to include at least one of the one or more desired changes in the current signal modification of the route comprises:
walking the one or more legs of the route in the graph; and
replacing at least one of the one or more legs with an alternative leg, wherein the alternate leg includes said at least one of the one or more desired changes in the current signal modification of the route.

24. The computer-implemented method of claim 23, wherein said walking and said replacing comprise:
   a) selecting a current leg of the one or more legs of the route;
   b) determining from the graph and/or the current signal modification of the route whether one or more alternative legs for the current leg exist;
   c) if the one or more alternative legs exist, for at least one of the one or more alternative legs:
   d) comparing signal modification of the current leg with signal modification of the at least one alternative leg; and
   e) if replacement of the current leg with the at least one alternative leg in the route fulfills at least a portion of the one or more desired changes in signal modification for the route, replacing the current leg with the at least one alternative leg.

25. The computer-implemented method of claim 24, further comprising:
   after said replacing the current leg with the alternative leg,
   f) modifying the one or more desired changes in signal modification for the route to reflect said replacing;
   g) if at least one of the one or more desired changes in signal modification for the route remains and at least one of the one or more legs of the route has not been selected,
   h) selecting a next leg of the one or more legs of the route as the current leg; and
   i) repeating b) through g).

26. The computer-implemented method of claim 24,
   wherein the current signal modification of the route includes signal modifications for one or more legs of the route that are shared with a pre-existing route;
   wherein said signal modifications for one or more legs of the route that are shared with a pre-existing route comprise constraints on the route which may not be changed to meet the one or more signal modification requirements for the route; and
   wherein determining from the graph and/or the current signal modification of the route whether one or more alternative legs for the current leg exist comprises determining whether the current leg includes a constraint from the pre-existing route, and wherein if the current leg includes a constraint, then there are no alternative legs for the current leg.

27. The computer-implemented method of claim 21,
   wherein the route includes a plurality of components;
   wherein the current signal modification of the route comprises information indicating signal modifications for one or more components of the plurality of components that are shared with a pre-existing route; and
   wherein said signal modifications for the one or more components of the route that are shared with the pre-existing route may not be changed to meet the one or more signal modification requirements for the route.

28. The computer-implemented method of claim 27,
   wherein the current signal modification of the route comprises information indicating signal modifications for one or more components of the plurality of components that are not shared with a pre-existing route;
   wherein said signal modifications for the one or more components of the route that are not shared comprise default signal modifications for the one or more components; and
   wherein said signal modifications for the one or more components of the route that are not shared may be changed to meet the one or more signal modification requirements for the route.

29. The computer-implemented method of claim 21, wherein said signal modifications include one or more of:
   signal inversion;
   synchronization;
   filtering;
   pre-scaling; and
   logical combination with a signal from another terminal.

30. The computer-implemented method of claim 21, wherein the route comprises a single device route, and wherein the source terminal and the destination terminal are both comprised in a single device in the measurement system.

31. The computer-implemented method of claim 21, wherein the route comprises a multi-device route, wherein the source terminal is comprised in a first device in the measurement system, and wherein the destination terminal is comprised in a second device in the measurement system.

32. The computer-implemented method of claim 21, further comprising:
   programmatically determining the route from the source terminal to the destination terminal prior to said receiving information.

33. The computer-implemented method of claim 32, wherein, prior to said programmatically determining the route, the computer-implemented method further comprises:
   receiving input specifying the source terminal and the destination terminal in the measurement system;
   receiving at least one topography description, wherein the at least one topography description indicates a plurality of components in at least one device in the measurement system, and connectivity between each of the plurality of components in the at least one device; and
   preprocessing the at least one topography description to generate a graph of possible routes from the source terminal to the destination terminal.

34. The computer-implemented method of claim 33, wherein the graph comprises a weighted graph, and wherein edges in the graph are weighted in accordance with one or more metrics, and wherein said programmatically determining the route comprises:
   traversing the graph to determine a plurality of routes from the source terminal to the destination terminal; and
   selecting the route from the plurality of routes based on the one or more metrics.

35. The computer-implemented method of claim 32, wherein the at least one topography description further comprises:
   configuration information specifying one or more operational parameters for respective components of the at least one device.

36. The computer-implemented method of claim 35, wherein said storing the modified route comprises storing the modified route in a run-time specification, wherein the run-time specification is usable to configure the modified route in the at least one device.

37. The computer-implemented method of claim 36,
   wherein said storing the modified route in the run-time specification comprises storing the operational parameters for components of the at least one device included in the modified route; and wherein the run-time specification is usable to configure the components of the at least one device using the one or more operational parameters to implement the modified route.

38. The computer-implemented method of claim 37, further comprising:

analyzing the run-time specification; and configuring the modified route in the at least one device based on said analyzing.

39. The computer-implemented method of claim 37, further comprising:

analyzing the run-time specification; and generating a run-time based on said analyzing, wherein the run-time is executable to perform the measurement task.

40. The computer-implemented method of claim 37, wherein the run-time specification comprises a specification of the one or more operational parameters of one or more measurement routing primitives, wherein each measurement routing primitive comprises a software object and corresponding configuration settings, and wherein each measurement routing primitive is operable to implement at least a portion of the modified route.

41. A system for determining routing with signal modifications for a measurement task, comprising:

a processor; and a memory medium, coupled to the processor; and an input, coupled to the memory medium, wherein the input is operable to receive input information specifying a route from a source terminal to a destination terminal in a measurement system, wherein said input information includes one or more signal modification requirements for the route;

wherein the memory medium stores program instructions which are executable by the processor to perform:

receiving information specifying a route from a source terminal to a destination terminal in a measurement system, wherein said information includes one or more signal modification requirements for the route;

determining a current signal modification of the route;

determining one or more desired changes in the current signal modification of the route based on the one or more signal modification requirements for the route and the current signal modification of the route;

modifying the route to include at least one of the one or more desired changes in the signal modification of the route, thereby generating a modified route, wherein the modified route satisfies at least a portion of the one or more signal modification requirements for the route; and storing the modified route in the memory medium, wherein the modified route is usable to route signals in performing the measurement task.

42. The system of claim 41, wherein the program instructions are further executable to perform:

determining if the modified route satisfies the one or more signal modification requirements for the route; and if the modified route does not satisfy the one or more signal modification requirements for the route, generating an error message.

43. The system of claim 41, wherein said information further includes a graph of possible routes from the source terminal to the destination terminal;

wherein the route comprises one or more legs; and wherein said modifying the route to include at least one of the one or more desired changes in the signal modification of the route comprises:

walking the one or more legs of the route in the graph; and replacing at least one of the one or more legs with an alternative leg, wherein the alternate leg includes said at least one of the one or more desired changes in the signal modification of the route.

44. A system for programmatically determining routing for a measurement task, comprising:

means for receiving information specifying a route from a source terminal to a destination terminal in a measurement system, wherein said information includes one or more signal modification requirements for the route;

means for determining a current signal modification of the route;

means for determining one or more desired changes in the current signal modification of the route based on the one or more signal modification requirements for the route and the current signal modification of the route;

means for modifying the route to include at least one of the one or more desired changes in the current signal modification of the route, thereby generating a modified route, wherein the modified route satisfies at least a portion of the one or more signal modification requirements for the route; and means for storing the modified route, wherein the modified route is usable to route signals in performing the measurement task.

* * * * *